United States Patent [19]
Moore, Jr. et al.

[11] Patent Number: 5,987,958
[45] Date of Patent: Nov. 23, 1999

[54] METHODS AND APPARATUS FOR BACKGAGING AND SENSOR-BASED CONTROL OF BENDING OPERATION

[75] Inventors: Richard M. Moore, Jr.; David Alan Bourne, both of Pittsburgh, Pa.; Kerry L. Elkins, Uniontown, Ohio; Anne Marie Murray, Onalaska, Tex.; Robert H. Sturgas, Jr., Mt. Lebanon, Pa.; Kensuke Hazama, Buena Park, Calif.

[73] Assignees: Amada Company, Ltd., Kanagawa, Japan; Amada America, Inc., Buena Park, Calif.

[21] Appl. No.: 08/980,301

[22] Filed: Nov. 28, 1997

Related U.S. Application Data

[62] Division of application No. 08/385,829, Feb. 9, 1995, Pat. No. 5,761,940, which is a continuation of application No. 08/338,153, Nov. 9, 1994, abandoned.

[51] Int. Cl.⁶ .................................................. B21D 43/10
[52] U.S. Cl. .............................. 72/422; 72/18.5; 72/19.4; 72/37; 72/420; 364/468.21; 364/474.07
[58] Field of Search ..................................... 72/16.8, 16.9, 72/17.3, 18.5, 18.6, 18.8, 19.4, 19.6, 31.1, 31.11, 31.12, 37, 389.1, 389.3, 389.4, 420, 421, 422, 441, 443, 446, 702; 483/14, 15; 33/263, 282, 285, 286; 364/468.21, 469.03, 474.07

[56] References Cited

U.S. PATENT DOCUMENTS

| 3,654,616 | 4/1972 | Dunne et al. . |
| 3,890,552 | 6/1975 | Devol et al. . |

(List continued on next page.)

FOREIGN PATENT DOCUMENTS

| 0301527 | 2/1989 | European Pat. Off. . |
| 0335314 | 10/1989 | European Pat. Off. . |
| 4309414 | 11/1992 | Japan . |
| 9109696 | 7/1991 | WIPO . |
| 9503901 | 2/1995 | WIPO . |

(List continued on next page.)

OTHER PUBLICATIONS

Bourne, David A., "Intelligent Manufacturing Workstations," whcih appeared in *Knowledge–Based Automation of Processes*, Session at the 1992 ASMEWinter Annual Meeting, Nov. 1992.

(List continued on next page.)

*Primary Examiner*—Lowell A. Larson
*Assistant Examiner*—Ed Tolan
*Attorney, Agent, or Firm*—Greenblum & Bernstein

[57] ABSTRACT

Several methods and subsystems are disclosed for aligning a workpiece as it is being loaded into a die space of a bending apparatus, and for performing sensor-based control of a robot as it moves a workpiece from one location to another within a bending apparatus environment. A backgaging mechanism is provided with finger gaging mechanisms having force sensors for sensing forces in directions perpendicular to and parallel to a die. In addition, a robot gripper sensor is provided for sensing either or both of shear forces and normal forces created by movement of a workpiece being held by the gripper. Several sensor-based control modules are disclosed, including a bend-following control module, a speed control module, a module for actively damping vibrations in a workpiece, a module for controlling active compliance/contact between a workpiece and an obstacle, a module for performing a guarded move to intentionally bring a workpiece into contact with an obstacle, and a module for detecting unintentional impacts between a workpiece and an obstacle. Several droop sensing methods and systems are also disclosed, including methods for performing droop sensing and compensation with the use of a vision-based droop sensor, a compound break-beam droop sensor, and a single break-beam droop sensor. In addition, an angle sensor is disclosed, along with a springback control method utilizing the disclosed angle sensor.

10 Claims, 37 Drawing Sheets

U.S. PATENT DOCUMENTS

| | | |
|---|---|---|
| 4,111,027 | 9/1978 | Bottomley . |
| 4,260,940 | 4/1981 | Engelberger et al. . |
| 4,309,600 | 1/1982 | Perry et al. . |
| 4,356,718 | 11/1982 | Williamson . |
| 4,369,563 | 1/1983 | Makino . |
| 4,455,857 | 6/1984 | Salvagnini . |
| 4,495,588 | 1/1985 | Nio et al. . |
| 4,501,135 | 2/1985 | Chivens et al. . |
| 4,509,357 | 4/1985 | Zbornik . |
| 4,517,653 | 5/1985 | Tsuchihashi et al. . |
| 4,564,765 | 1/1986 | Blaich ................................... 72/389.3 |
| 4,571,694 | 2/1986 | Inaba et al. . |
| 4,602,345 | 7/1986 | Yokoyama . |
| 4,604,526 | 8/1986 | Moir ......................................... 33/263 |
| 4,613,943 | 9/1986 | Miyake et al. . |
| 4,640,113 | 2/1987 | Dieperink et al. . |
| 4,658,625 | 4/1987 | Koyama et al. . |
| 4,706,491 | 11/1987 | Sartorio . |
| 4,745,812 | 5/1988 | Amazeen et al. . |
| 4,748,571 | 5/1988 | Shippy .................................... 364/513 |
| 4,772,801 | 9/1988 | Fornerud et al. ...................... 72/389.3 |
| 4,802,357 | 2/1989 | Jones ..................................... 72/389.3 |
| 4,942,767 | 7/1990 | Haritonidis et al. . |
| 4,947,666 | 8/1990 | Hametner et al. . |
| 4,962,654 | 10/1990 | Zbornik . |
| 4,979,385 | 12/1990 | Lafrasse et al. . |
| 4,991,422 | 2/1991 | Sartorio . |
| 4,995,087 | 2/1991 | Rathi et al. ................................. 382/8 |
| 5,005,394 | 4/1991 | Sartorio et al. . |
| 5,007,264 | 4/1991 | Haack . |
| 5,009,098 | 4/1991 | Van Merksteijn . |
| 5,012,661 | 5/1991 | Catti et al. . |
| 5,031,441 | 7/1991 | Jones . |
| 5,036,694 | 8/1991 | Farney et al. . |
| 5,042,287 | 8/1991 | Sartorio . |
| 5,058,406 | 10/1991 | Sartorio et al. . |
| 5,081,763 | 1/1992 | Jones . |
| 5,088,181 | 2/1992 | Jeppson . |
| 5,092,645 | 3/1992 | Okada . |
| 5,146,670 | 9/1992 | Jones . |
| 5,182,936 | 2/1993 | Sartorio . |
| 5,187,958 | 2/1993 | Prunotto et al. . |
| 5,212,647 | 5/1993 | Raney et al. ........................ 364/474.34 |
| 5,307,282 | 4/1994 | Conradson et al. . |
| 5,329,597 | 7/1994 | Kouno et al. . |
| 5,483,750 | 1/1996 | Ooenaki et al. ........................ 72/389.3 |
| 5,531,087 | 7/1996 | Kitabayashi et al. .................. 72/389.3 |
| 5,608,817 | 3/1997 | Yamakota et al. ....................... 382/152 |

FOREIGN PATENT DOCUMENTS

| | | |
|---|---|---|
| 0355454 | 2/1990 | European Pat. Off. . |
| 0555908 | 8/1993 | European Pat. Off. . |
| 3110018 | 5/1991 | Japan . |
| 3110022 | 5/1991 | Japan . |

OTHER PUBLICATIONS

Craig, John J. *Introduction to Robotics Mechanics and Control*, Second Edition, Addison–Wesley Publishing Co., Reading, MA (1989).

Patent Abstracts of Japan, vol. 017, No.126, Mar. 17,1993,& JP-A-04 309 414.

Patent Abstracts of Japan, vol. 015, No. 298, Jul. 29, 1991, & JP-A-03 110 022.

Patent Abstracts of Japan, vol. 015, No.298, Jul. 29, 1991, & JP-A-03 110 018.

Patent Abstracts of Japan, vol. 018, No. 239, May 9, 1994, & JP-A-06 031 345.

Patent Abstracts of Japan, vol. 015, No. 325, Aug, 19, 1991, & JP-A-03 124 318.

Ichikawa et al.,Y., "A Heuristic Planner And An Executive For Mobile Robor Control", *IEEE Transactions on Systems, Man and Cybernetics*, vol. SMC–15, No. 4, pp. 558–563, New York, U.S.A. (Jul./Aug. 1985).

Zussman et al.,E.,"A Planning Approach For Robot–Assisted Multiple–Bent Profile Handling", *Robotics and Computer–Integrated Manufacturing*, vol. 11, No. 1, pp. 35–40, Kidlington, Oxford, GB(Mar. 1994).

Huang et al., H., "Time–Optimal Control For A Robotic Contour Following Problem", *IEEE Journal of Robotics and Automation*, vol. 4, No. 2, pp. 140–149, New York, U.S.A. (Apr. 1988).

Hoermann, K., "A Cartesian Approach To Findpath For Industrial Robots", *NATO ASI Series*, vol. F29, pp. 425–450, Springler–Verlag Berlin Heidelberg, DE(1987).

Fink et al., B., "Schnelle Bahnplanung Fuer Industrieroboter mit Veraenderlichem Arbeitsraum", *Automatisierungstechnik–AT*, vol. 39, No. 6, pp. 197–200, 201–204,Munich, DE (Jun. 1991).

Shaffer et al., C.A., "A Real–Time Robot Arm Collision Avoidance System", *IEEE Transactions on Robotics and Automation*, vol. 8, No. 2, pp. 149–160, New York, U.S.A. (Apr. 1992).

Lee et al., C.T. "A Divide–And–Conquer Approach With Heuristics Of Motion Planning For A Cartesian Manipulator", *IEEE Transactions on Systems, Man and Cybernetics*, vol. 22, No. 5, pp.929–944,New York U.S.A. (Sept./Oct. 1992).

O'Donnell et al., P.A., "Deadlock–Free And Collision–Free Coordination Of Two Robot Manipulators", *Proceedings of the 1989 IEEE International Conference on Robotics and Automation*, vol.1, pp. 484–489, Scottsdale, AZ (May 1989).

Weule et al., V.H., "Rechnerintergrierte Fertigung Von Abkantteilen", *V.A.I.–Zeitschrift*, vol. 130, No. 9 pp. 101–106, Dusseldorf, W. Germany (sep. 1988).

Reissner,V.J., "Innovationsschub Bei Rechnerintegrierten Umformsystemen", *Technische Rundschau*, vol.85 No. 5, pp.20–25, Bern, CH )Feb. 5, 1993).

Geiger et al., M., "Infernzmaschine Fuer Ein Biegestadienplanungssystem", *ZWF CIM Zeitschrift fur Wirtschaftliche Fertigung und Automatisierung*, vol. 87, No. 5, pp. 261–264, Munich, DE (May 1992).

Database Dialog, Information Access Co., File 621, Access No. 0134529, *Communigraphics Inc*: "LVD Introduces New CNC/DNC/CAD/CAM Control System For Press Brakes At IMTS'86", & New Product Announcements, No. 0134529, Plainville, CT, U.S.A. (Jul. 1996).

An International Search Report for PCT/JP 95/02288.

An Invitation to Pay Additional Fees with a Partial International Search Report for PCT/JP 95/02289.

An International Search Report for PCT/JP 95/02290.

An International Search report for PCT/JP 95/02291.

METHODS AND APPARATUS FOR BACKGAGING AND SENSOR-BASED CONTROL OF BENDING OPERATION

RELATED APPLICATION DATA

This application is a division of application Ser. No. 08/385,829, now U.S. Pat. No. 5,761,940, filed Feb. 9, 1995, which is a continuation of Parent application Ser. No. 08/338,153, filed Nov. 9, 1994 now abandoned. This application is a continuation of U.S. patent application Ser. No. 08/338,153, filed on Nov. 9, 1994, the entire disclosure of which is expressly incorporated by reference herein. The present disclosure is related to the disclosures provided in the following commonly assigned U.S. applications: "Method for Planning/Controlling Robot Motion", U.S. patent application Ser. No. 08/338,115, filed on Nov. 9, 1994, which was allowed and for which a continuation application, U.S. patent application Ser. No. 08/898,551, was filed on Jul. 22, 1997; "Intelligent System for Generating and Executing a Sheet Metal Bending Plan", U.S. patent application Ser. No. 08/338,113, filed on Nov. 9, 1994, which was abandoned in favor of a continuation application, U.S. patent application Ser. No. 08/386,369, filed on Feb. 9, 1995; and "Fingerpad Force Sensing System", U.S. patent application Ser. No. 08/338,095, filed on Nov. 9, 1994, which was abandoned in favor of a continuation application, U.S. patent application Ser. No. 08/741,553, filed on Oct. 31, 1996; and the disclosures of all of these applications are expressly incorporated by reference herein in their entireties.

BACKGROUND OF THE INVENTION

1. Copyright Notice

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

2. Field of the Invention

The present invention relates to methods and apparatuses for backgaging during the operation of a press brake of a sheet metal bending workstation, and to sensor-based control of robotic manipulations of sheet metal workpieces' and of operation of the press brake. The present invention further relates to various systems and sub-components for assisting in the operation of the backgaging and sensor-based control methods.

3.. Discussion of Background and Material Information

FIGS. 1–3 illustrate, in a simplified view, an example conventional bending workstation 10 for bending sheet metal parts from a manually created program downloaded to various control devices provided within the workstation. The illustrated bending workstation is a BM100 Amada workstation.

(a) The Hardware and Its Operation

FIG. 1 shows an overall simplified view of bending workstation 10. FIG. 2 shows a partial view of a press brake 29, positioned to perform a bend on a workpiece 16. The elements shown in FIG. 2 include a robot arm 12 having a robot arm gripper 14 grasping a workpiece 16, a punch 18 being held by a punch holder 20, and a die 19 which is placed on a die rail 22. A backgage mechanism 24 is illustrated to the left of punch 18 and die 19.

As shown in FIG. 1, bending workstation 10 includes four major mechanical components: a press brake 29 for bending workpiece 16; a five degree-of-freedom robotic manipulator (robot arm) 12 for handling and positioning workpiece 16 within press brake 29; a material loader/unloader (L/UL) 30 for loading and positioning a blank workpiece at a location for robot arm 12 to grab, and for unloading finished workpieces; and a repositioning gripper 32 for holding workpiece 16 while robot arm 12 changes its grasp.

Press brake 29 includes several components as illustrated in FIGS. 1–3. Viewing FIG. 3, press brake 29 includes at least one die 19 which is placed on a die rail 22, and at least one corresponding punch tool 18 which is held by a punch tool holder 20. Press brake 29 further includes a backgage mechanism 24.

As shown in FIG. 2, robot arm 12 includes a robot arm gripper 14 which is used to grasp workpiece 16. As shown in FIG. 1, material loader/unloader 30 includes several suction cups 31 which create an upwardly directed suction force for lifting a sheet metal workpiece 16, thereby allowing L/UL 30 to pass workpiece 16 to gripper 14 of robot 12, and to subsequently retrieve workpiece 16 from gripper 14 and unload the finished workpiece.

In operation, loader/unloader 30 will lift a blank workpiece 16 from a receptacle (not shown), and will raise and move workpiece 16 to a position to be grabbed by gripper 14 of robot 12. Robot 12 then maneuvers itself to a position corresponding to a particular bending stage located within bending workstation 10. Referring to each of FIGS. 1 and 3, stage 1 comprises the stage at the leftmost portion of press brake 29, and stage 2 is located to the right of stage 1 along die rail 22.

If the first bend is to be made at stage 1, robot 12 will move workpiece 16 to stage 1, and as shown in FIG. 2, will maneuver workpiece 16 within the die space of press brake 29, (i.e., at a location between punch tool 18 and die 19), until it reaches and touches a backstop portion of backgage 24. Then, a bend operation is performed on workpiece 16 at stage 1. In performing the bend operation, die rail 22 moves upward (along a D axis), as indicated by the directional arrow A in FIG. 2. As punch tool 18 and die 19 simultaneously contact workpiece 16, so that workpiece 16 assumes a relatively stable position within press brake 29, gripper 14 will release its grasp on workpiece 16, and robot 12 will move gripper 14 away from workpiece 16. Press brake 29 will then complete its bending of workpiece 16, by completing the upward movement of die 19 until the proper bend has been formed.

Once die 19 is engaged against punch tool 18, holding workpiece 16 in its bent state, before disengaging die 19 by lowering press brake 29, robot arm 12 will reposition its robot arm gripper 14 to hold workpiece 16. Once gripper 14 is holding workpiece 16, die 19 will be disengaged by releasing press brake 29. Robot 12 then maneuvers and repositions workpiece 16 in order to perform the next bend in the particular bend sequence that has been programmed for workpiece 16. The next bend within the bend sequence may be performed either at the same stage, or at a different stage, such as stage 2, depending upon the type of bends to be performed, and the tooling provided within press brake 29.

Depending upon the next bend to be performed, and the configuration of workpiece 16, the gripping position of gripper 14 may need to be repositioned. Repositioning gripper 32, shown in FIG. 1, is provided for this purpose. Before performing the next bend, for which repositioning of robot gripper 14 is needed, workpiece 16 will be moved by robot 12 to repositioning gripper 32. Repositioning gripper 32 will then grasp workpiece 16 so that robot gripper 14 can regrip workpiece 16 at a location appropriate for the next bend or sequence of bends.

(b) The Control System

The bending workstation 10 illustrated in FIG. 1 is controlled by several control devices which are housed separately, including an MM20-CAPS interface 40, a press brake controller 42, a robot controller 44, and a load/unload unit controller 46. Press brake controller 42 comprises an NC9R press brake controller, and robot controller 44 comprises a 25B robot controller, which are each supplied by Amada. Each of press brake controller 42 and robot controller 44 have their own CPU and programming environments. Load/unload unit controller 46 comprises a stand alone Programmable Logic Controller (PLC), and is wired to respective consoles provided for press brake controller 42 and robot controller 44.

Each of controllers 42, 44, and 46 has a different style bus, architecture, and manufacturer. They are coordinated primarily by parallel I/O signals. Serial interfaces are provided for transporting bending and robot programs to the controllers, each of which is programmed in a different manner. For example, logic diagrams are used to program the PLC of the load/unload controller 46, and RML is used to program robot controller 44.

(c) The Design/Manufacture Process

The overall design/manufacture process for bending sheet metal includes several steps. First, a part to be produced is typically designed using an appropriate CAD system. Then, a plan is generated which defines the tooling to be used and a sequence of bends to be performed. Once the needed tooling is determined, an operator will begin to set up the bending workstation. After the workstation is set up, the plan is executed, i.e., a workpiece is loaded and operation of the bending workstation is controlled to execute the complete sequence of bends on a blank sheet metal workpiece. The results of the initial run(s) of the bending workstation are then fed back to the design step, where appropriate modifications may be made in the design of the part in view of the actual operation of the system.

In the planning step, a plan is developed for bending workstation 10 in order to configure the system to perform a sequence of bending operations. Needed hardware must be selected, including appropriate dies, punch tools, grippers, and so on. In addition, the bending sequence must be determined, which includes the ordering and selection of bends to be performed by bending workstation 10. In selecting the hardware, and in determining the bending sequence, along with other parameters, software will be generated to operate bending workstation 10, so that bending workstation 10 can automatically perform the complete bending process.

FIG. 4 illustrates the structure of backgaging mechanism 24 of the conventional BM100 Amada bending workstation illustrated in FIG. 1. As illustrated in FIG. 4, backgage mechanism 24 comprises at least two linear potentiometers 60 for performing backgaging operations. In order to perform a backgaging operation, a robot 12 (see FIG. 1) adjusts its A dimension so that workpiece 16 is horizontal, and moves the workpiece in a positive Y direction towards backgage mechanism 24, until contact is made with at least one of linear potentiometers 60. Movement of robot 12 (and robot gripper 14) is then controlled to balance out each of the two contacted linear potentiometers 60, and to adjust the overall Y position as indicated by the output signals produced by linear potentiometers 60. In performing such an adjustment, the robot may move workpiece 16 from a first position I to a second position II, as shown in FIG. 4. When workpiece 16 is moved from location I to location II, by rotating robot gripper 14 in a -B direction, the position of workpiece 16 in the X direction will be significantly changed, by an amount AX. For every adjustment in the position of the workpiece that is made, it is likely that the X position of workpiece 16 will be changed. This requires an additional movement by robot 12 to correct the X position of workpiece 16, and thus causes delays in the backgaging process. An additional limitation in the backgaging mechanism illustrated in FIG. 4 is that the mechanism is not designed to allow for sidegaging, i.e., gaging in the X direction of workpiece 16.

SUMMARY OF THE INVENTION

In view of the above, the present invention, through one or more of its various aspects and/or embodiments, is thus presented to bring about one or more objects and advantages such as noted below.

It is an object of the present invention to provide a backgaging mechanism which will allow a workpiece to be aligned as it is brought into a die space of a bending apparatus without repeatedly adjusting the position of the workpiece. Thus, it is an object of the present invention to provide a backgaging mechanism which will allow positioning and alignment of a workpiece in a die space in a more efficient manner.

It is further object of the present invention to provide an improved backgaging mechanism having force sensing finger gaging mechanisms which will facilitate the performance of both backgaging and sidegaging of a workpiece as it is loaded into a die space of a bending apparatus. It is yet a further object of the present invention to provide several improved sensor-based motion control mechanisms for facilitating the accurate control of movement of a robot manipulator and a press brake (and other components) in a bending workstation environment.

The present invention, therefore, is directed to, among other things, an apparatus for aligning a malleable sheet workpiece with respect to a die of a bending apparatus before performing a bend operation on the workpiece. A finger tip is provided for gaging the position of the workpiece with respect to the die, and a mechanism is provided for moving the workpiece toward the finger tip until contact is made between an edge of the workpiece and the finger tip. An adjustment mechanism is provided for adjusting the orientation of the workpiece by rotating the workpiece about the finger tip.

In accordance with an aspect of the present invention, an apparatus is provided for aligning a malleable sheet workpiece with respect to a die of a bending apparatus when loading the workpiece into a die space, before performing a bending. operation on the workpiece. The apparatus includes a gaging finger having a elongated member with a longitudinal axis parallel to or orthogonal to the die. The gaging finger comprises a contact portion that moves with the elongated member, and a mechanism for measuring forces of contact between the workpiece and the contact portion. The forces of contact which are measured may include one or both of a force parallel to the die and a force orthogonal to the die.

In accordance with a further aspect of the present invention, a bending apparatus is provided for performing a bend operation on a malleable sheet workpiece. The bending apparatus may include a die and a tool punch, where the die and tool punch form a die space. A loading mechanism is provided for loading the workpiece into the die space, the loading mechanism comprising substantially rigid gaging fingers, a robot having a gripper, and a control mechanism for controlling the robot to bring the workpiece into contact with the substantially rigid fingers. The gripper holds the workpiece while the robot brings the workpiece into contact with the rigid gaging fingers. The gripper comprises compliant pads and sensing means for sensing when the workpiece contacts the substantially rigid gaging fingers.

In accordance with yet a further aspect of the present invention a bending apparatus is provided for performing a bend operation on a malleable sheet workpiece. The bending apparatus includes a die and a tool punch, which together form a die space. A gaging mechanism is provided which includes at least one gaging finger for gaging a position of the workpiece along a first direction orthogonal to the die and along a second direction parallel to the die. A robot is provided in the bending apparatus, which has a gripper for holding the workpiece. In addition, a mechanism is provided for controlling the robot to bring the workpiece into contact with the at least one gaging finger. The robot gripper may include a gripper force sensor for sensing an amount of force between the workpiece and the robot gripper, and the gaging finger may comprise a finger force sensor for detecting an amount of force between the at least one gaging finger and the workpiece contacting the at least one gaging finger.

The gripper force sensor may comprise means for sensing a shear force acting on an inner surface of the robot gripper due to movement of the workpiece within the gripper, and the finger force sensor may comprise means for sensing both a force in a direction perpendicular to the die and a force in a direction parallel to the die.

In accordance with a further aspect of the present invention, an apparatus is provided for executing a bend on a malleable sheet workpiece with bend following. The apparatus includes a bending apparatus which includes a die, a tool punch, and a robot gripper for holding the workpiece. In this regard, a reading mechanism may be provided for reading a position value indicative of the relative movement of the die with respect to the tool punch. A calculating mechanism may be provided for calculating the location of the gripper as it holds onto the workpiece as a function of the position value read by the reading mechanism. A speed controller may be provided for limiting the speed of the relative movement of the die with respect to the tool punch so that the calculated location does not change too rapidly. The apparatus may be further provided with means for detecting a force between the workpiece and the robot gripper during execution of the bend, means for modifying the location calculated by the calculating mechanism based upon the detected force, and a robot controller for controlling movement of the robot to correspond to the calculated location. In addition, a determining mechanism may be provided for determining if a final bend angle has been reached, signifying completion of the bend.

In accordance with a further aspect of the present invention, an apparatus may be provided for controlling the rate of change of the velocity of a robot gripper holding a workpiece. In this regard, a monitoring mechanism may be provided for monitoring a force between the workpiece and the robot gripper, and a determining mechanism may be provided for determining if the monitored force is greater than or equal a threshold value. A decreasing device may be provided for decreasing the rate of change of the velocity of the workpiece by slowing the acceleration of the robot gripper if the monitored force is determined to be greater than or equal to the threshold value.

In accordance with a further aspect of the present invention, an apparatus is provided for actively damping vibration of a workpiece being held by a robot gripper during movement of the workpiece by a robot. A part geometry parameter reading mechanism is provided for reading the geometry parameters of the workpiece being held by the robot gripper. A force reading mechanism is provided for reading forces between the workpiece and the robot gripper, and a frequency determiner is provided for determining an approximate frequency of vibration of the workpiece based upon the force readings. A robot movement controller is then provided for controlling the robot to move the robot gripper in a direction opposite to the force readings with the frequency determined by the frequency determiner.

In accordance with a further aspect of the present invention, an apparatus is provided for controlling a robot having a robot gripper holding a workpiece, so that the workpiece is moved while maintaining contact between the workpiece and a desired object. A robot controller may be provided to control movement of the robot so that the workpiece moves in a desired direction, and a force between the workpiece and the robot gripper is monitored. Mechanisms are provided in order to determine if the monitored force is within a certain range of a desired contact force between the workpiece and the desired object, and for adjusting the direction of movement of the workpiece to either increase or decrease the contact force. This adjustment is made in order to bring the monitored force within the certain range of the desired contact force.

In accordance with a further aspect to the present invention, an apparatus is provided for controlling movement of a workpiece held by a robot gripper toward an obstacle until the workpiece contacts the obstacle. Mechanisms are provided for controlling movement of the workpiece by a predetermined increment toward the obstacle, and for monitoring an amount of force between the workpiece and the robot gripper. In addition, mechanisms are provided for determining if the monitored force is greater than or equal to a threshold value, and for repeating movement of the workpiece toward the obstacle until it is determined that the monitored force is greater than or equal to the threshold value.

In accordance with yet a further aspect of the present invention, an apparatus may be provided for controlling movement of a workpiece held by a robot gripper, and for detecting an unplanned impact between a workpiece and an obstacle. In this regard, mechanisms are provided for monitoring an amount of force between the workpiece and the robot gripper, and for determining if the monitored force is greater than or equal to an impact threshold value. A mechanism then stops movement of the robot when the monitored force is determined to be greater than or equal to the impact threshold value. The determining mechanism may include a mechanism for determining if the monitored force is greater than or equal to a minor impact threshold value and for determining if the monitored force is greater than or equal to a major impact threshold value. An additional mechanism is provided for modifying the movement of the robot in order to bring the workpiece away from the obstacle when the monitored force is determined to be greater than or equal to the minor impact threshold value but less than the major impact threshold value.

In accordance with yet a further object of the present invention, a system is provided for loading a workpiece into a die space of a bending apparatus. The system includes mechanisms for measuring, with a measuring mechanism, an amount of droop offset of a leading edge of the workpiece before the workpiece is loaded into the die space, moving the workpiece in an upward direction by an amount equal to the measured offset, and loading the workpiece into the die space. The measuring mechanism may comprise a vision-based droop sensor, that may be back-lit. In addition or in the alternative, the measuring mechanism may comprise a mechanism for sensing when each of a plurality of light beams have been intersected by the workpiece as the workpiece is moved toward the die space. In addition, or in the alternative, the measuring mechanism may comprise a single-beam break detecting mechanism for detecting when a single light beam has been broken by movement of the workpiece toward the die space.

In accordance with yet a further aspect of the present invention, an angle sensor is provided for detecting an angle of a flange portion of a workpiece as the flange portion is being bent by a bending apparatus. The angle sensor includes a member having a reflective surface, a holder for holding the member with the reflective surface against the flange portion of the workpiece, and a light emitter for emitting a light beam onto the reflective surface. A light detector is provided for detecting a position of the light beam as the light beam is reflected by the reflective surface. The detected position is indicative of the angle of the flange portion of the workpiece.

In accordance with yet a further aspect of the present invention, a system may be provided for controlling springback of a flange portion of a workpiece as a bend operation is performed by a bending apparatus utilizing a die and a tool punch. The springback control system may include mechanisms for measuring an angle of the flange portion of the workpiece as a bend is being performed, and for calculating a predicted amount of springback expected to occur in the flange portion after completion of the bend operation.

The above-listed and other objects, features, and advantages of the present invention will be more fully set forth hereinafter.

BRIEF DESCRIPTION OF THE DRAWINGS

The present invention is further described in the detailed description which follows, by reference to a plurality of drawings by way of non-limiting examples of illustrative embodiments of the present invention, in which like reference numerals represent similar parts throughout the several views of the drawings, and wherein.

DETAILED DESCRIPTION OF THE ILLUSTRATIVE EMBODIMENTS

1. Backgaging

Figure 5:
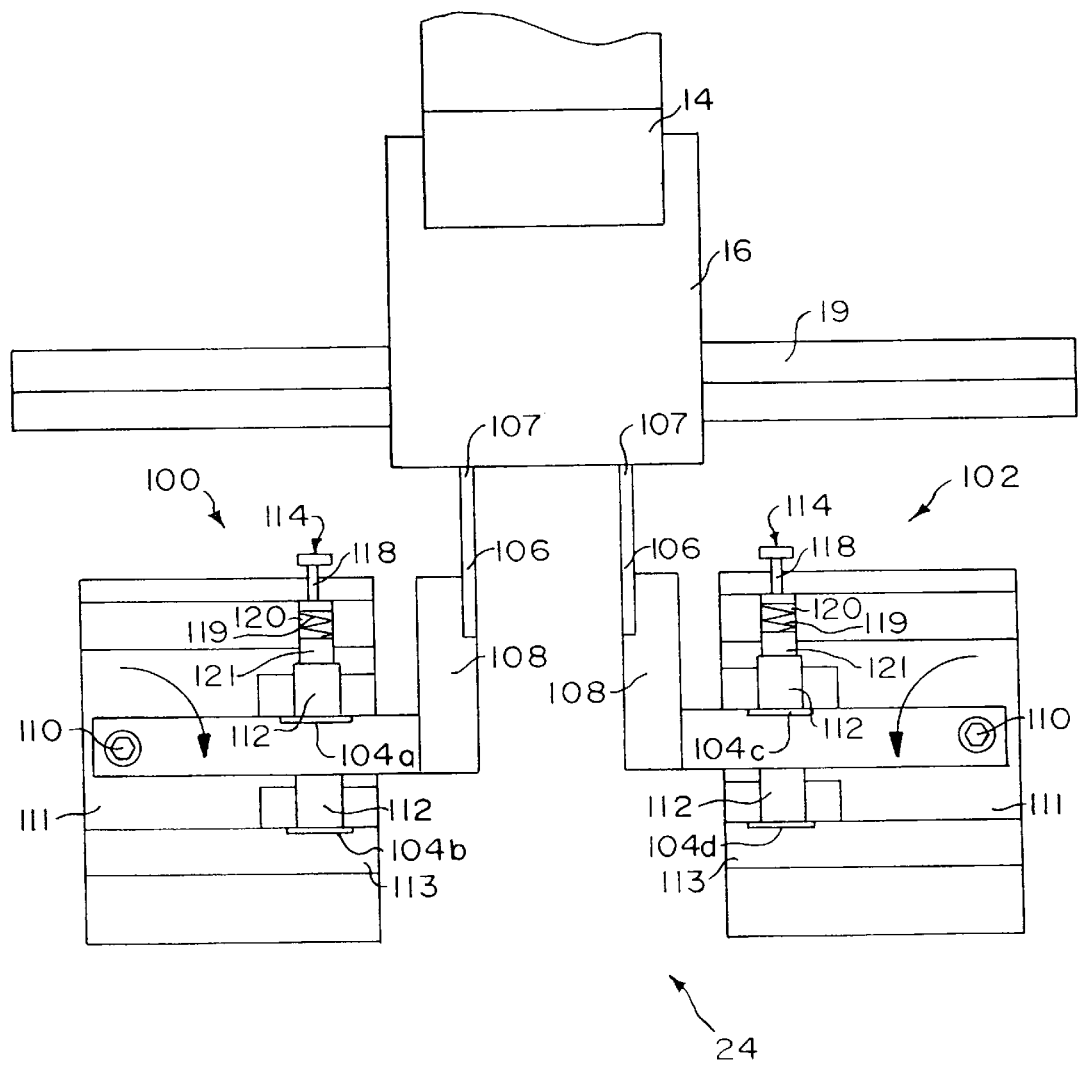
FIG. 5 illustrates a backgaging mechanism of an embodiment of the present invention including both left and right finger gaging mechanisms.

Referring now to the drawings in greater detail, FIG. 5 shows an illustrative embodiment of a backgaging mechanism that may be provided in the present invention, including both left and right finger gaging mechanisms. A workpiece 16 is being front-loaded into a die space, over a die 19. The workpiece 16 is held by a robot gripper 14, and is brought into contact with each of fingers 106 of a left finger gaging mechanism 100 and a right finger gaging mechanism 102.

Each of the illustrated finger gaging mechanisms 100, 102 includes a finger 106, which may be formed with hardened steel, and L-shaped arm 108, which may be formed with aluminum. Each L-shaped arm 108 is moveable about a pivot point 110 and is rotatably mounted (at the pivot point) on a finger gaging support base 111.

Each of the finger gaging mechanisms 100, 102 further includes a pair of force sensitive resistors 104, which are used as sensing elements. Each force sensitive resistor 104 is maintained at a constant force between a plastic push rod 112 and a flat aluminum surface. The force sensitive resistors 104a and 104c, which are located closer to die 19, are each positioned between a plastic push rod 112 and a flat vertical surface of L-shaped arm 108. The remaining force sensitive resistors 104b and 104d are each positioned between a plastic push rod 112 and a flat vertical surface of a bracing member 113 which is fixed to finger gaging support base 111. The force sensitive resistors 104 are each maintained at a constant force against their respective abutting surfaces by the acting force of a spring pre-load adjustment mechanism 114 which each act on a push rod 112 located on an inner side of an L-shaped arm 108.

Each spring pre-load adjustment mechanism 114 may be provided with a threaded adjustment screw 118, which can be utilized to adjust the tension of a spring 119 provided within a spring chamber 120. Spring 119 is brought into contact with a translating member 121 which in turn is in direct contact with a push rod 112.

Each of L-shaped arms 108 is configured to rotate about a pivot point 110. Accordingly, they are each moveable in the direction of (or opposite to) the arrows indicated in FIG. 5. Because of the use of the L-shaped arms 108, force sensitive resistors 104 can sense forces acting on fingers 106 in both a direction perpendicular to die 19, and parallel to die 19. The forces acting upon fingers 106, by workpiece 16 approaching the fingers in the manner illustrated in FIG. 5, are normal to the die 19.

A force is detected by each of the force sensitive resistors 104 due to an increase in pressure causing a decrease in resistance in each of the sensors. Each of finger gaging mechanisms 100, 102 is provided with a pair of force sensitive resistors 104 in order to measure force utilizing a differential scheme, in order to minimize sensitivity to pre-load forces, FSR creep, and FSR hysteresis.

A plurality of various members and/or surfaces are indicated on each of the finger gaging support bases 111 of the respective left and right finger gaging mechanisms 100 and 102. The most important members that are placed on finger gaging support base 111 include L-shaped arms 108, and bracing members 113. Each of these members may be aluminum members. The remaining members/surfaces on the finger gaging support base 111, shown in FIG. 5, do not have to be in the precise shape and location illustrated in FIG. 5. Accordingly, such members are not described in detail herein. It is important, as will be appreciated by the artisan, that each of push rods 112 be placed in a relatively stable position so that they each move in a direction normal to the vertical surfaces with which they come into contact. In addition, an appropriate support mechanism should be provided so that each spring pre-load adjustment mechanism 114 is appropriately fixed with respect to finger gaging support base 111, and can move freely in a direction perpendicular to die 19, toward push rods 112, and can be adjusted by rotation of adjustment screws 118.

Figure 6:
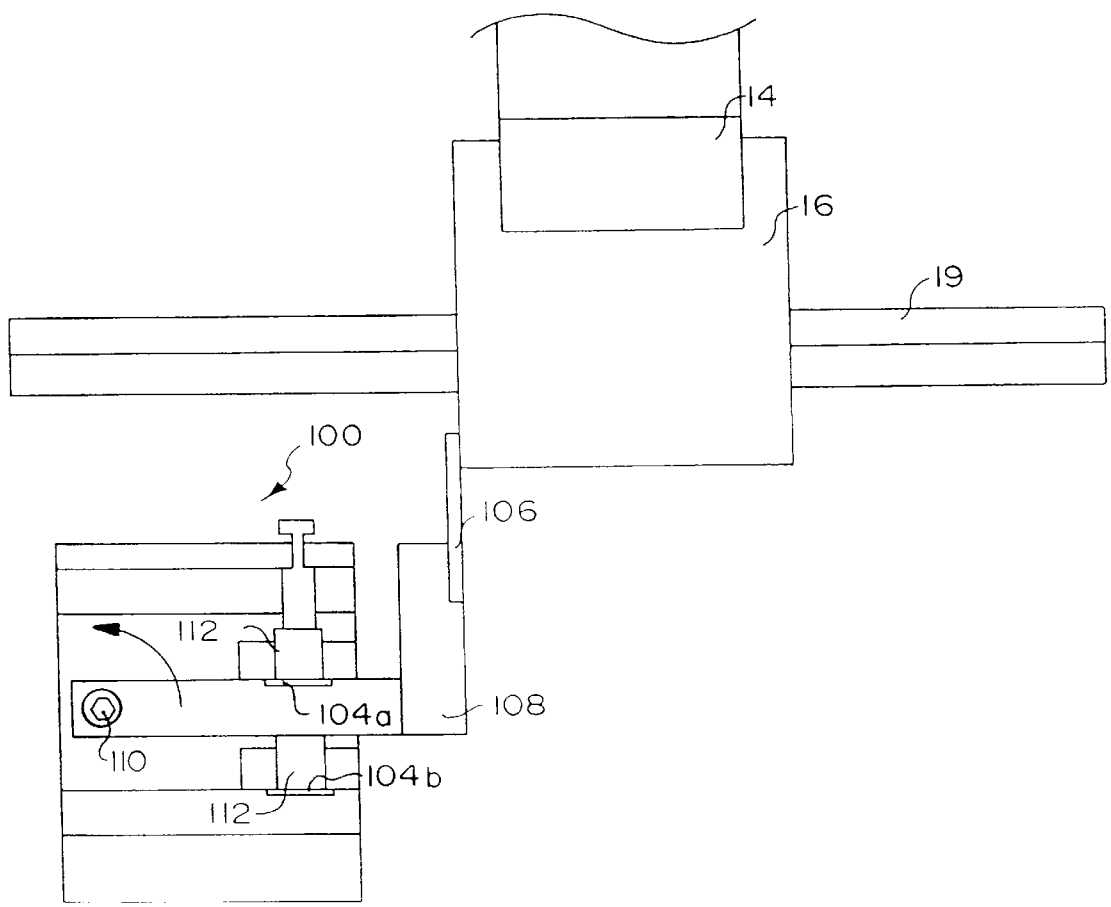
FIG. 6 illustrates a left finger gaging mechanism performing X-gaging.

FIG. 6 illustrates a single finger gaging mechanism 100, which is identical in configuration to the left finger gaging mechanism 100 illustrated in FIG. 5. The illustrated finger gaging mechanism 100 is being utilized for X-gaging (i.e., side-gaging) when side-loading a workpiece 16 into a die space. When workpiece 16 comes into contact with gaging finger 106, in the manner shown in FIG. 6, L-shaped arm 108 moves in the direction of the arrow shown in FIG. 6. The resultant force measured is equal to the force value produced by sensor 104a minus the force value produced by sensor 104b. It is preferred that the tolerances of the relative positions of the L-shaped arms 108 and push rods 112 be tight, so that gaging fingers 106 will only move by a small amount in a direction orthogonal to die 19 or parallel to die 19. In this regard, the finger gaging mechanism 100 may be configured so that there is a maximum finger travel of approximately of 0.003 inches a direction perpendicular to die 19.

Each of pivot points 110 of L-shaped arms 108 may be formed with a well known bearing mechanism, or by means of a bolt, driven through a cylindrical opening within each of arms 108 and fixed to finger gaging support base 111. The particular manner in which the pivot mechanism is implemented is not critical to the invention, except that the pivot mechanism should not produce friction which might affect the resultant force readings given by the differential force sensitive resistors in each of the finger gaging mechanisms 100, 102.

Figure 7:
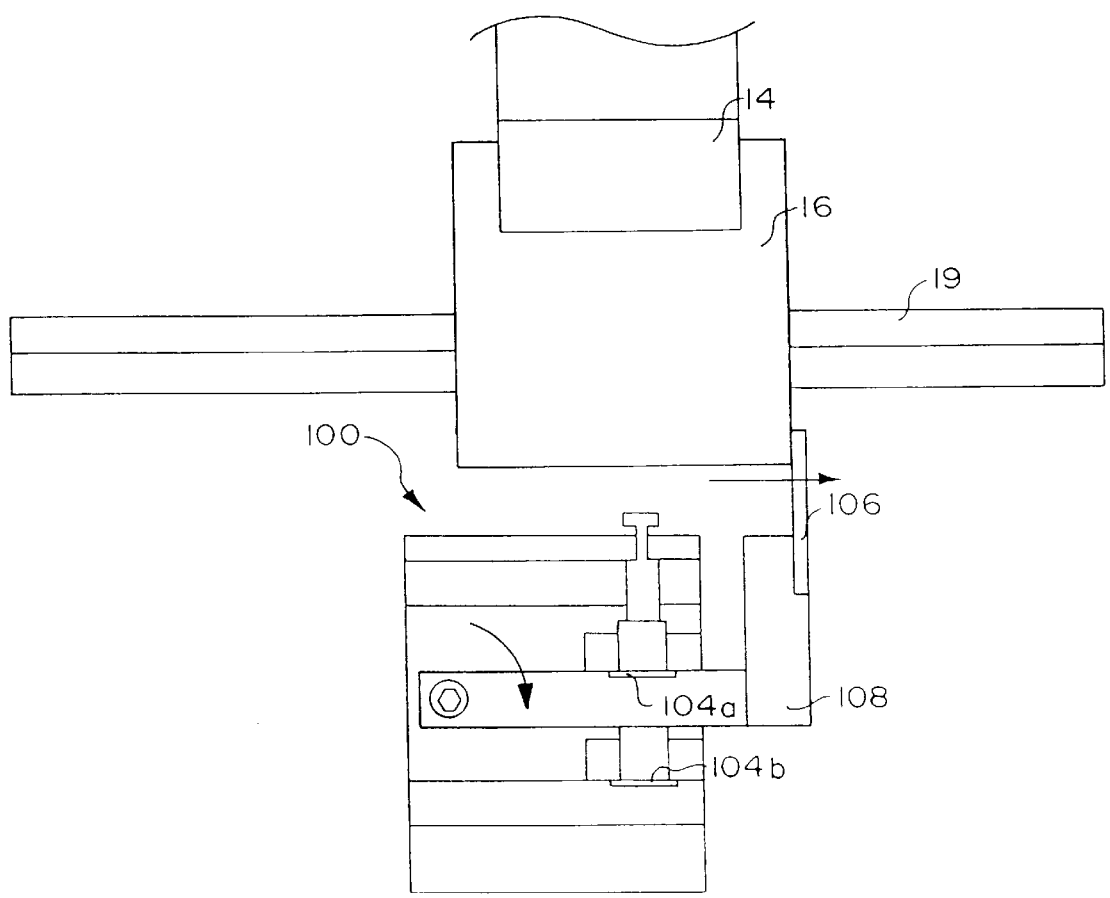
FIG. 7 illustrates a left finger gaging mechanism performing X-gaging.

FIG. 7 illustrates finger gaging mechanism 100, with workpiece 16 being loaded into the die space of die 19 from a side opposite to that shown in FIG. 6. FIGS. 5–7 illustrate the versatility of the illustrated finger gaging mechanism in that it can accommodate force measurements in either direction parallel to die 19, and/or also in a direction perpendicular to die 19 (in the manner illustrated in FIG. 5). When workpiece 16 comes into contact with gaging finger 106 in the manner shown in FIG. 6, L-shaped arm 108 moves in the direction shown by the arrow. The resultant force which is measured is equal to the force of sensor 104a minus the force determined by sensor 104b.

Each of the force sensitive resistors may comprise an FSR, with model number 302 (½" circle on ULTEM material) by Interlink Electronics, 546 Flynn Road, Camarillo, Calif. 93012 (805-484-8855).

Figure 8A:
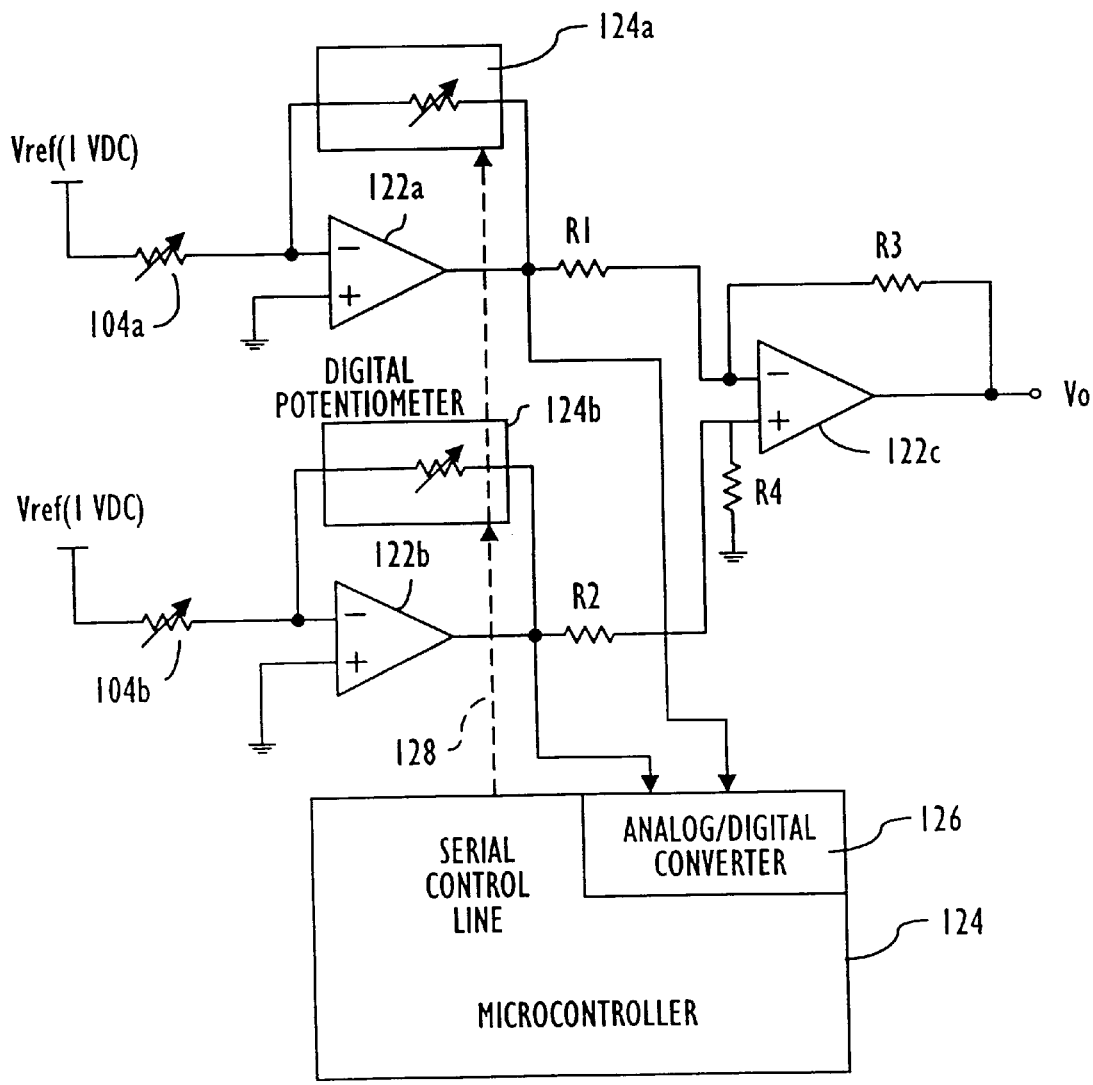
FIGS. 8A and 8B illustrate alternate force sensing circuits for use with the backgaging mechanism illustrated in FIG. 5.

FIG. 8A illustrates a force sensing circuit which may be utilized in connection with each of the left and right finger gaging mechanisms 100, 102 illustrated in FIG. 5. The force-sensing circuit illustrated in FIG. 8A corresponds to the left finger gaging mechanism 100, and thus includes force sensitive resistors 104a and 104b. Each of force sensitive resistors 104a and 104b is connected between a reference voltage (1 volt DC) and an inverting input of a respective operational amplifier (122a and 122b). A digital potentiometer 124a, which may be digitally controlled by a serial control line 128, is connected between the inverting input of operational amplifier 122a and the output terminal of the operational amplifier 122a. Similarly, a digital potentiometer 124b is connected between the inverting input of operational amplifier 122b and the output of the same. The non-inverting input of each of the operational amplifiers is connected directly to ground. The outputs of operational amplifiers 122a and 122b are connected to an analog-to-digital converter 126. In addition, the output of operational amplifier 122a is connected, via resistor R1, to an inverting input of a third operational amplifier 122c and the output of operational amplifier 122b is connected, via resistor R2, to a non-inverting input of the third operational amplifier 122c. A resistor R4 is connected between the non-inverting input of third operational amplifier 122c and ground. Another Resistor R3 is connected between the inverting input of operational amplifier 122c and the output of the same.

Microcontroller 124 reads the no-load voltage output from each force sensitive resistor (FSR), via the A/D converter, and produces a resulting force value at output terminal $V_o$. The microcontroller centers and balances the two no-load FSR voltages by adjusting the gain of each amplifier 122a and 122b with the use of digital potentiometers 124a and 124b, respectively. Microcontroller 124 may also perform a loaded calibration while one or both of fingers 106 is touching a reference point, such as die rail 19.

Figure 8B:
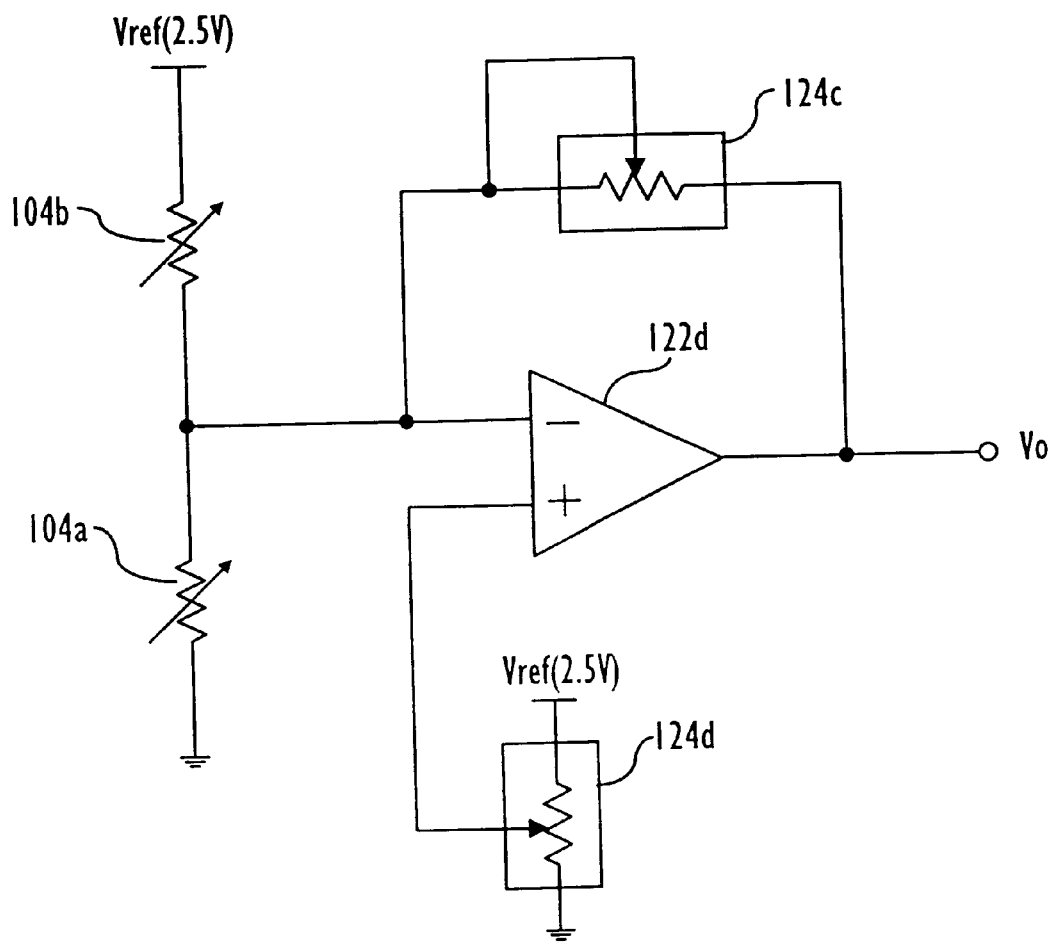

FIG. 8B illustrates an alternative force sensing circuit which allows the automatic adjustment of sensitivity as well as accurate force readings. This alternative circuit may be utilized in connection with each of the left and right finger gaging mechanisms 100, 102 illustrated in FIG. 5. The force-sensing circuit illustrated in FIG. 8B corresponds to the left finger gaging mechanism 100, and thus includes a front force sensitive resistor (FSR) 104a and a rear force sensitive resistor (FSR) 104b. The circuit includes an operational amplifier 124c and two digitally controlled potentiometers 124c, 124d. Rear FSR 104b is connected between a reference voltage (e.g., 2.5 volts DC) and an inverting input of operational amplifier 122c, and front FSR 104a is connected between the inverting input and ground.

A first digital potentiometer 124c, which may be digitally controlled (by a serial control line (not shown)), is connected between the inverting input of operational amplifier 122c and the output terminal of operational amplifier 122c. The wiper terminal of potentiometer 124c is connected to one side of the potentiometer to form a variable resistor. A second digital potentiometer 124d is connected between a reference voltage (e.g., 2.5 volts D.C.) and ground. The wiper terminal of potentiometer 124d is connected to the non-inverting input of the operational amplifier 122d to form a voltage divider which provides an adjustable offset voltage.

The two FSR's are connected in series so that they act as a voltage divider. The operational amplifier 124c amplifies and shifts the voltage seen at the node where the two FSR's connect. The gain of operational amplifier 124c may be varied by adjusting the resistance value of the first digital potentiometer 124c, and the offset voltage of operational amplifier 124c may be varied by adjusting the second digital potentiometer 124d which serves as a voltage divider. The first and second digital potentiometers may be provided in respective channels of a two channel digitally-controlled potentiometer, such as a DS1267 from Dallas Semiconductor, 4401 S. Beltwood Parkway, Dallas, Tex. 75244. It is noted that the offset voltage connected to the non-inverting input of operational amplifier 122d may be alternatively provided by a D/A converter, which may allow a finer adjustment of the offset voltage.

By providing this circuit arrangement, two adjustment mechanisms are available. The sensitivity of the force sensing circuit may be adjusted by adjusting the first digital potentiometer 124c; and the zero-force output voltage (present at Vo when there is no force acting on the finger) may be adjusted by adjusting the offset voltage by means of second digital potentiometer 124d (or by means of another adjustable DC voltage source, such as a D/A converter, as noted above).

By providing digitally controllabe adjustment mechanisms in the circuit illustrated in FIG. 8B, the sensitivity and zero force level of the force sensing circuit may each by adjusted automatically.

Figure 1:
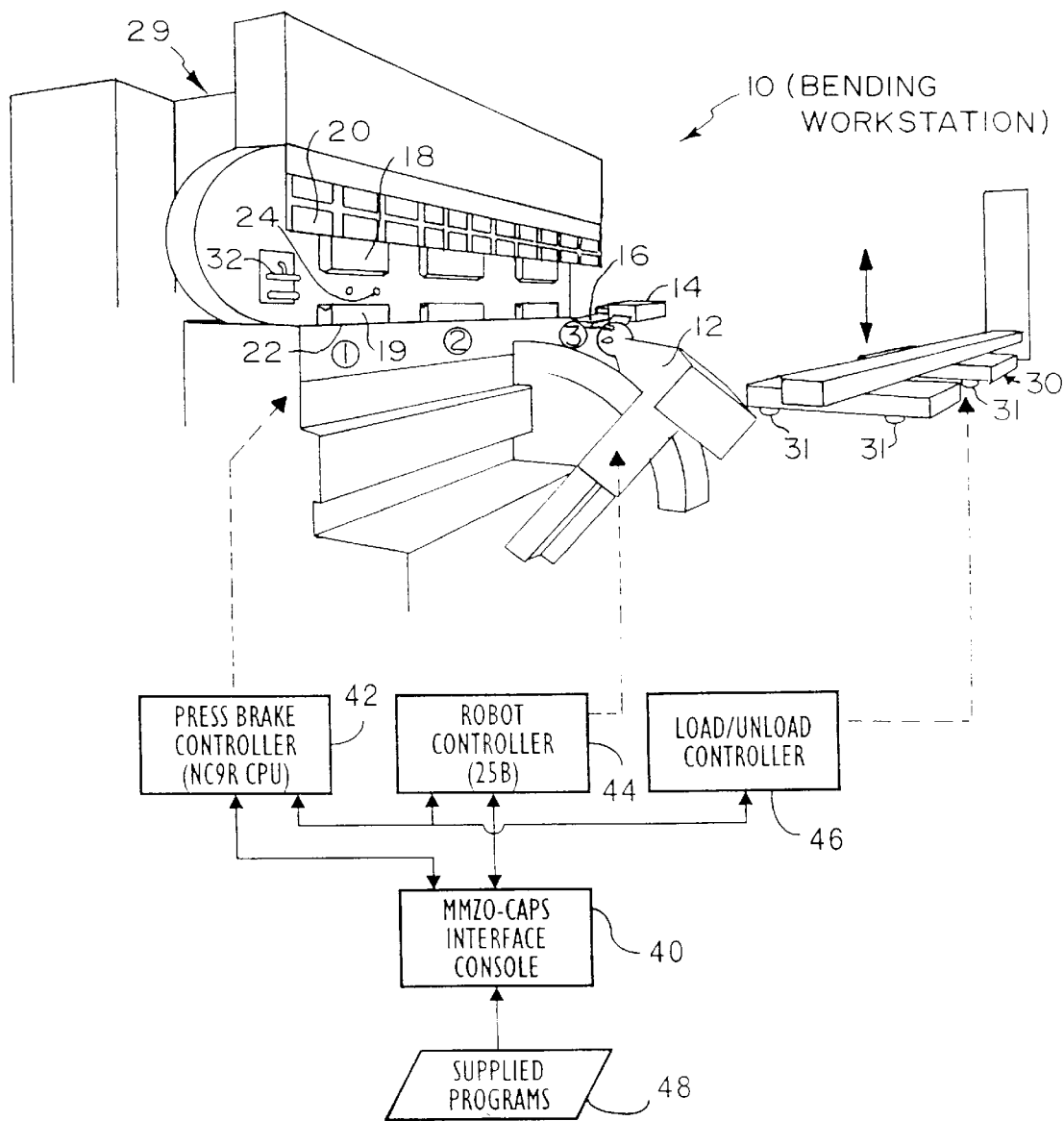
FIG. 1 illustrates a prior art Amada BM100 bending work station.
Figure 2:
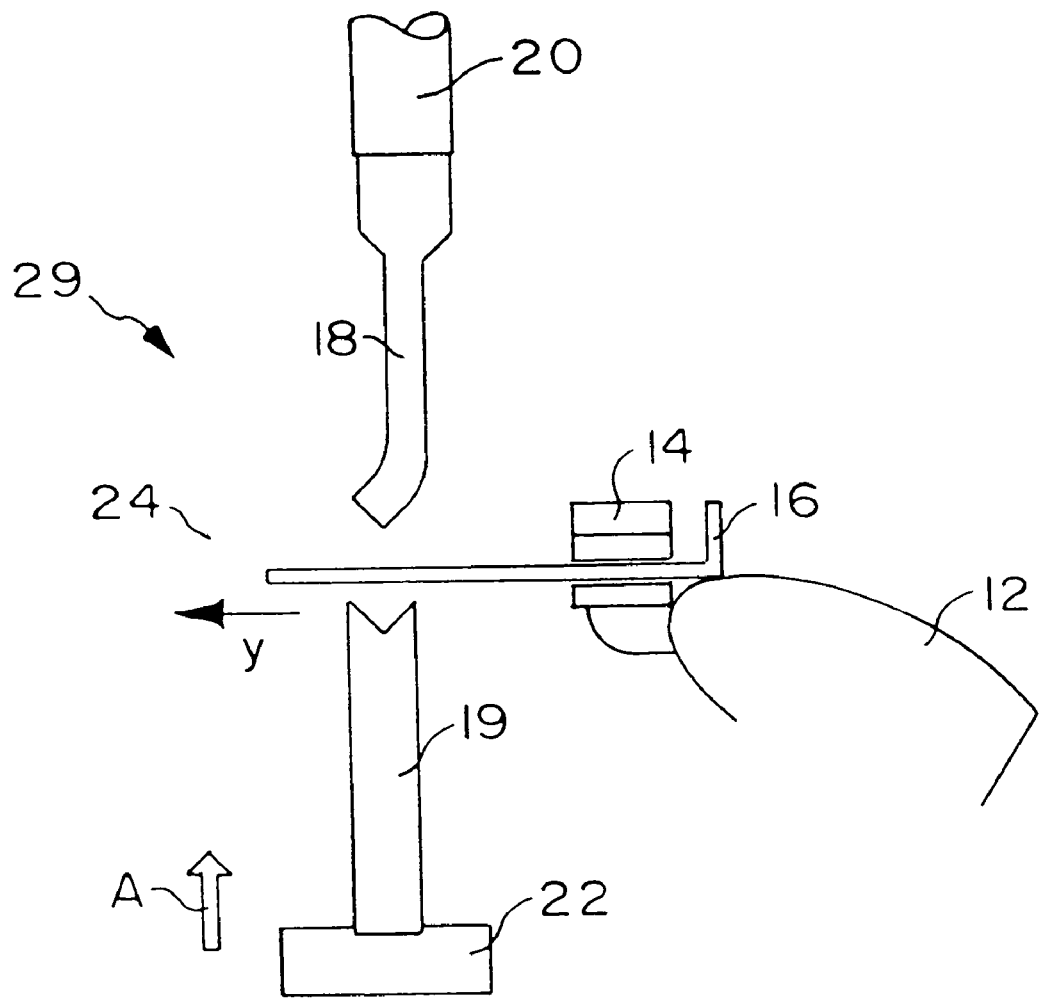
FIG. 2 illustrates a side view of a die space.
Figure 3:
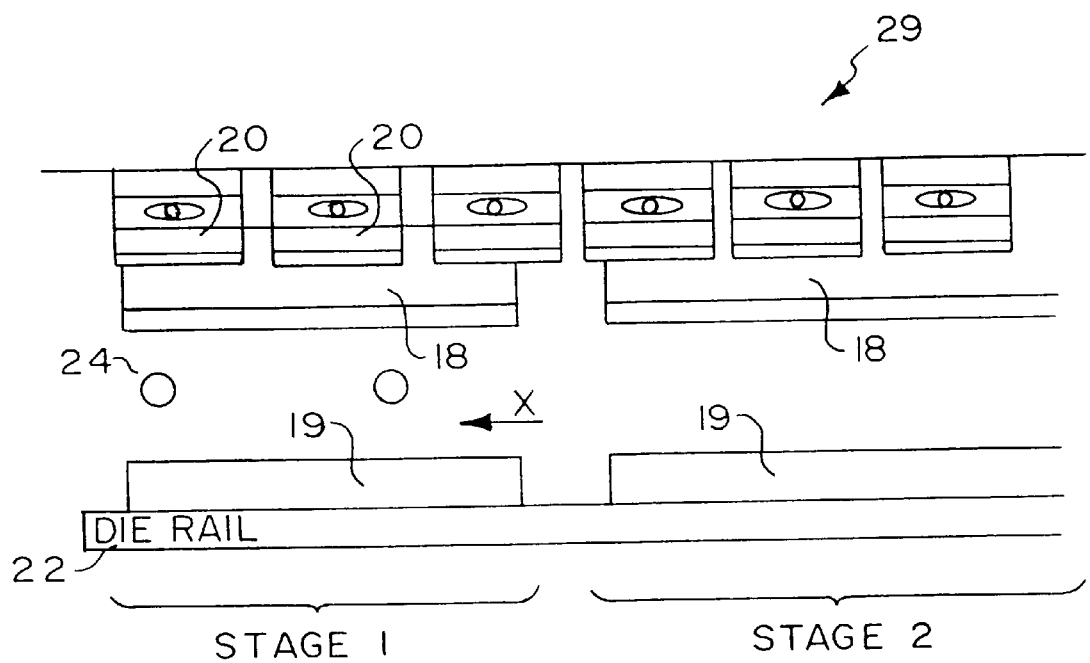
FIG. 3 illustrates a front view of a die space.
Figure 4:
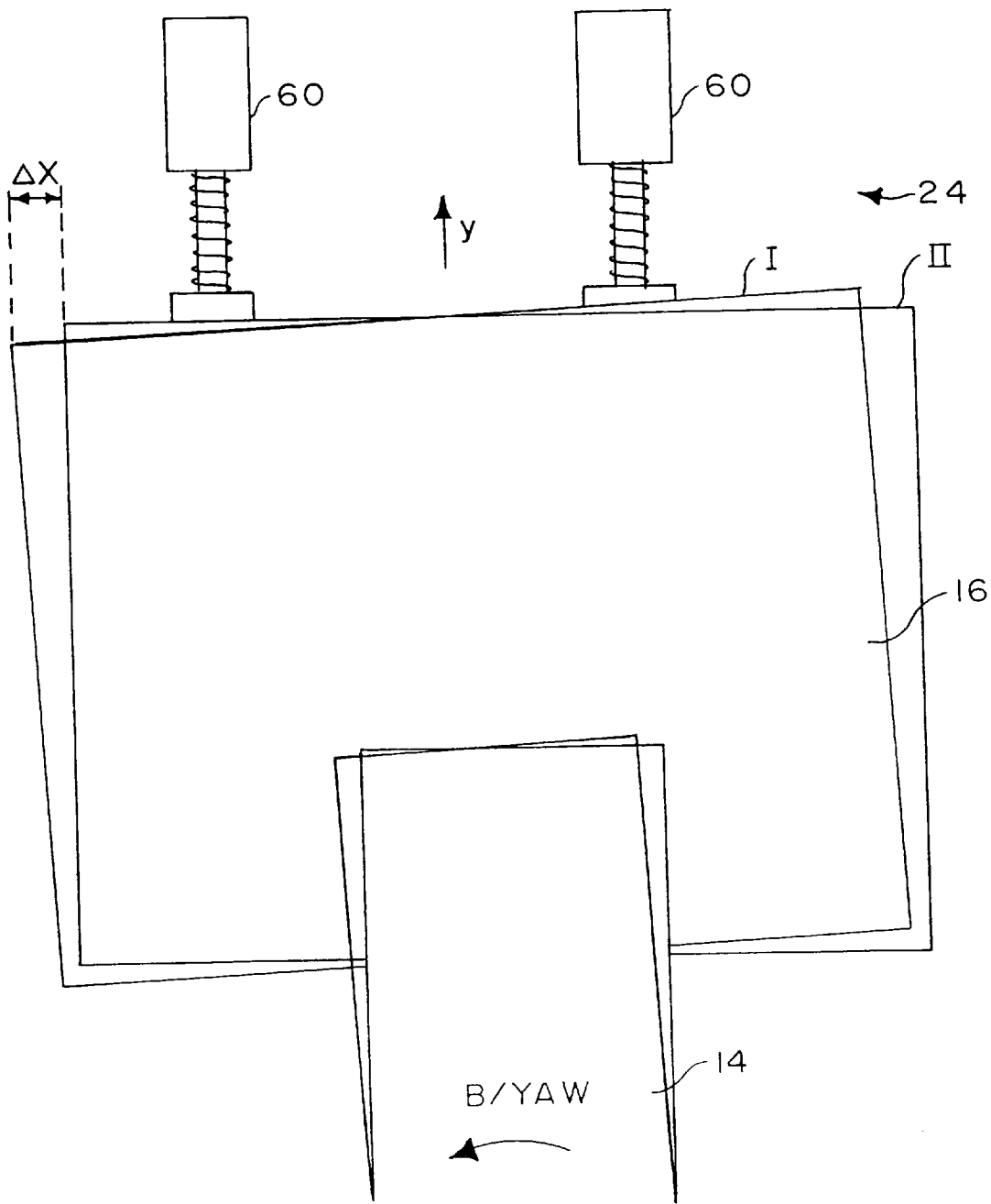
FIG. 4 illustrates a prior art backgaging mechanism with a workpiece being aligned.
Figure 9:
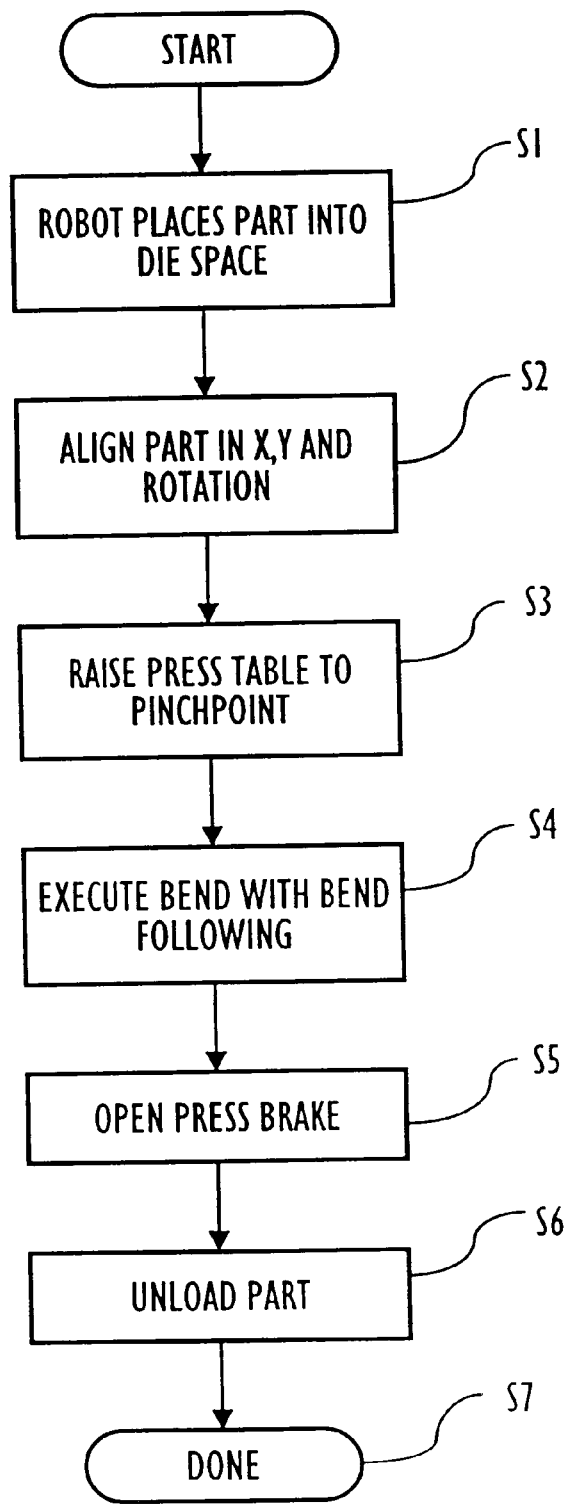
FIG. 9 is a flow chart of a bending process preformed by a bending work station such as that illustrated in FIG. 1.

FIG. 9 is a flow chart illustrating the general steps of a bending process to be performed by a bending apparatus as illustrated in FIG. 1. In a first step S1, the robot places a part into the die space. In the next step S2, the part is aligned in the x, y and rotation (orientation) directions. Then, in step S3, the press table is raised until the part reaches its pinch point between the die and the tooling punch. In step S4, the bend is executed with bend following (i.e., with the gripper firmly grasping the workpiece as it is being bent by the bending apparatus). In step S5, the press brake is opened, and in step S6, the bent workpiece is unloaded. The bend operation is then done as indicated at step S7.

Figure 10:
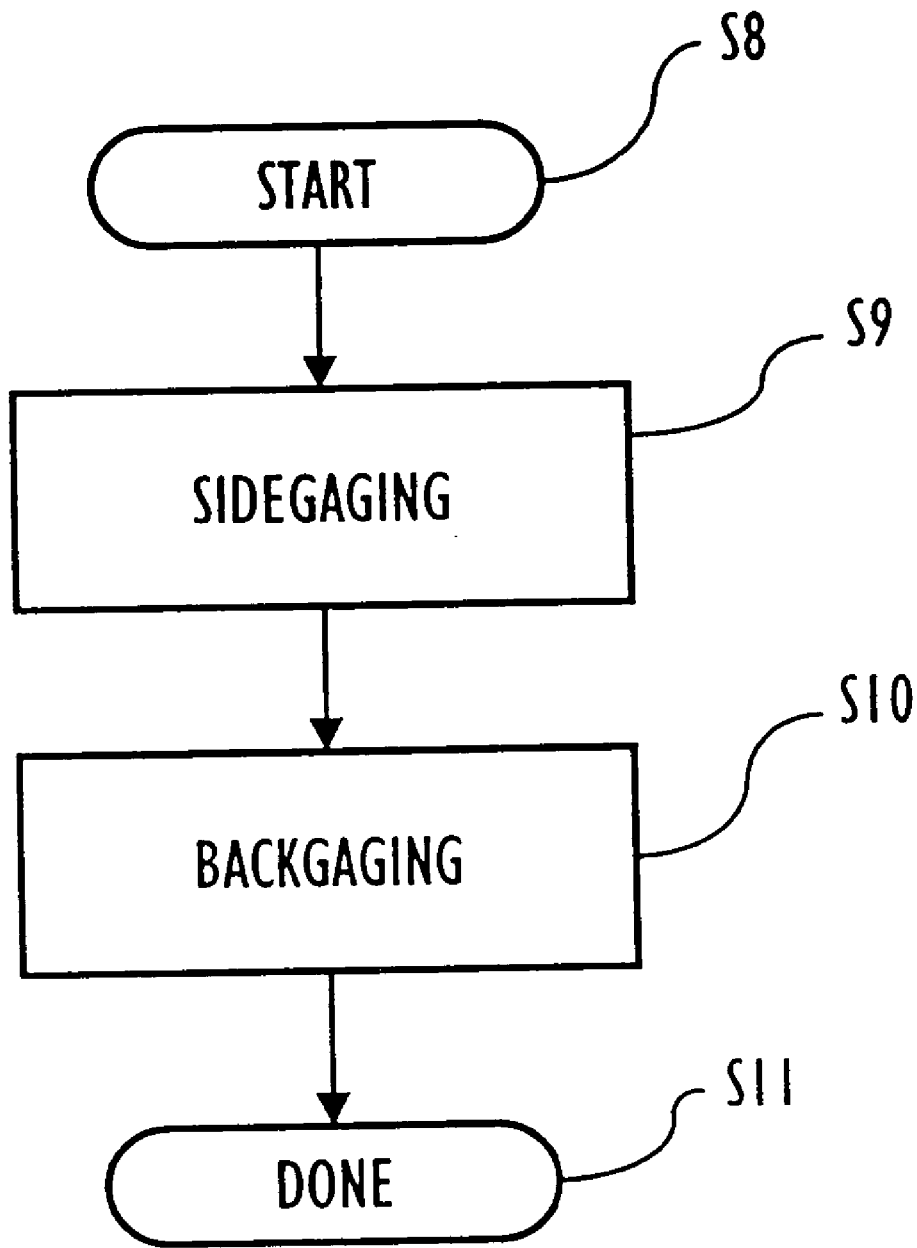
FIG. 10 is a flow chart of the main steps of an alignment process.

FIG. 10 illustrates a flow chart of the main steps of an alignment process, which includes both sidegaging (in the X direction, which is parallel to the die of the bending apparatus) and backgaging (in the Y direction, which is perpendicular to the die). The bending process relating to the alignment of a part starts at step S8, and performs sidegaging in step S9. After sidegaging is performed, the part is now in its appropriate location along the X axis. In step S10, backgaging is then performed, which adjusts the part's position in the Y direction. The alignment process is then done as indicated at step S11. Although the sidegaging step S9 is before the backgaging step S10, it is not imperative that the order of steps S9 and S10 be as illustrated in FIG. 10. The backgaging may be performed before or even simultaneously with sidegaging when aligning a part. When performing backgaging step S10, with the use of a double finger gaging mechanism architecture as shown in FIG. 5, the Y position of the part, along with its orientation/rotation with respect to the die rail, may be simultaneously determined and adjusted.

Figure 11:
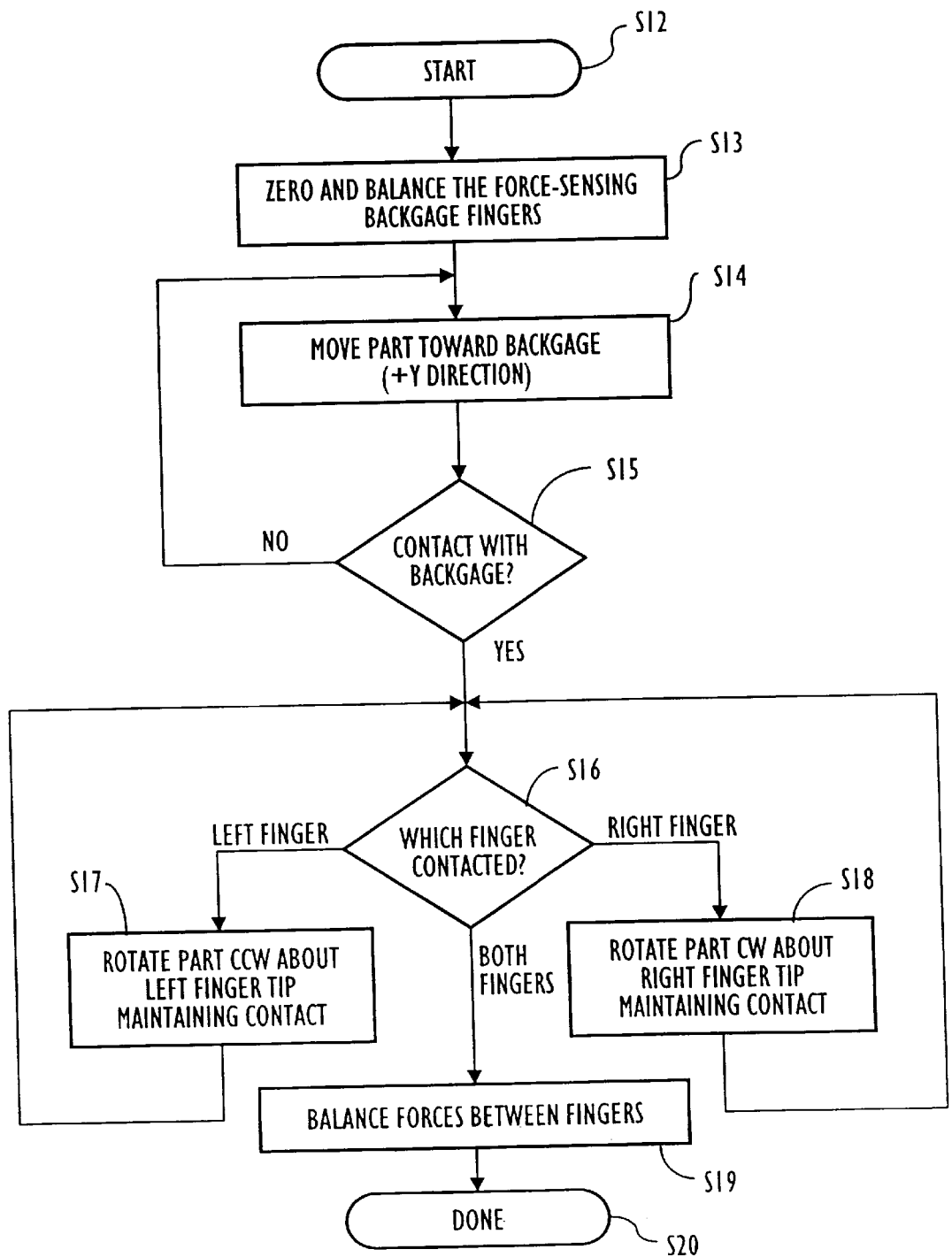
FIG. 11 is a flow chart of a first embodiment backgaging process.

FIG. 11 illustrates an example process which may be performed in aligning a workpiece in a backgaging direction i.e., in the Y direction which is perpendicular to a die rail of a bending apparatus. The backgaging process starts at step S12, and in step S13, the force-sensing backgage fingers are zeroed and balanced. Then, in step S14, the part is moved toward the backgage (+Y direction). A determination is then made in step S15 as to whether the part has come into contact with the backgage mechanism, i.e., one or both of the gaging fingers 106 of the mechanism shown in FIG. 5. If the part has not come in contact with a backgaging finger, the process returns to step S14, where the part is then again moved in the same direction toward the backgage mechanism. If the part has come into contact with the backgage mechanism, the process proceeds from step S15 to step S16, which determines which finger (i.e., the left or the right) has been contacted. If the right finger has been contacted, the process proceeds to step S18 at which point the part will be rotated in the clockwise direction about the finger tip 107 of the right finger 106, while maintaining contact between the part 16 and the right finger tip. The process then returns to step S16, at which point a determination is then made as to which finger is contacted. If both fingers are then contacted, the process proceeds from step S16 to step S19, in which the forces being exerted on each of the left and right fingers 106 are balanced. At that point, the process for performing backgaging is complete as indicated at step S20.

If it is determined in step S16 that the left finger is the only finger which has been contacted, then the part will be rotated in a counterclockwise direction about the left finger tip 107, while maintaining contact between the part and the finger tip 107 of the left finger 106. The process then returns to step S16 after performance of step S17. It is noted that in calculating and controlling how the part is rotated about the finger tip, the center of rotation of the part is determined to be at a position within the finger tip which corresponds to the center point of the outer radius of the finger tip.

Figure 12:
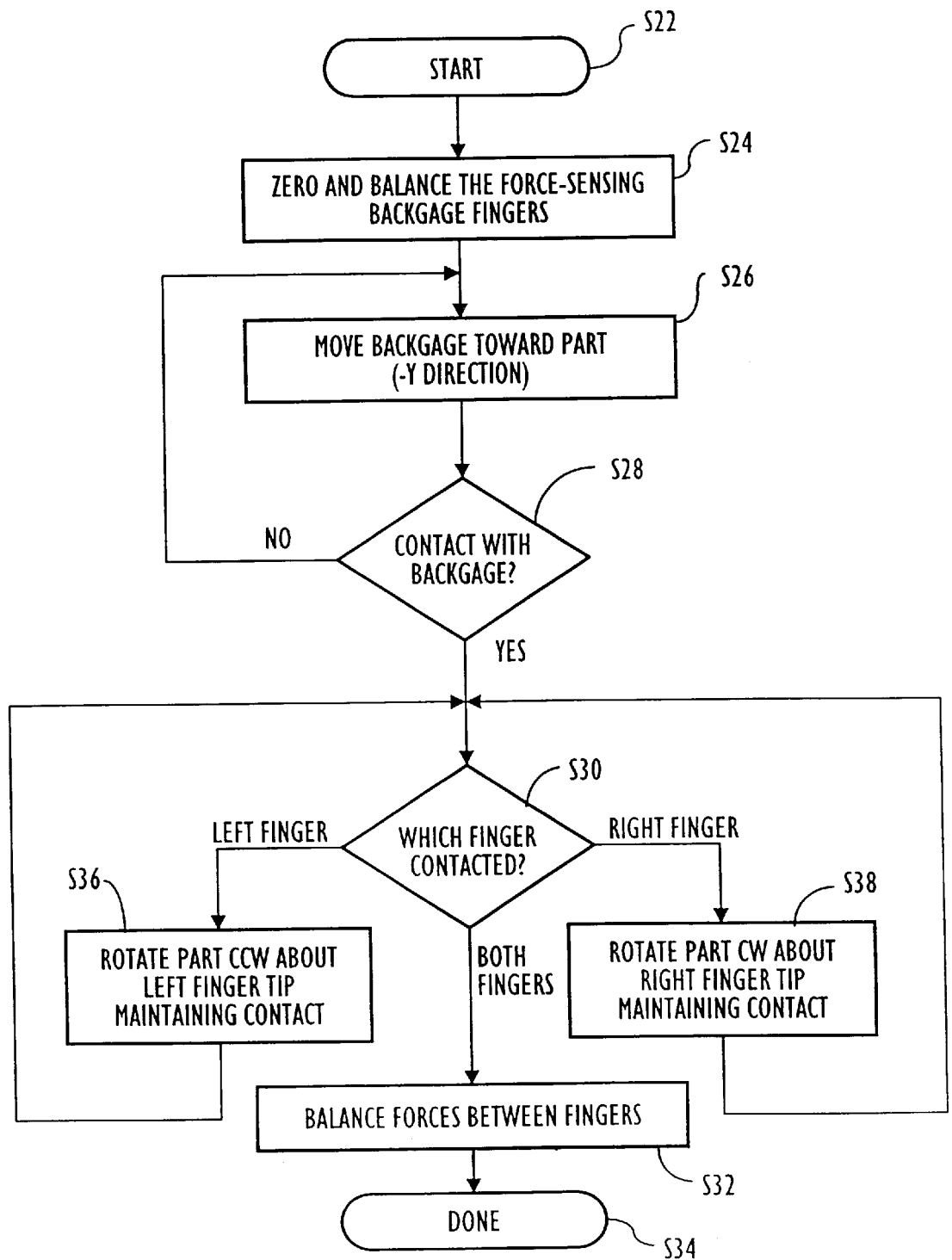
FIG. 12 is a flow chart of a second embodiment backgaging process.

FIG. 12 is a flow chart of a second embodiment backgaging process. Upon starting of the backgaging process at step S22 the process proceeds to step S24, where the force-sensing backgage fingers are zeroed and balanced. Then, in step S26, the backgage is moved toward the part (in the Y direction). In step S28, a determination is made as to whether or the not the part has come into contact with the backgage mechanism. If not, the process returns to step S26 where the backgage is again moved. Once the part has come into contact with the backgaging mechanism, the process proceeds to step S30. In step S30, a determination is made as to which finger has been contacted. If both fingers have been contacted, then the forces between the fingers are balanced in step S32, and the process is finished at step S34. If, however, either the left or the right finger has been contacted as determined in step S30, and either of the steps S36 or step S38 is performed, the process is returned to step S30 for an additional determination as to which finger is contacted. The main difference between the backgaging processes illustrated in FIGS. 11 and i2, is that the backgaging process in FIG. 12 is performed by moving the backgage toward the part, in step 26, as opposed to moving the part toward the backgage in step S14 of the flow chart of FIG. 11.

Figure 13:
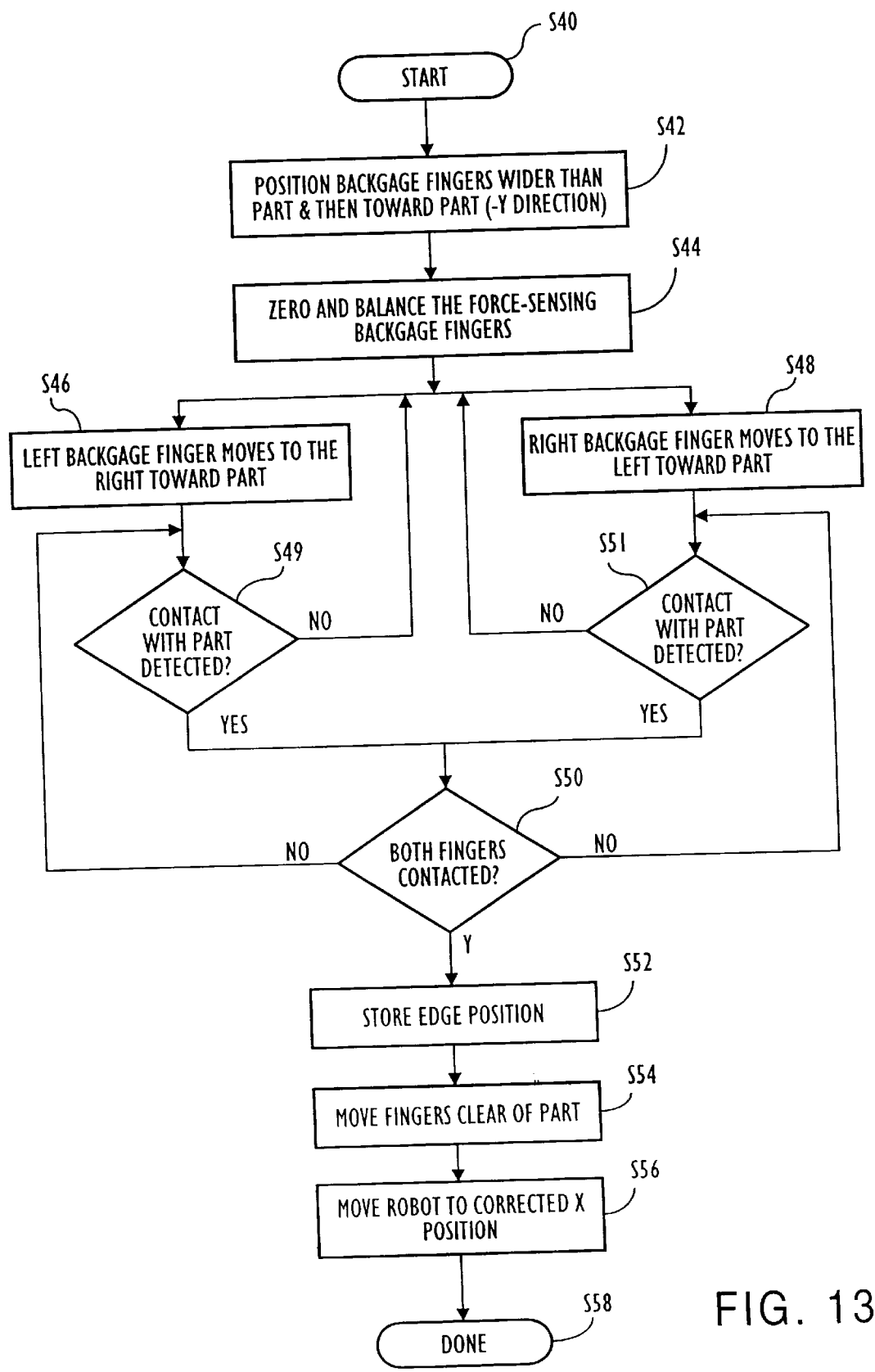
FIG. 13 is a flow chart of a first embodiment sidegaging process.

FIG. 13 illustrates a process for performing sidegaging, in which the backgage fingers are moved toward the part, and the fingers of both the left and right finger gaging mechanisms 100, 102 are utilized. The sidegaging process begins at step S40, and continues to step S42 at which point the backgage fingers are positioned to be wider than the part and then moved toward the part (in the –Y direction). In step S44, the force-sensitive resistors in the backgage fingers are zeroed and balanced. Each of the left and the right backgage fingers are then simultaneously moved toward the part in steps S46 and S48. When the left backgage finger contacts the part, as determined in step S49, the process proceeds to step S50. When the right backgage finger contacts the part as determined in step S51, the process then proceeds directly to step S50. In step S50, a determination is made as to whether both fingers have contacted the part. Once this occurs, the process proceeds to step S52, where the edge position information is stored based upon the position of each of the left and right backgage fingers when they contact their respective sides of the part. The fingers are then moved clear of the part in step S54, and the robot is moved to its corrected X position in step S56. The process is then done as indicated at step S58.

Figure 14:
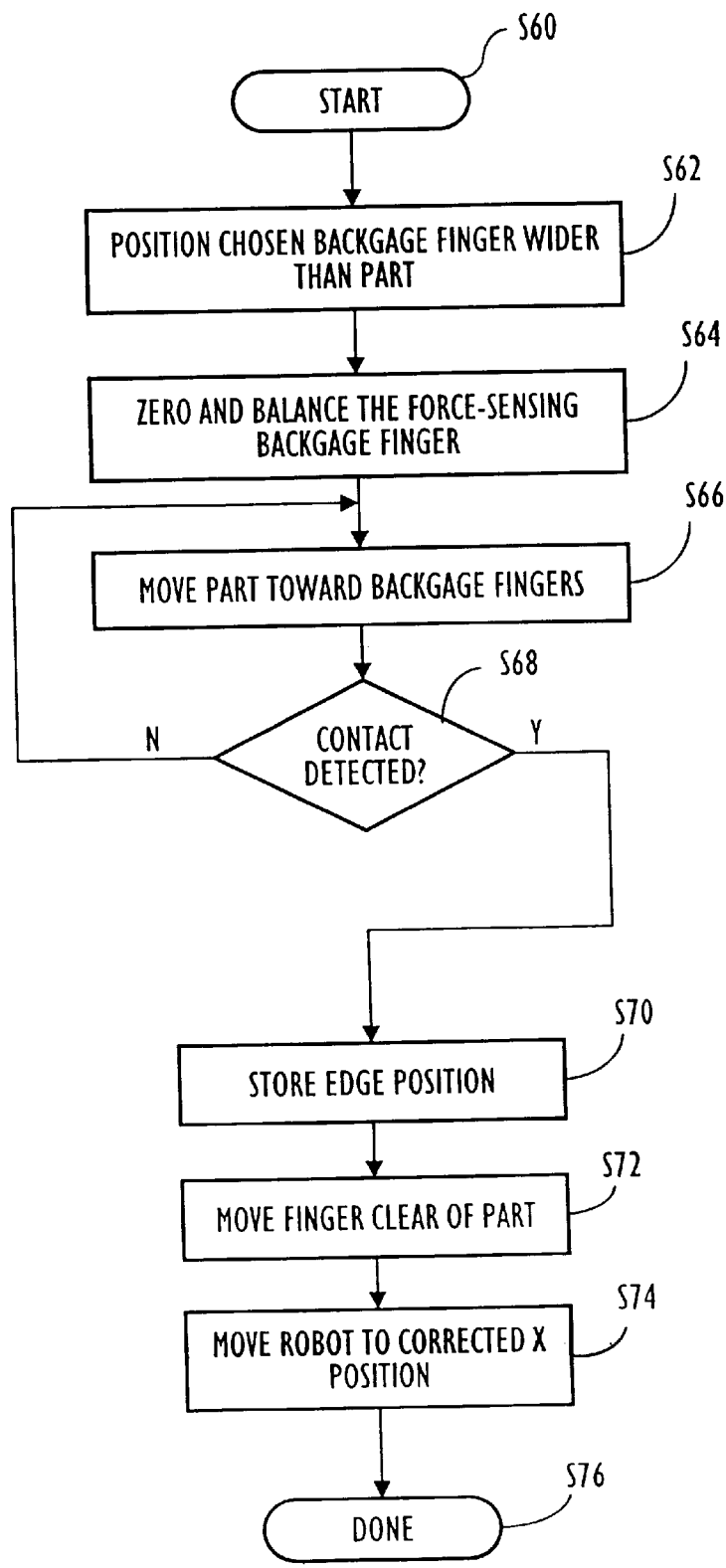
FIG. 14 is a flow chart of a second embodiment sidegaging process.

FIG. 14 is an additional flow chart of a second embodiment sidegaging method of the present invention. In step S60, the sidegaging process is started. In step S62, a chosen backgage finger (which may be either of the left or right backgage fingers in the mechanism shown in FIG. 5) is positioned to be wider than or to the side of the part. Then, in step S64, the force-sensing backgage finger is zeroed and balanced. In step S66, the part is then moved toward the backgage finger. A determination is then made in step S68 as to whether a contact is detected between the backgage finger and the part. Once a contact is detected, the process proceeds to step S70 where the appropriate edge position of the part is stored. The finger is then moved clear of the part in step S72, and the robot is moved to its corrected X position in step S74. The process is then done as indicated at step S76.

2. Sensor-Based Control

Several different types of sensor-based control modules may be provided which can be called upon by a robot task module provided in sequencer/control module for controlling a bending apparatus, such as the one illustrated in FIG. 1 of the present application. Such sensor-based control modules may include a bend following module, a speed control module, a module for actively damping vibration, a module for performing compliant-part loading, a module for performing droop sensing and for correcting droop offsets, a module for performing impact detection (of unplanned collisions), a module performing a guarded move (moving a robot with a workpiece toward an intended object to be impacted), and a module for performing active compliance/contact control (which includes, e.g., gliding along an obstacle such as die rail, and pressing against various backgage sensors).

Figure 15:
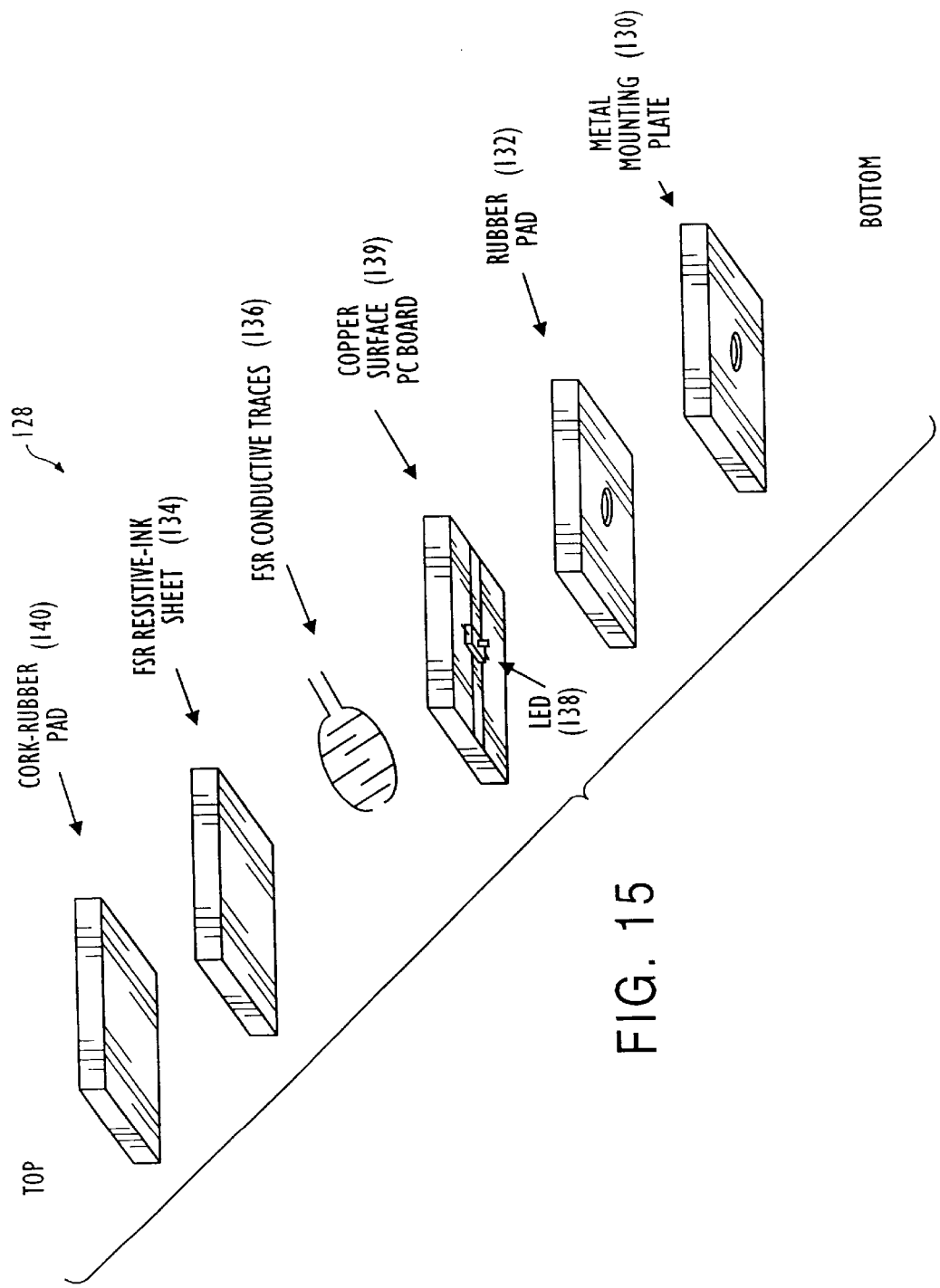
FIGS. 15 comprises an expanded view of a disassembled compliant robot gripper sensor.

FIG. 15 illustrates an expanded view of a disassembled compliant robot gripper sensor, which may be placed on an inner surface of a gripper 14 (see e.g., FIG. 1), e.g., in the manner disclosed in a related U.S. application, entitled "Finger Pad Force Sensing System" filed on even date herewith in the names A. M. Murray, et al., the content of which has been expressly incorporated herein by reference. The sensor illustrated in FIG. 15, when assembled, forms a layered sensor pad which can sense both shear forces and normal forces acting upon the robot gripper. The layered sensor pad 128 shown in FIG. 15 is assembled and placed on an inner surface of the robot gripper, e.g., on the lower surface of the gripper bottom. When mounted on the gripper bottom, base plate 130 is directly connected to a sensor mounting plate (not shown) which is then connected directly to the gripper bottom.

The layered sensor pad 128 is illustrated to include a base plate 130, a rubber pad 132, each of which have a cylindrical hole through a middle portion thereof. The layered sensor pad 128 further includes an assembly 136 of FSR copper traces which is placed between the FSR carbon-ink sheet 134 and the backside of a copper surface PC board 139. An LED is mounted to a center portion of PC board 139 so that it may fit in the middle of each of the hole portions of rubber pad 132. At a top portion of the overall sensor pad 128, a cork-rubber pad 140 is attached directly to the backside of copper surface PC board 139.

Each of the various elements forming the sensor pad 128 may be connected to each other by use of any appropriate attaching mechanism, such as one or more nut and bolt assemblies, or glue. Normal forces may be sensed by the resulting sensor pad 128 by sensing the resistance between each of the FSR copper traces 136, and shear forces may be sensed by a position-sensitive device (not shown) which detects the positioning of a light beam being emitted by light emitting diode 138 through the openings of rubber pad 132, and base plate 130.

Figure 16:
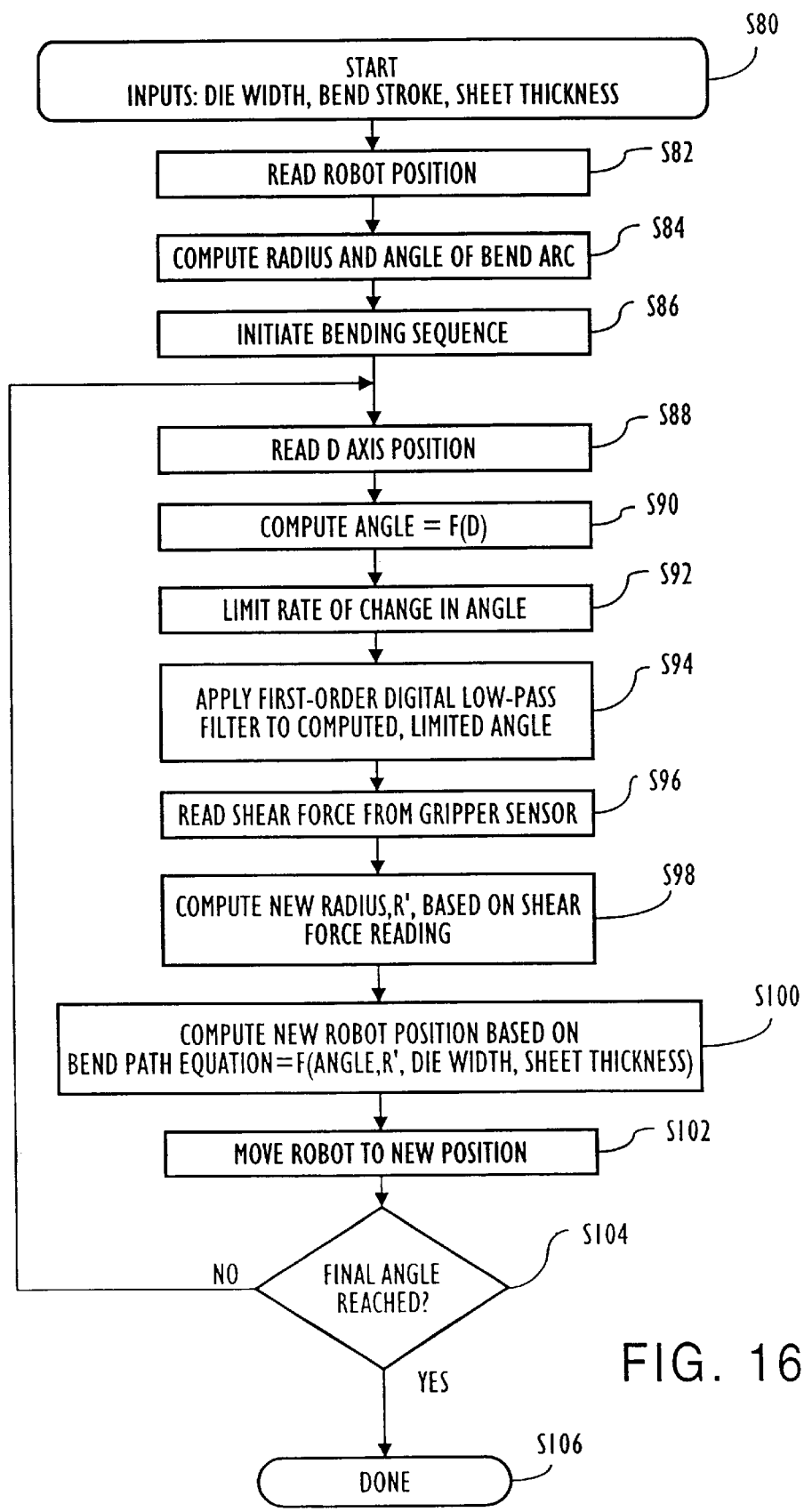
FIG. 16 is a flow chart of a process of performing a bend with bend following.

FIG. 16 is a flow chart of a process for executing a bend on a malleable sheet workpiece with bend-following. In a first step S80, the bending process is started, and information is input including the die width, the bend stroke (how much the die moves from the pinch point to the final bent position), and the sheet thickness. Such information may be provided by a bend sequence planner in FEL. In the next step S82, the robot gripper position is read in, the robot gripper position being indicated in terms of world Cartesian coordinates. In step S84, the radius and angle of the bend arc (i.e., a line which extends from the gripper position to the bend line) are each computed. In step S86, the bending sequence is initiated. After the bending sequence has been initiated in step S86, each of the steps from step S88 to step S104 is repeated until the final bend angle has been reached. In step S88, the process reads in the D axis position, and in step S90, the process computes the angle of the arc as a function of the D axis position value that was read in. In step S92, the movement of the D axis in the upper direction is limited to a certain speed so that the rate of change of the angle does not go above a certain threshold value. This allows the speed of the robot to accommodate the rate at which the part moves during the bend, and thus allows the robot to hold on to the workpiece during the bend. In step S94, a first-order digital low pass filter is applied to the computed, limited angle. This allows an accurate determination to be made of the rate of change of the angle, without consideration of high frequency noise components in the measured angle signal. In step S96, the shear force is read in from the gripper sensor. If a gripper sensor is provided with normal force detection, a normal force may also be read in at this step. In step S98, a new radius R' is computed based on the force reading made in step S96. The new radius R' represents the radius between the bend arc. In step S100, a new robot position is computed based upon the bend path equation which is a function of the angle, R', the die width, and the sheet thickness. In step S102, the robot is moved to the new position that has been computed, and in'step S104, a determination is made as to whether the final angle of the workpiece has been reached. If not, the process returns to step S88. If the final angle has been reached, the process proceeds directly from step S104 to S106, at which point the process has completed.

Figure 17:
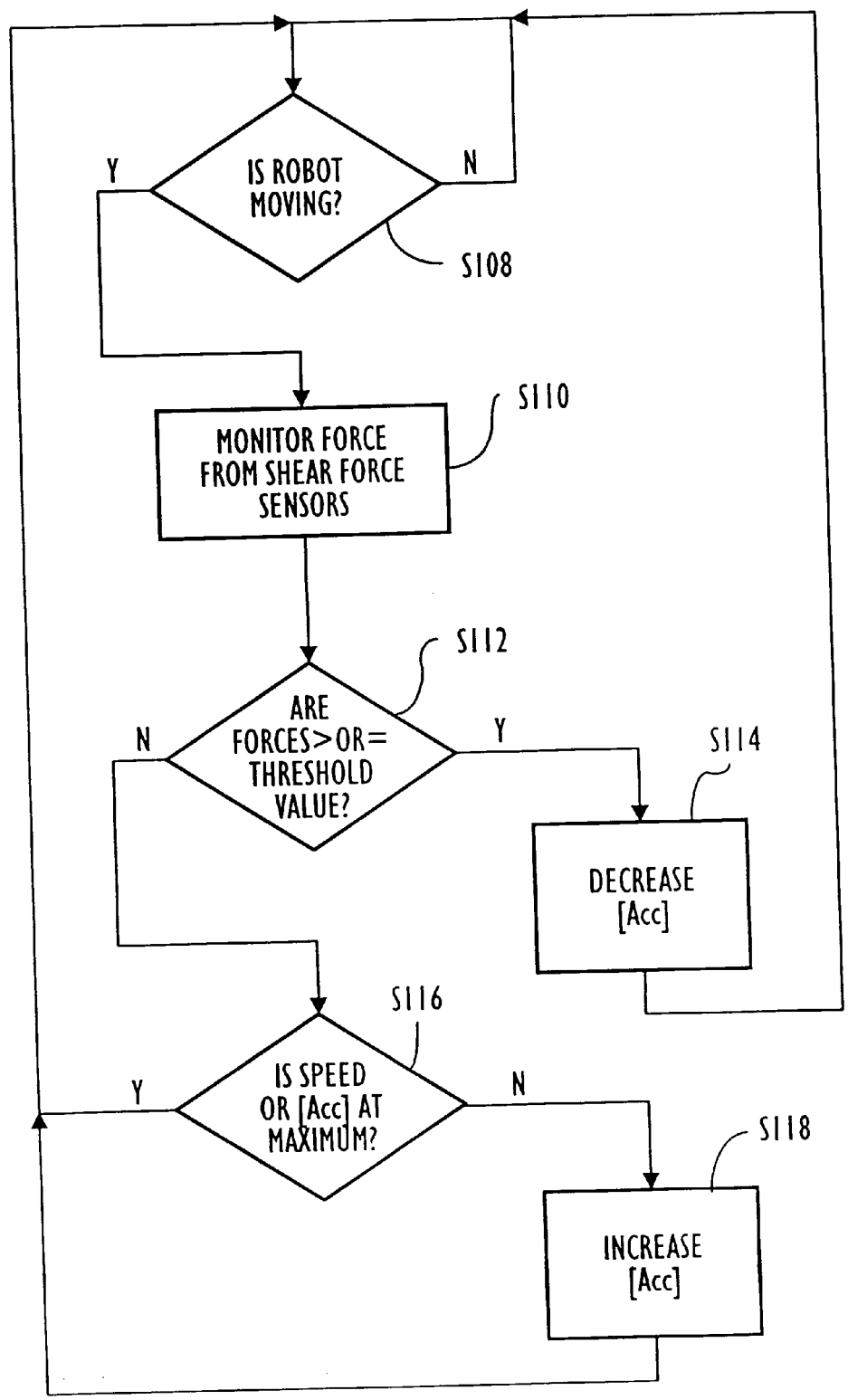
FIG. 17 is a flow chart of the operation of a speed control module.

FIG. 17 is a flow chart of the operation of a speed control module which may be called upon by a robot task provided within a sequencer/controller such as that illustrated in each of the above-noted related applications entitled "Method for Planning/Controlling Robot Motion" and "Intelligent System for Generating and Executing a Sheet Metal Bending Plan."

The illustrated speed control module may be run continuously within a sequencer/controller, for controlling the acceleration and deceleration of a robot whenever the robot is moved in order to prevent slippage of a workpiece being held by the robot's gripper. In the alternative, a mechanism may be provided for switching on or off the speed control module. In the particular embodiment illustrated in FIG. 17, the speed control module is set to run continuously during control of the bending apparatus by a sequencer/controller as disclosed in an above-noted related application, entitled "Intelligent System for Generating and Executing a Sheet Metal Bending Plan." In a first step S108, a determination is made as to whether or not the robot is moving. If the robot is moving, the process proceeds to step S110. If the robot is not moving, the process then returns and again makes a determination in Step S108 as to whether the robot is moving. In step S110, the process monitors the force provided by shear force sensors provided in the robot's gripper. In the next step S112, a determination is made as to whether the monitored forces are greater than or equal to a threshold value. If the monitored forces are greater than or equal to a threshold value, the process proceeds to step S114, where the absolute value of the acceleration is decreased. If the monitored forces are less than the threshold value, as determined in step S112, the process proceeds to step S116, where a determination is made as to whether either the speed of the robot or the absolute value of the acceleration of the robot is at a maximum. If either value is at a maximum, the process returns to step S108. If neither the speed nor the absolute value of the acceleration of the robot is at a maximum, the process proceeds from step S116 to step S118. It is noted that the speed or the acceleration of the robot may be defined in terms of the movement of the tool center point (TCP) of the robot which corresponds to a point on the robot's gripper, and thus generally corresponds to the position of the workpiece being held by the robot.

An additional or alternative way to reduce or prevent slippage of the workpiece is to move the workpiece about its center of gravity. This would require computing or otherwise determining the workpiece's center of gravity and controlling movements of the robot gripper in terms of moving about the center of gravity.

Figure 18:
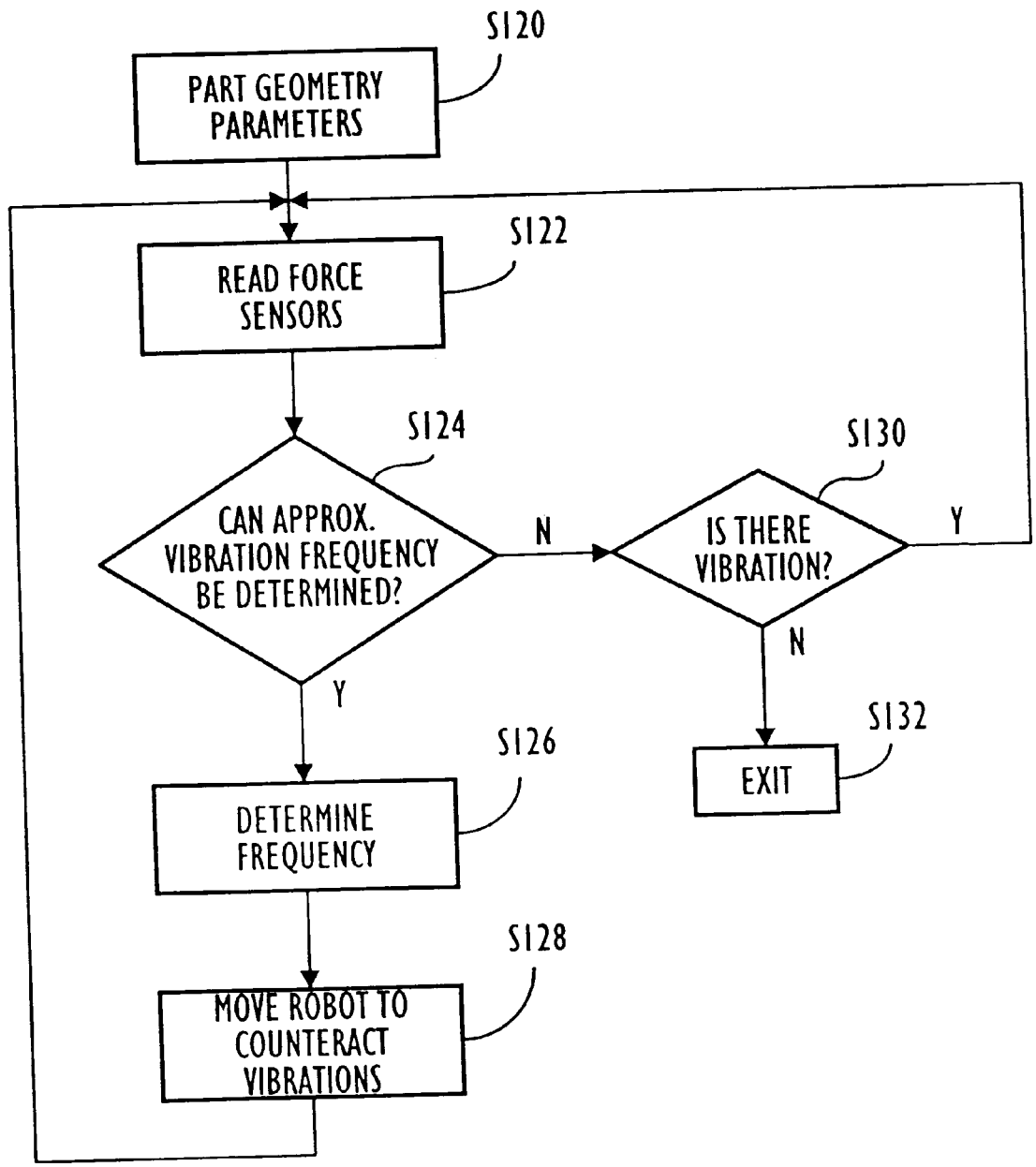
FIG. 18 is a flow chart representing the operation of a first embodiment module for performing active damping of part vibrations.

FIG. 18 is a flow chart of the operation of a module for performing active damping of vibrations of a workpiece being moved by a robot. Operation of the module may be controlled by a sequencer/controller in accordance with a plan produced by a bend sequence planner. The process performed by the module may be run concurrently with another module for controlling the robot to move from one location to another, thus allowing the robot to move a workpiece from one point to another, while at the same time reducing or eliminating the vibrations in the workpiece during movement. In a first step S120, the part geometry parameters that are needed are read in. In step S122, the output signals produced by the force sensors in the robot gripper are read. Then, in step S124, a determination is made as to whether the approximate frequency of vibration of the workpiece can be determined from the force sensor readings. If an approximation cannot made of the frequency of vibration, the process then proceeds to step S130, at which point a determination is made as to whether there is any vibration. If not, the process proceeds to step S132 and exits. If there is vibration, as indicated by the overall force magnitude produced by the force sensors, the process returns to step S122, where the force sensors are again read. The process proceeds from step S124 to step 126 if a frequency of vibration can be determined. Then, the frequency is determined in step S126. It is noted that the frequency of vibration cannot be determined if only one force sensor reading has been made, i.e., if step 122 has only been executed one time. Thus, the process needs to be returned to step 122 for two, three or more force sensor readings before the frequency of vibration of the workpiece can be approximated in step S126. Once the frequency of vibration has been determined in step S126, the process is forwarded to step S128, where the robot is moved in a direction opposite to the vibration, with the same frequency of the vibration and the same magnitude of force for each vibration.

It might be desired to model the vibration-part dynamics to make sure that certain movements of the robot will actually decrease the vibration instead of increasing it, and in order to make certain timing modifications in counteracting the vibrations.

Figure 19:
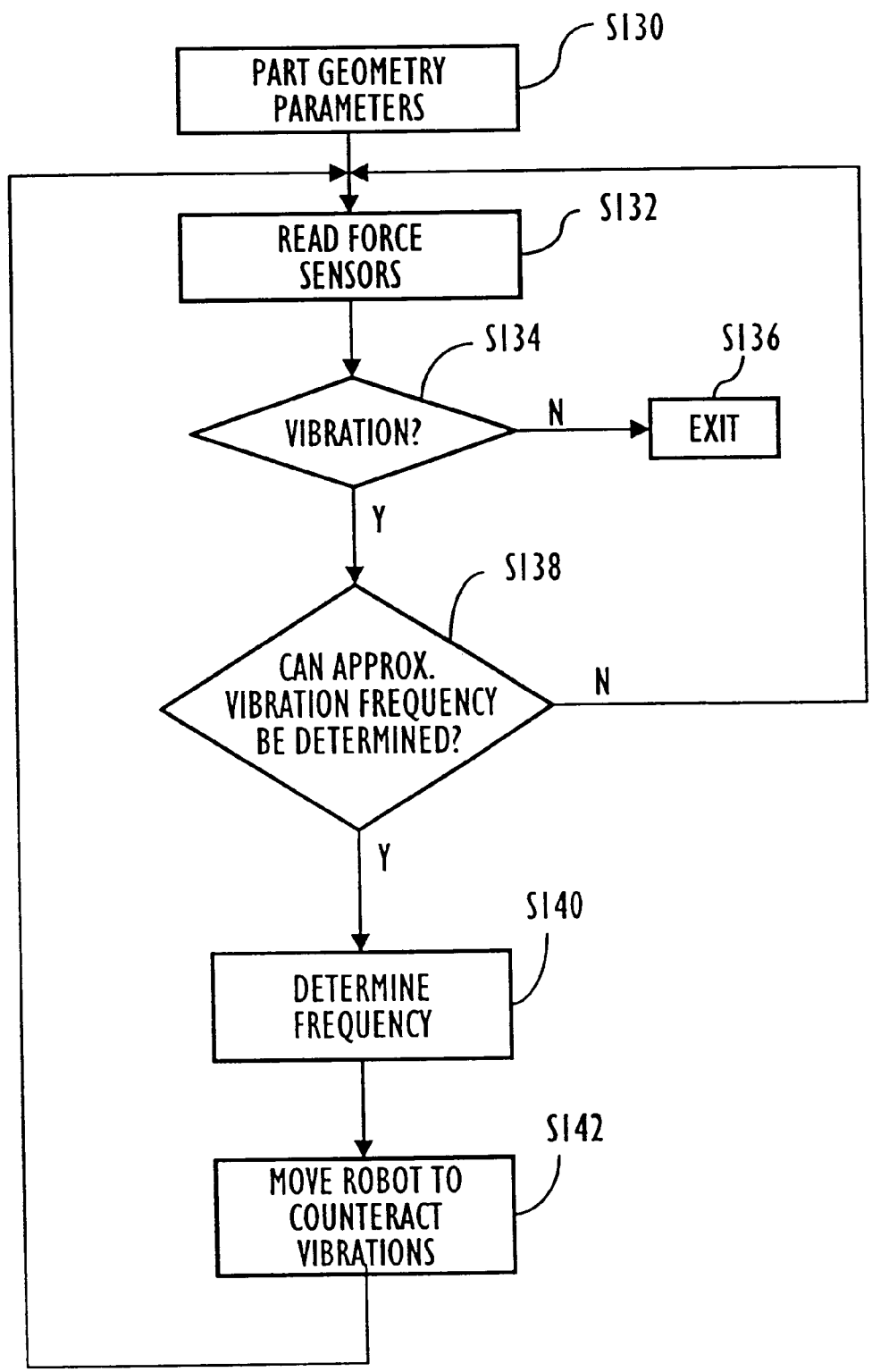
FIG. 19 is a flow chart representing the operation of a second embodiment module for performing active damping of part vibrations.

FIG. 19 is a flow chart of a second embodiment module for actively damping the vibration of a workpiece. In a firs step S130, any part geometry parameters that are needed are read in. In a second step S132, the force sensors in the gripper are read. Then, in step S134, a determination is made as to whether there are any vibrations in the part, If not, the process proceeds to step S136 and exits. If there are vibrations, the process proceeds from step S134 to step S138, where a determination is made as to whether the approximate frequency of vibration of the part can be determined from the force sensor readings. If not, the process returns to step S132. If the approximate frequency of vibration can be determined, the process proceeds to step S140, where the frequency of vibration is determined. Then, in step S142, the robot is moved in a direction opposite to each vibration, with the same frequency and magnitude for each vibration.

Figure 20A:
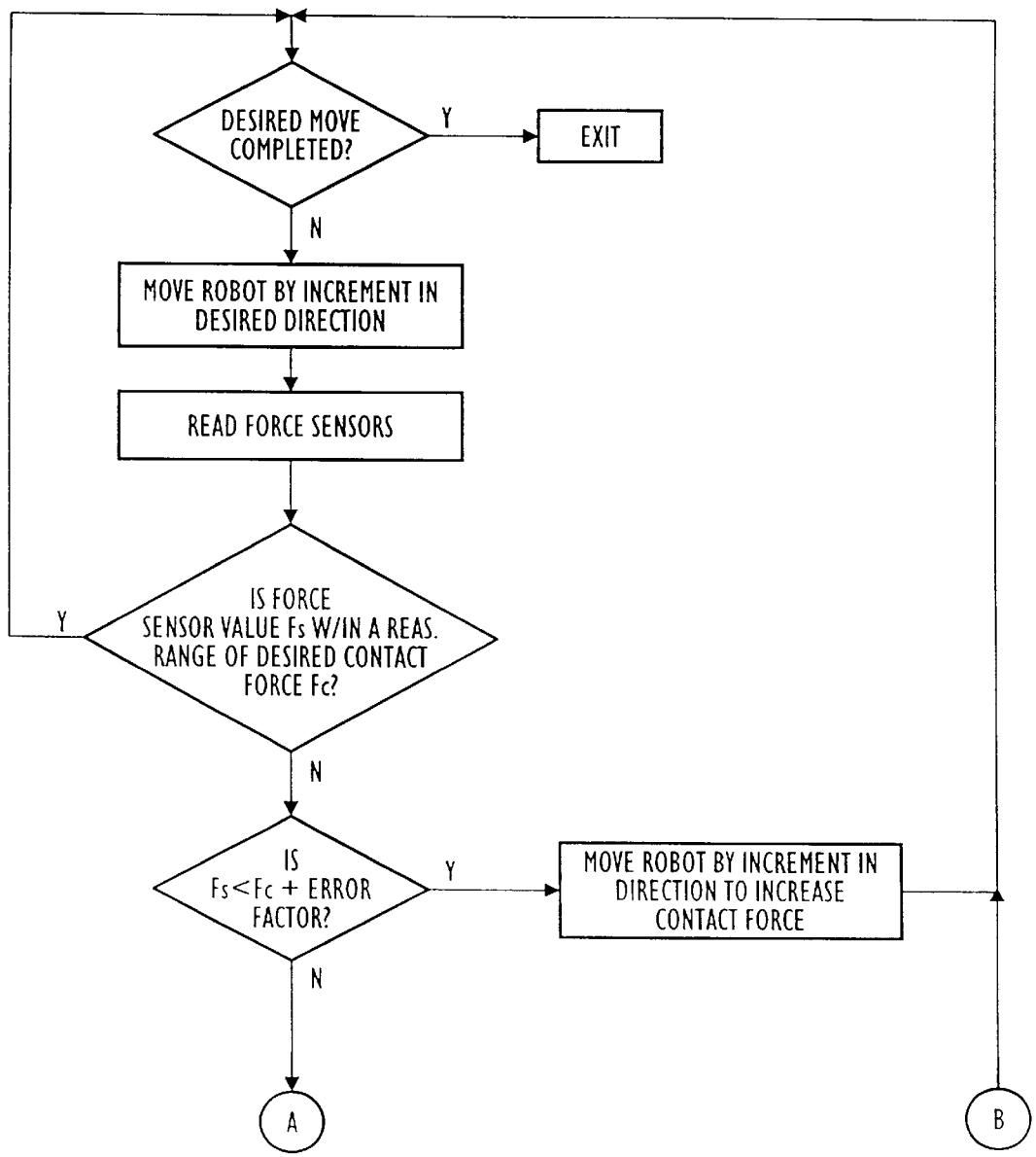
FIGS. 20A–20B comprise a flow chart of the operation of a first embodiment contact control module.
Figure 20B:
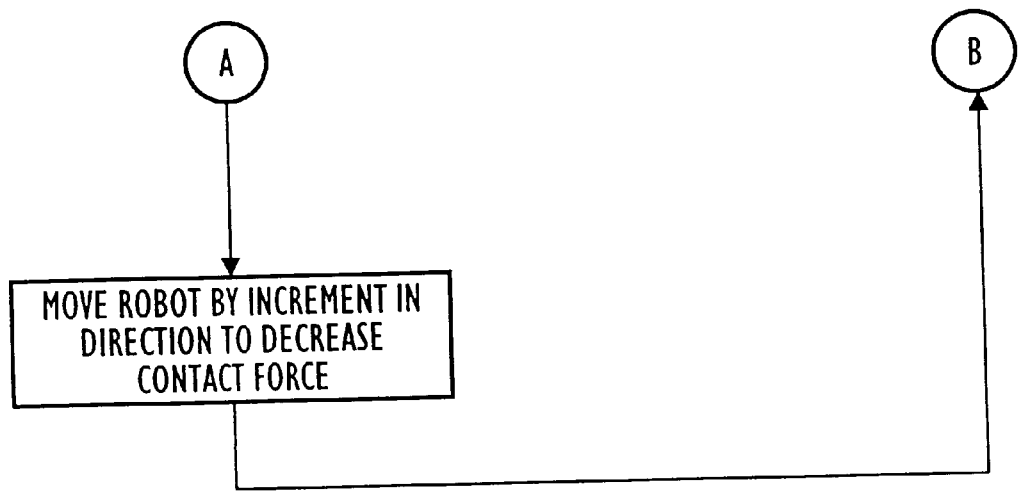

FIGS. 20A–20B comprise a flow chart of the operation of a contact control/active compliance control module. Such a module may be provided in order to cause a part being held by the robot gripper to constantly contact a particular desired obstacle, and/or to be slid along a surface of a desired obstacle while it is moving in a desired direction. The control process illustrated in FIGS. 20A–20B assumes that a guarded move routine has be successfully executed to bring the part in contact with a desired object. Once that has occurred, the contact control process illustrated in FIGS. 20A–20B will begin at step S144. In step S144, a determination is made as to whether a desired move has been completed. If yes, the process proceeds to step S146, and exits. If the desired move has not been completed, the process proceeds to step S148, where the robot is moved by some increment in the desired direction. In step S150 the force sensors in the robot gripper are read. The force sensor readings should be within a certain range so that the workpiece is in contact with a desired object with a certain desired force of contact between the workpiece and the desired object. This is determined in step S152, which determines-if a force sensor value $F_s$ is between the values $F_c-E$ and $F_c+E$. If not, the process proceeds to set S154, where a determination is made as to whether the force sensor value is less than the desired contact force $F_c$ plus the error factor (E). If so, the robot is moved by some increment in a direction to increase the actual contact force in step S156 and then returns to step S144. If the force sensor value is not less than the desired contact force $F_c+E$, that means that the force must be too high. Then the process proceeds to step S158, at which point, the robot is moved by some increment in a direction to decrease the actual contact force between the workpiece and the desired object to be contacted, and then returns (via connector B) to step S144. Adjustments in the actual contact force and the desired move increment (which indicates the actual desired movement of the workpiece in general without regard to the contact force), can both be executed at the same time.

Figure 21:
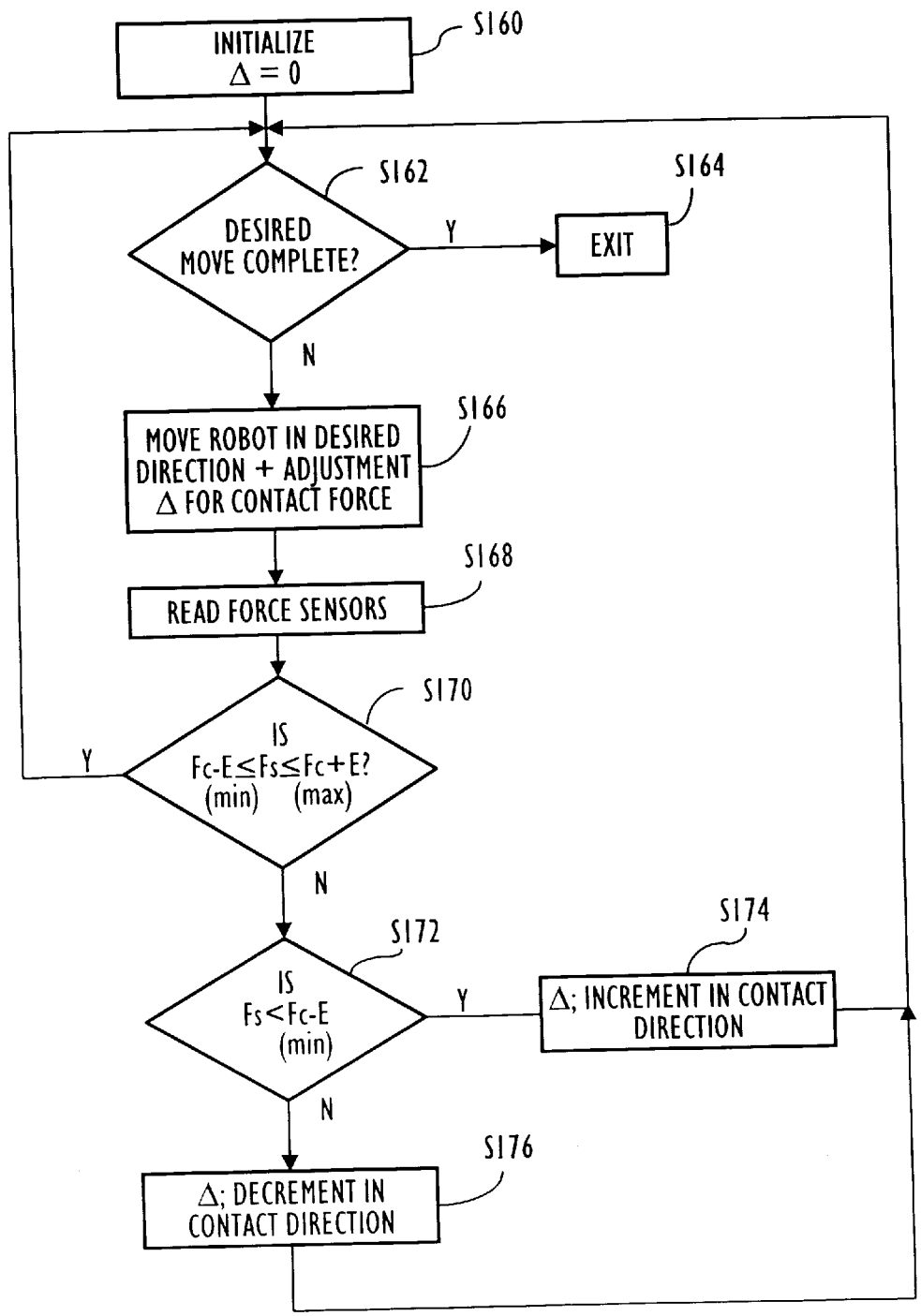
FIG. 21 is a flow chart of the operation of a second. embodiment contact control module.

FIG. 21 illustrates a second example/illustrated embodiment of a contact control module. In a first step S160, a delta value is initialize to be equal to zero. Then, in step S162, a determination is made as to whether a desired move has been completed. If yes, the process proceeds to step S164, and exits. If no determination is made in step S162, the process proceeds directly to step S166, at which point the robot is moved in a desired direction plus an adjustment value delta which is made for a contact force adjustment. Then, in step S168, the force sensors in the gripper are read. In step S170, a determination is made as to whether a force sensor value is within a range of the desired contact force, i.e., between minimum and maximum force values, the minimum force value being $F_c-E$ and the maximum force value being $F_c+E$. If it is determined that the force value is within the desired range, the process returns to step S162. If it is not within desired range, the process proceeds tb step S172, where a determination is made as to whether $F_s$ is less than $F_c-E$ (i.e., the minimum force). If yes, the process proceeds to step S174, where delta is incremented toward a contact direction, in order to increase the contact force, and the process then returns to step S162. If the force sensor value is not less than the minimum force value, the process proceeds from step S172 to step S176, where the delta value is decremented in a contact direction to decrease the contact force between the workpiece and the desired object to be contacted.

Figure 22:
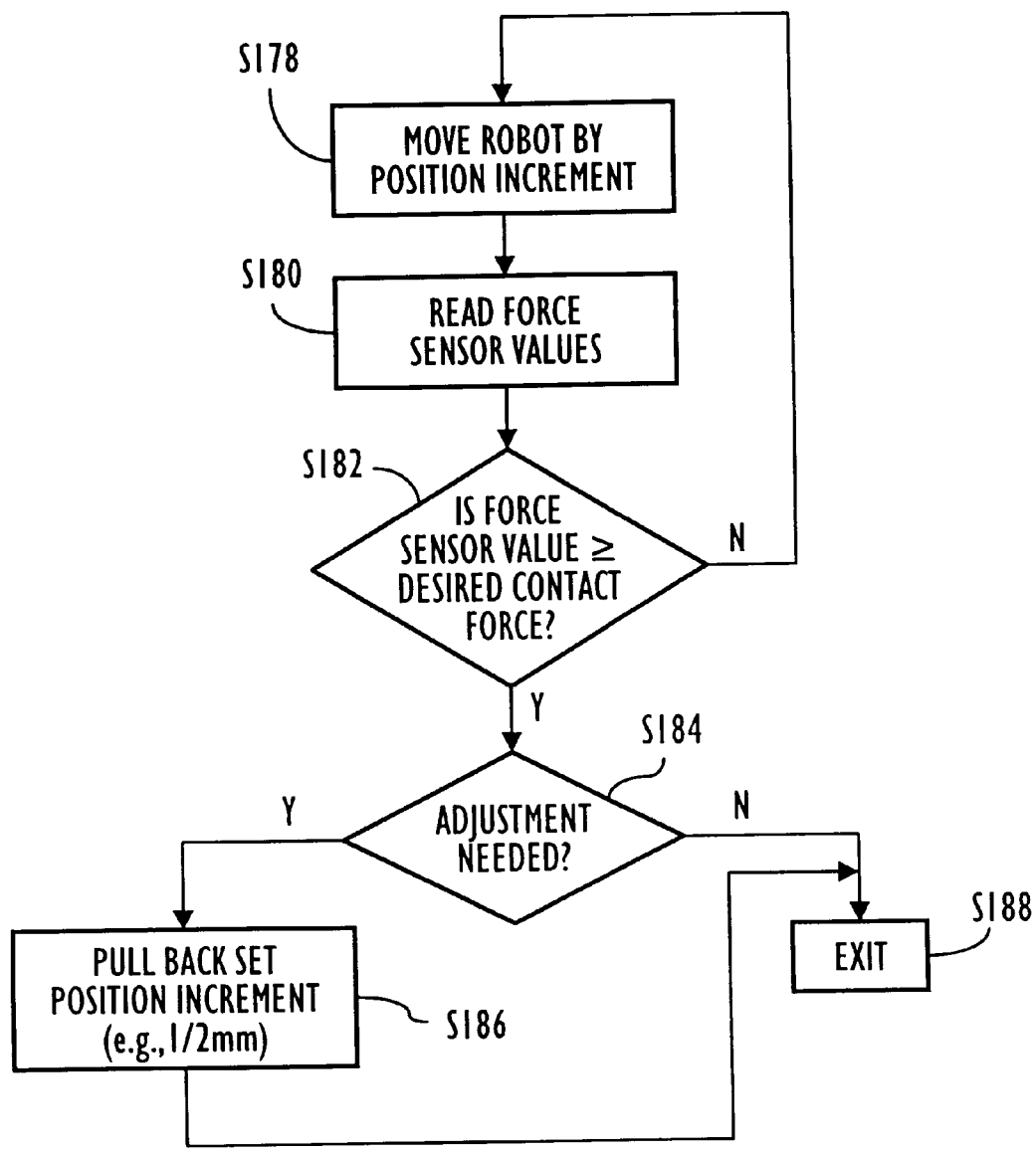
FIG. 22 is a flow chart representing the operation of a guarded move module.

FIG. 22 is a flow chart of a process performed by a guarded move module, which is a module for intentionally bringing a workpiece into contact with a desired obstacle, and then stopping movement of the workpiece once it has contacted the desired object. In a first step S178, the robot is moved by a certain position increment toward a desired direction, and then in step S180, a force sensor reading is made. In step S182, a determination is made as to whether a force sensor value is greater than or equal to a desired contact force. If not, the process returns to step S178. If the force sensor value is greater than or equal to the desired contact force, the process proceeds from step S182 to step S184, where a determination is made as to whether or not an adjustment is needed (because the workpiece has been moved too far, resulting in a contact force that is too big). If an adjustment is needed, the process proceeds to step 186, where the position of the workpiece is pulled back by a set increment (e.g., by 0.5 mm). The process then proceeds to step S188, at which point the process exits the guarded move routine and begins a -next step in the manufacturing process.

Figure 23A:
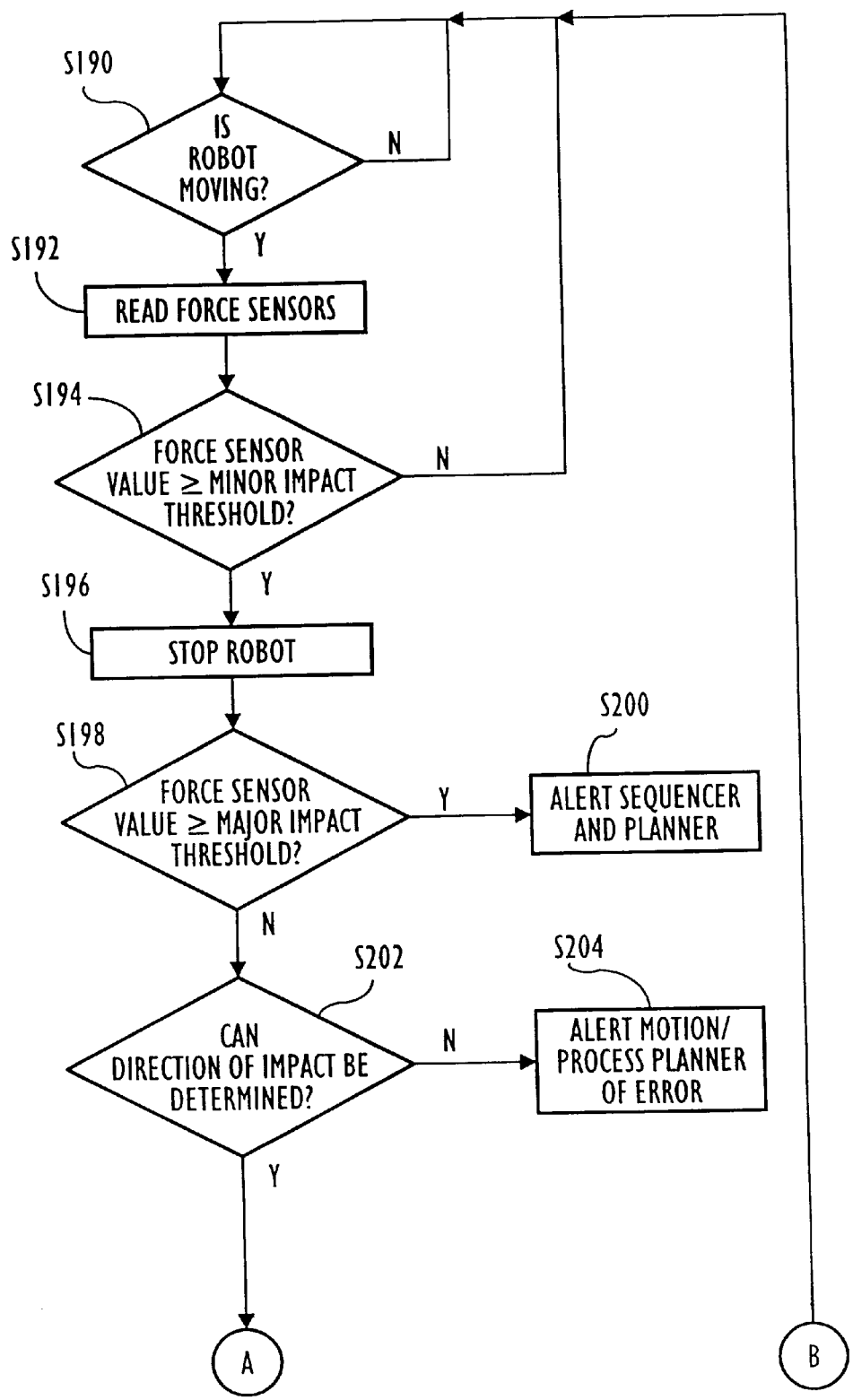
FIGS. 23A–23B together comprise a flow chart which represents the operation of an impact detection module.
Figure 23B:
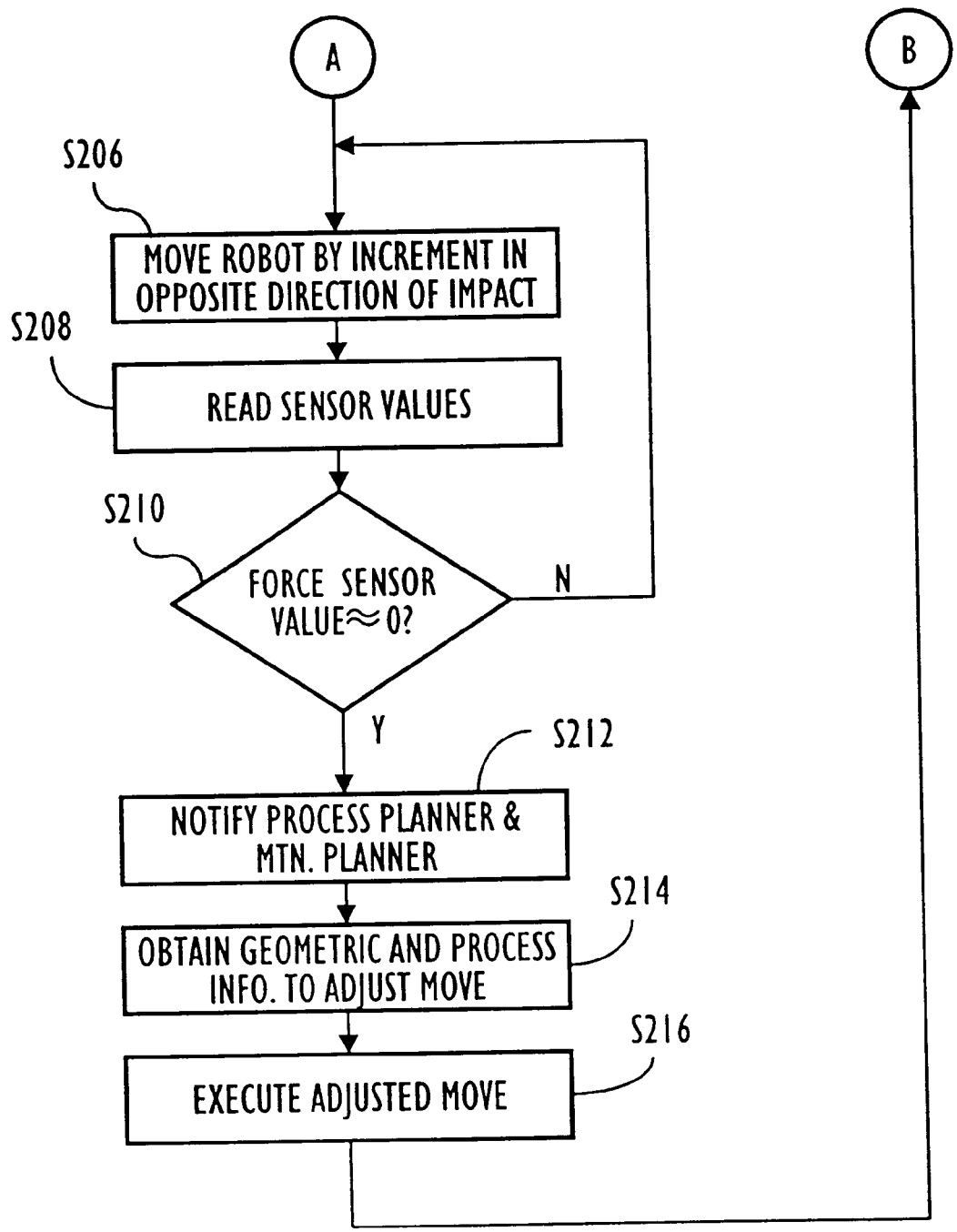

FIGS. 23A–23B comprise a flow chart of the operation of an impact detection module which detects unplanned collisions between a workpiece being held by a robot and an undesired obstacle. In a first step S190, a determination is made as to whether the robot is moving. If not, the impact detection process returns to step S190. It is noted that the impact detection module may be provided with a default mode so that it is constantly running whenever the robot is moving. In the alternative, it may be configured so that it can be turned ON or OFF in accordance with an instruction by a bend sequence planner. The process proceeds from step S190 to step S192 when the robot is moving, at which point a force sensor reading is performed. Then, in step S194, a determination is made as to whether a force sensor value is greater than or equal to a minor impact threshold value. If the force sensor value is not greater than or equal to the minor impact threshold value, the process returns to step S190. This means that no collision has occurred, and that the robot may continue its movement without change or modification. If, however, the force sensor value is greater than or equal to the minor impact threshold value, it proceeds to step S196, at which point the motion of the robot is stopped.

The process then proceeds to step S198, at which point a further determination is made as to whether the force sensor value is greater than or equal to a major impact threshold value. This signifies a major impact between the workpiece and an undesired obstacle. Accordingly, the process proceeds directly from step S198 to step S200, and alerts the sequencer and planner of the system that a major collision has occurred. No further movement of the robot is made at that point. On the other hand, if the force sensor value is not greater than or equal to the major impact threshold value as determined in step S198, this means that only a minor impact has occurred. The process then proceeds to step S202, at which point a determination is made as to whether the direction of the impact can be determined from the force sensor readings or from other sensor values. If not, the process proceeds to step S204, where the motion/process planner is alerted of the error, and no further robot motion is made until modifications or corrections can be made. If the direction of the impact can be determined from the force sensor reading or from other sensor values, the process proceeds from step S202 (via connector A) to step S206. In step S206, the robot is incrementally moved in the direction of the force readings (in a direction opposite to the impact). Then, in step S208, the force sensors are read. In step S210, a further determination is made as to whether a force sensor value is approximately equal to 0 pounds. If not, the process returns to step S206, where the robot is again incrementally moved in a direction opposite to the detected impact. If the force sensor reading is approximately 0, as determined in step S210, the process proceeds to step S212, at which point the process planner is notified of the motion modifications that were made due to the detection of an impact. Then, at step S214, geometric information and process information are obtained to make adjustments in the move whenever that same move is to be performed by the robot in the future. Then, in step S216, the adjusted move is executed, and the process is returned (via connector B) to step S190.

3. Droop Sensing and Compensation Mechanisms and Processes

Figure 24A:
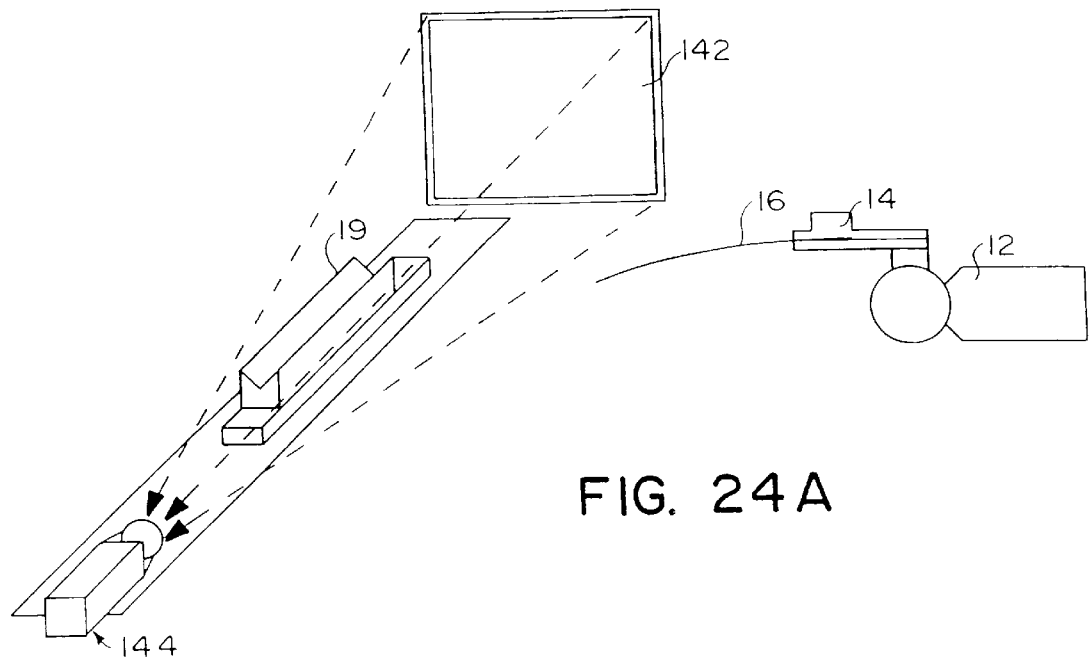
FIGS. 24A–24B illustrate a back-lit vision-based droop sensor.
Figure 24B:
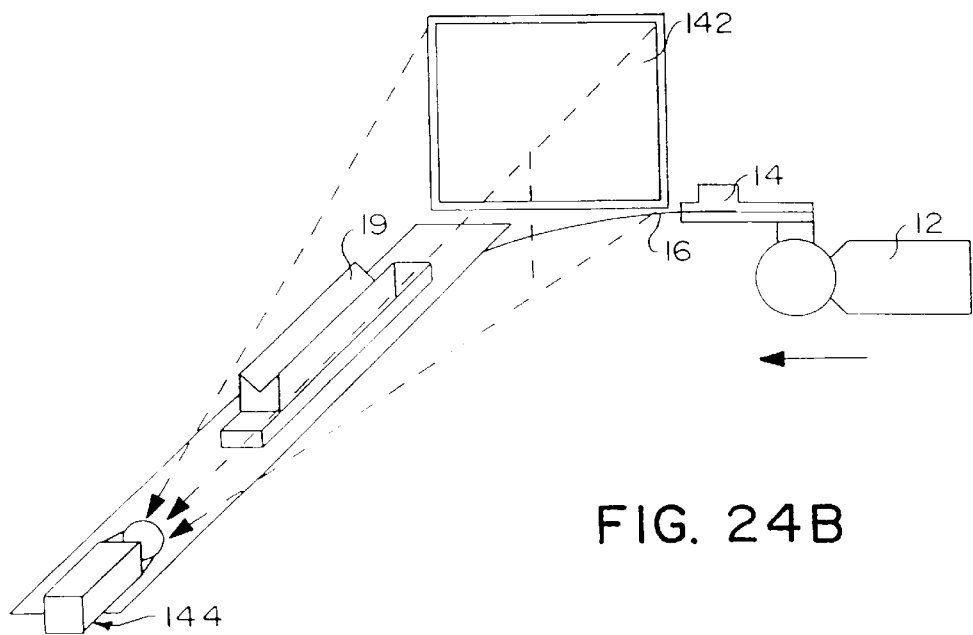

FIGS. 24A–24B illustrate a back-lit, vision-based droop sensor. A workpiece is shown before being loaded into a die space in FIG. 24A, and approaching the die space in FIG. 24B. The vision-based droop sensing system is formed by a CCD camera 144 which detects images from a direction coming from a backlight 142, with its field of vision including die 19 and the area surrounding die 19. Accordingly, with the use of the vision-based droop sensing mechanism shown in FIGS. 24A–24B, as workpiece 16 approaches the area surrounding the die space, CCD camera 144 can detect the presence of workpiece 16 within the area surrounding the die space and the droop offset of the leading edge of the workpiece.

Figure 25:
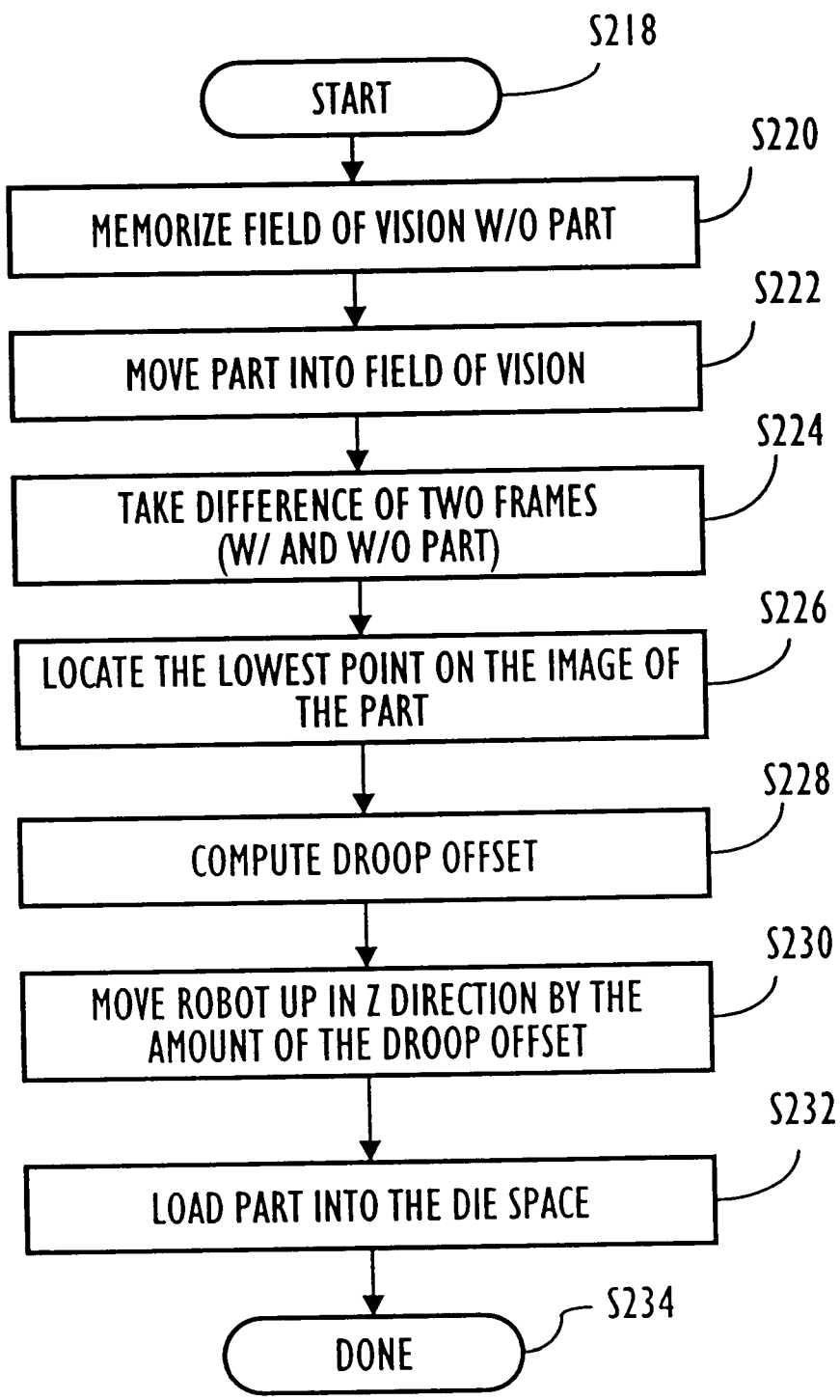
FIG. 25 is a flow chart of a back-lit vision-based droop sensing process.

FIG. 25 is a flow chart of a process for sensing and compensating for drooping, utilizing the back-lit vision-based droop sensor illustrated in FIGS. 24A–24B. The process is started at step S218, and proceeds to a first step S220, at which point the field of vision is memorized without the part. Then, in step S222, the workpiece/part is moved into the field of vision of the CCD camera 144. In step S224, the difference between two frames (with and without the part) is taken. In step S226, the lowest point of the part is determined from the image formed with CCD camera 144. Then, in step S228, a droop offset value is computed. In step S230, the robot is moved upward in a Z direction by the amount of the droop offset. The part is then loaded into the die space in step S232, and the process ends as indicated in step S234.

Figure 26:
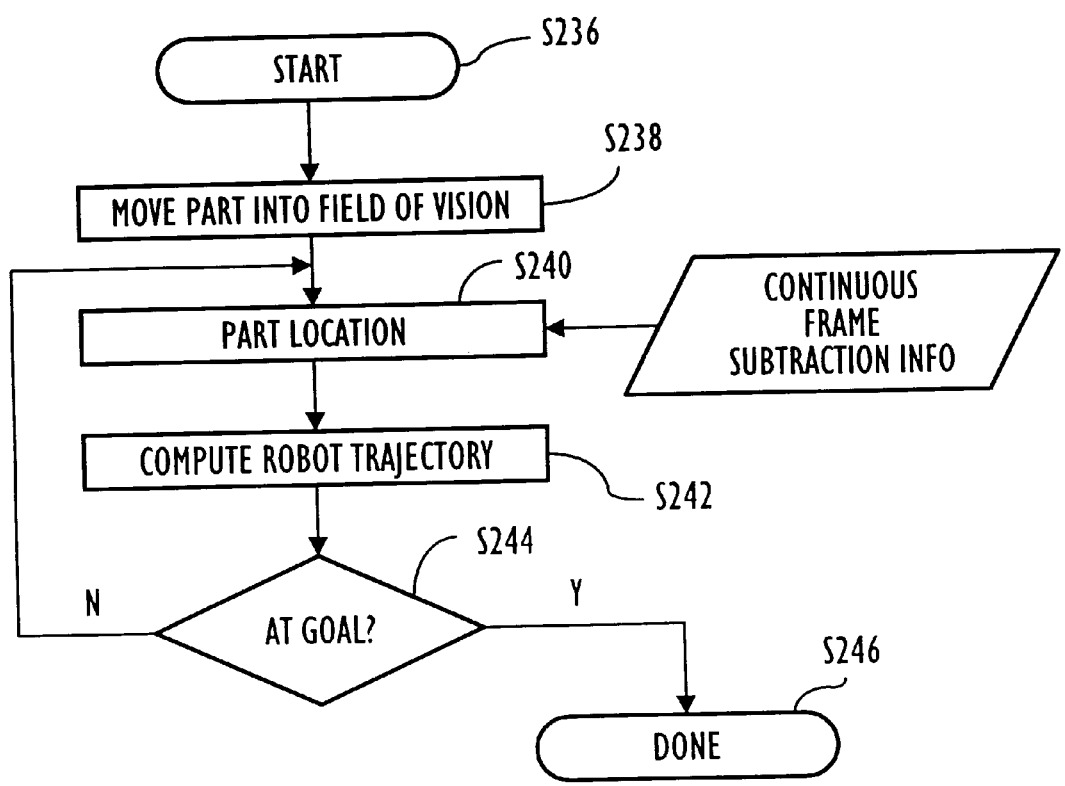
FIG. 26 is flow chart of a droop sensing process without back lighting.

A vision-based droop sensor may be provided without the use of a backlight 142 as illustrated in the embodiment shown in FIGS. 24A–24B. FIG. 26 is a flow chart illustrating the steps of a droop sensing and compensating process which may be performed with a vision-based droop sensor that does not utilize a backlight. The process starts at step S236 and proceeds to the first step S238, at which point the part is moved into the field of vision of CCD camera 144. The location of the part is then determined in step S240, utilizing information being continuously input based upon frame subtraction, the frame subtraction being performed at a constant rate, e.g., 30 Hertz. The part location information is then utilized in step S242 to compute a robot trajectory toward the goal, within the limits of the die space where the workpiece is to be loaded. In step S244, a determination is made as to whether the part is at the goal. If not, the process returns to step S240, where the part location is again determined as the part is continuously being moved toward the die space. If it is determined at step S244 that the part is at the goal, and is thus loaded into the die space, the process proceeds to step S246, and terminates.

Figure 27A:
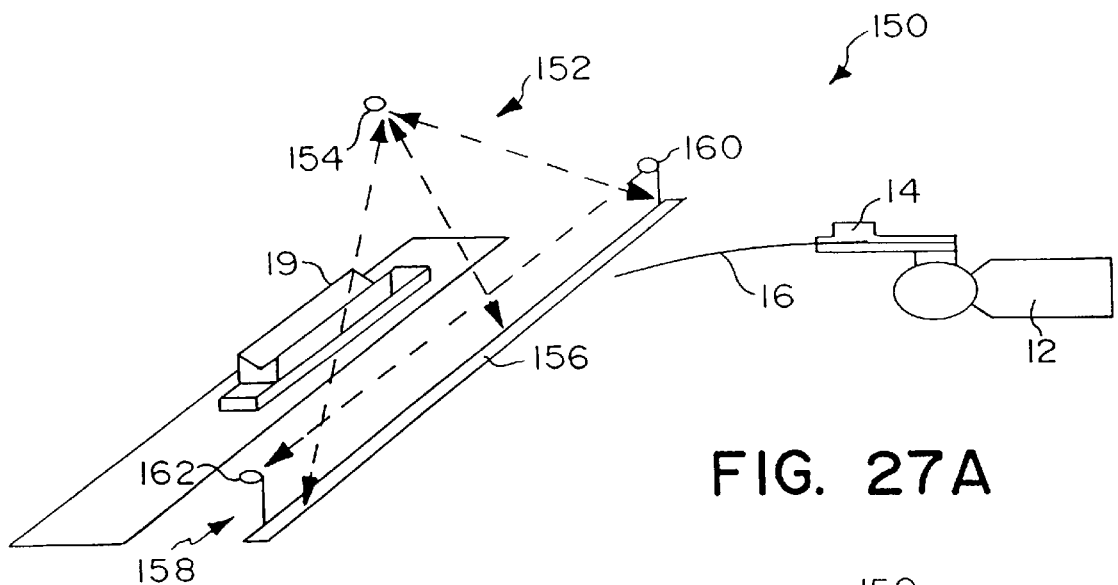
FIG. 27A illustrates a compound break beam droop sensor with a workpiece not yet approaching the die space.
Figure 27B:
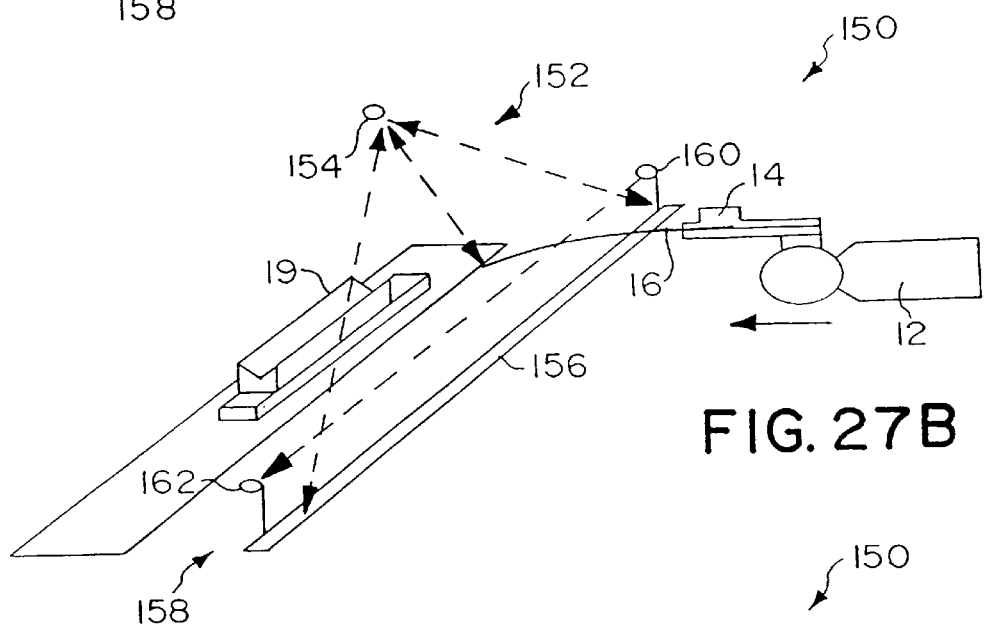
FIG. 27B illustrates a compound break beam droop sensor with a workpiece approaching the die space and hitting a scanned beam.
Figure 27C:
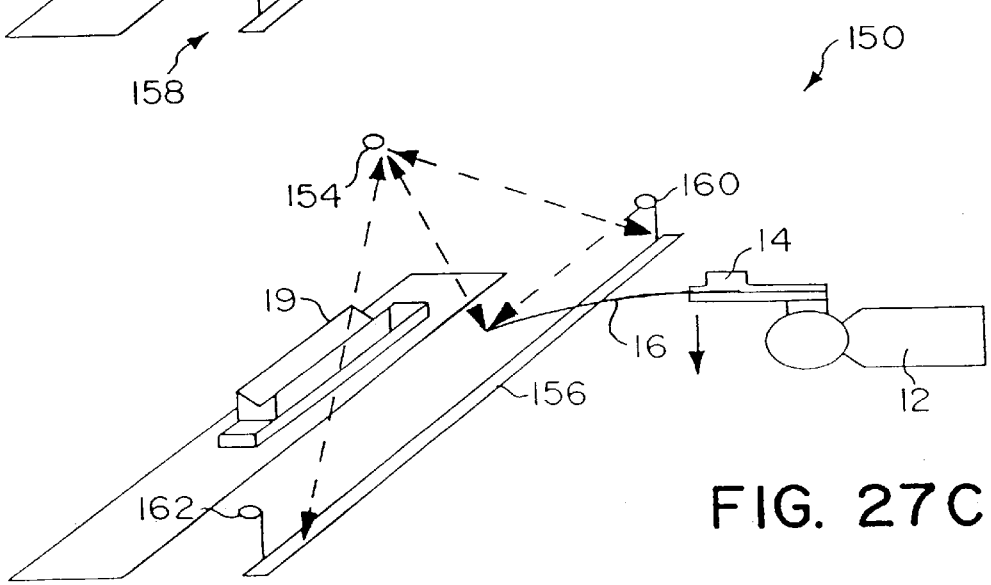
FIG. 27C illustrates a compound break beam droop sensor with a workpiece stopped in the Y direction and lowered until it has hit a fixed traversing beam.

FIGS. 27A–27C illustrate a compound break-beam sensor 150. In FIG. 27A, workpiece 16 is ready for loading into the die space. In FIG. 27B workpiece 16 is approaching the die space and has interrupted a scanning light curtain. In FIG. 27C, workpiece 16 has been lowered so that it intercepts both a scanning light curtain and a fixed horizontal break-beam. The illustrated compound break-beam droop sensor 150 includes a scanning light curtain mechanism 152 for scanning a light beam along a plane that runs across the front of the die space. Scanning light curtain mechanism 152 includes a scanned light beam source/detector 154, and a reflective strip 156. So that the scanned light beam produced by scanned light beam source/detector 154 will be reflected back to the same point, reflector strip 156 may be curved, or it may have a plurality of directional reflective elements that direct the scanned light beam back to the same point. Scanned light beam source/detector 154 may comprise, e.g., a scanning mirror (not shown) for reflecting a source light beam toward reflective strip 156, and for reflecting a return light beam back toward a light beam detector mechanism (not shown). Compound break-beam droop sensor 150 further includes a fixed single (traversing) break-beam mechanism 158 that forms a break beam which traverses a lower portion of a plane that covers the front of the die space. The illustrated fixed single break-beam mechanism 158 includes a light source 160 and a light detector 162.

Figure 28:
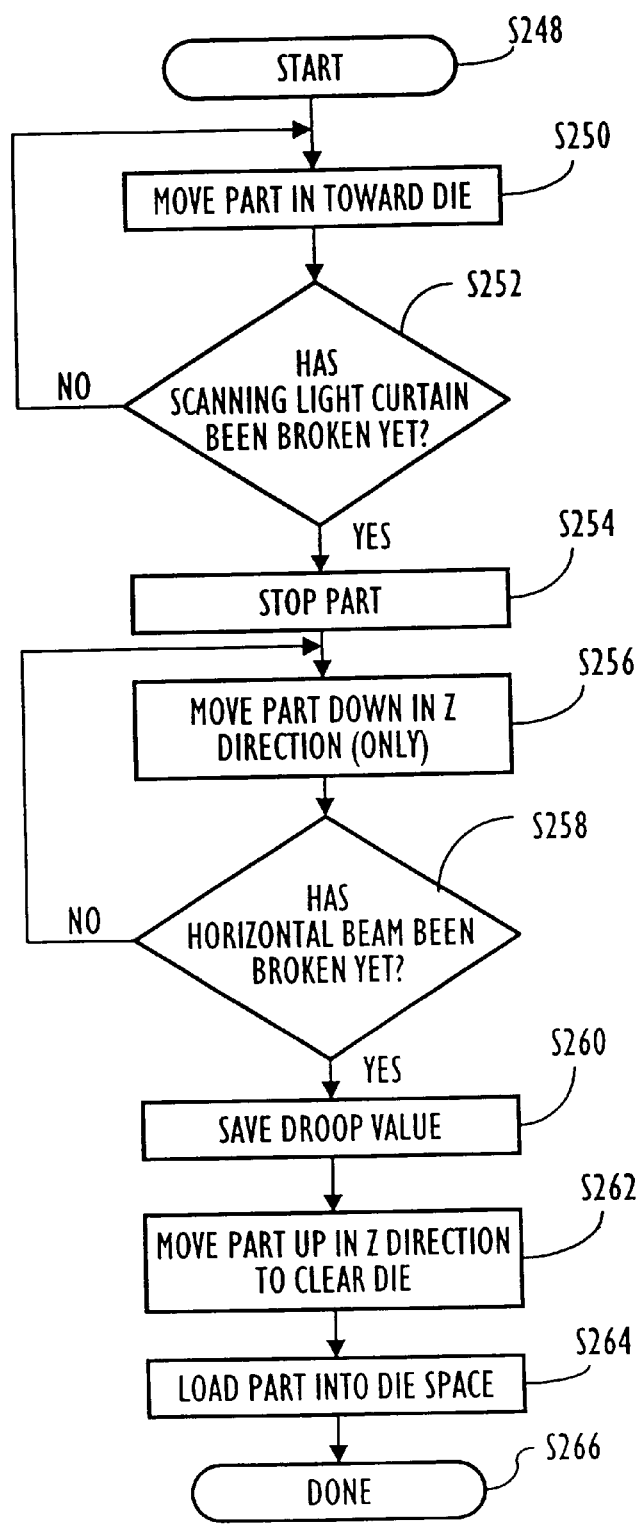
FIG. 28 is a flow chart of a droop sensing process performed with a compound break beam.

FIG. 28 is a flow chart illustrating a process of performing droop sensing and compensation utilizing the compound break-beam sensor 150 of FIGS. 27A–27C. In a first step S248, the process is started, and proceeds to step S250, at which point the part is moved toward the die space. Then, in step S252, a determination is made as to whether the scanning light beam curtain has been broken. If not, the process returns to step S250. If the scanning light curtain has been broken, the process proceeds to step S254, at which point movement of the part is stopped. By stopping the movement of the part, the Y position of the part with respect to the die space is then known. The position of the part corresponding to steps S252 and S254 is shown in FIG. 27B. Then, in step S256, the part is moved down in the Z direction only. A determination is then made in step S258 as to whether the horizontal fixed beam has been broken. If the horizontal fixed beam has not been broken, the process returns to step S256. If the horizontal beam has been broken, the process proceeds from step S258 to step S260, where the droop value, i.e., the droop offset value, is saved. The droop offset value is determined based upon the amount in the Z axis by which the part had to be moved until it broke the fixed horizontal beam produced by the single fixed break-beam mechanism 158. FIG. 27C illustrates the position of the workpiece as it breaks the horizontal fixed beam. In step S262, the part is then moved upward in the Z direction so that it will clear the die when being loaded into the die space. In step S264, the part is then loaded into the die space, and the process of performing droop sensing is terminated at step S266.

Figure 29A:
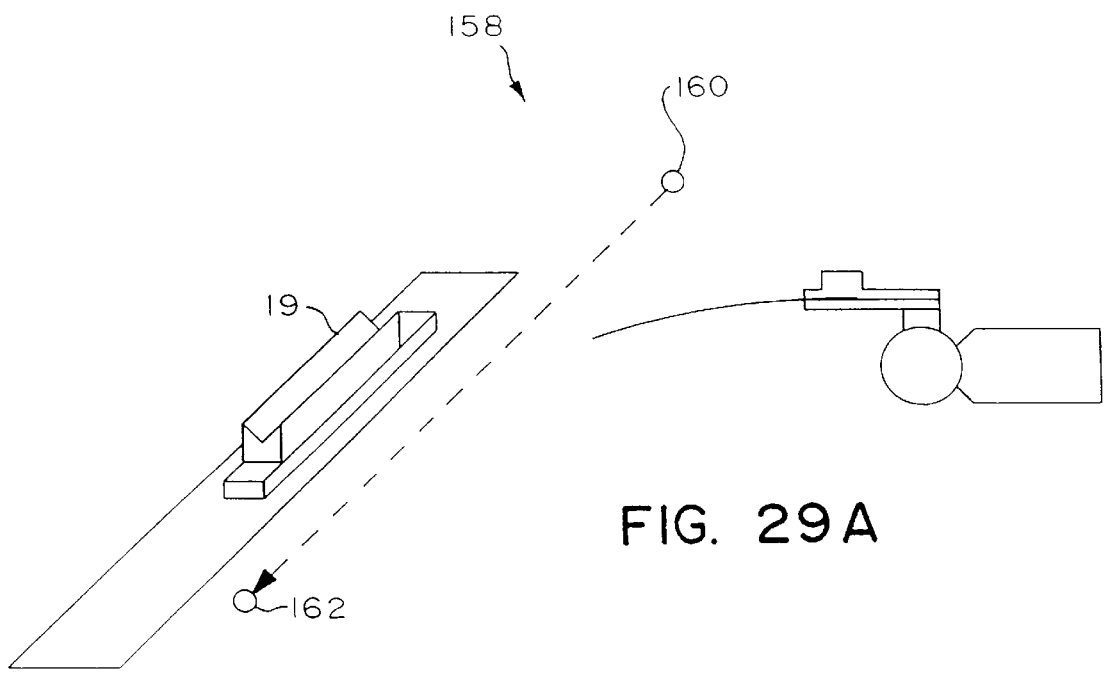
FIGS. 29A–29B illustrate a single-beam droop sensor in relation to a robot carrying a workpiece.
Figure 29B:
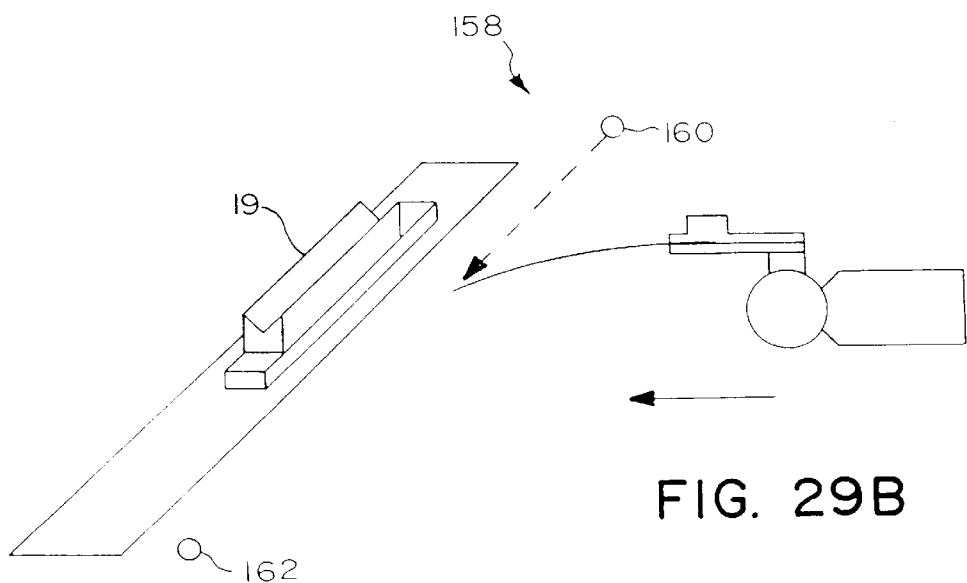

FIGS. 29A–29B illustrate a single-beam droop sensor mechanism 158, which includes a light source 160 and a light detector 162. The light source 160 and light detector 162 are each placed at a position in front of die 19 so that the light beam produced thereby extends from one end to another of a plane that covers the entrance portion of the die space. Thus, they can be used to detect a Z position of the workpiece and the amount of droop of the workpiece before loading the workpiece into the die space.

Figure 30:
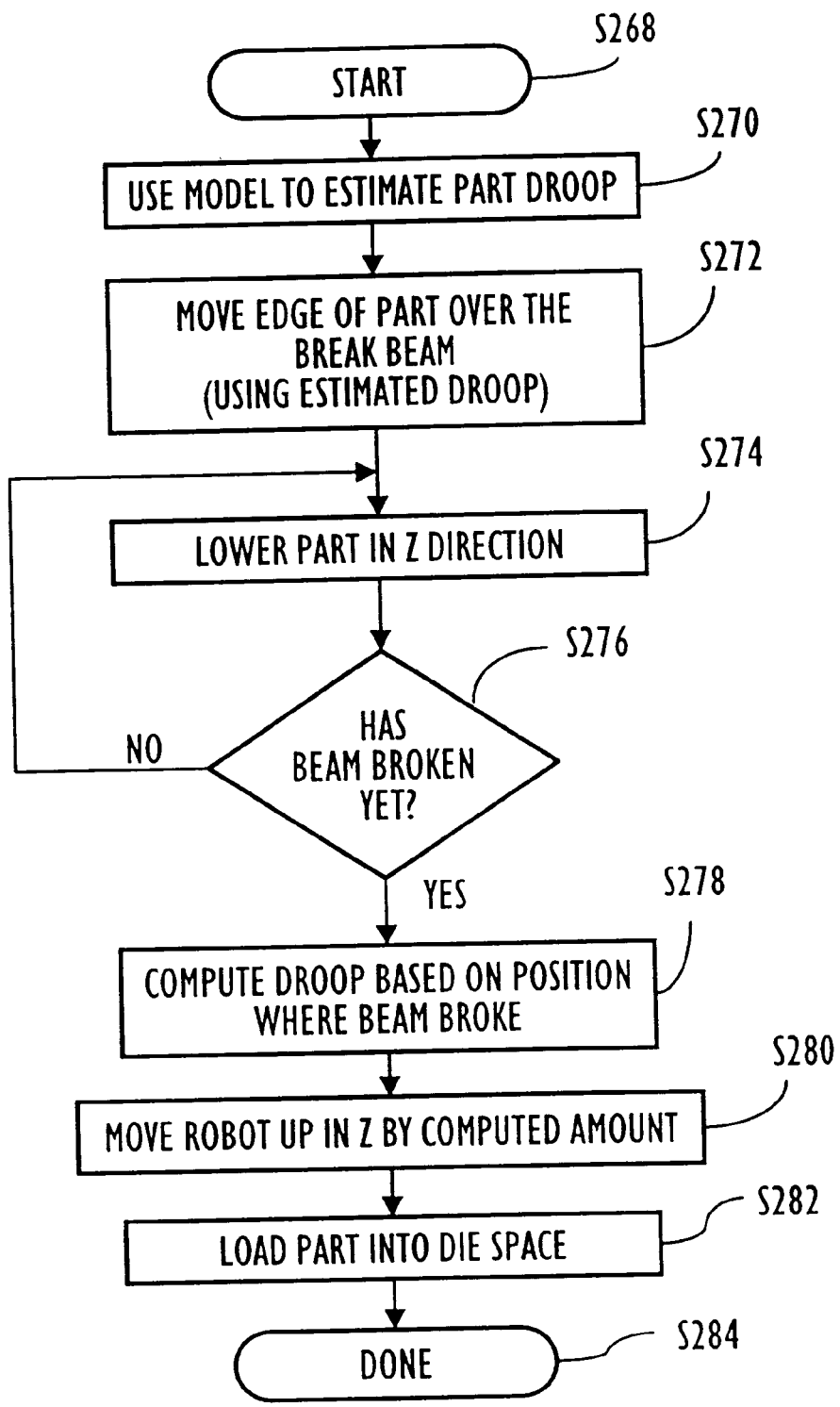
FIG. 30 is a flow chart representing a droop sensing process being performed with a single-beam droop sensor as illustrated in FIGS. 29A and 29B.

FIG. 30 is a flow chart of a process for performing droop sensing and compensation utilizing a droop sensor such as that illustrated in FIGS. 29A–29B. The process in FIG. 30 is started at step S268, and proceeds to a first step S270. In step S270, a model is used to estimate the part droop. In step S272, the leading edge of the part is moved over to the break beam, using the estimated droop in order to decrease the amount of time needed to get the workpiece to a location which will cause the break-beam to be broken. Then in step S274, the part is lowered in the Z direction. A determination is then made in step S276 as to whether the beam has been broken. If the beam has not yet been broken, the process returns to step S274. If the beam has been broken, the process proceeds from step S276 to step S278, at which point the droop offset is computed based upon the position where the beam broke, and the initial position of the workpiece. That is, the droop offset is computed based upon the amount of movement in the Z direction by which the workpiece had to be moved before the beam broke. In step S280, the robot is moved upward in the Z direction by the computed droop offset amount. The part is then loaded into the die space in step S282, and the process is terminated in step S284.

4. Angle Sensing and Springback Control

Figure 31:
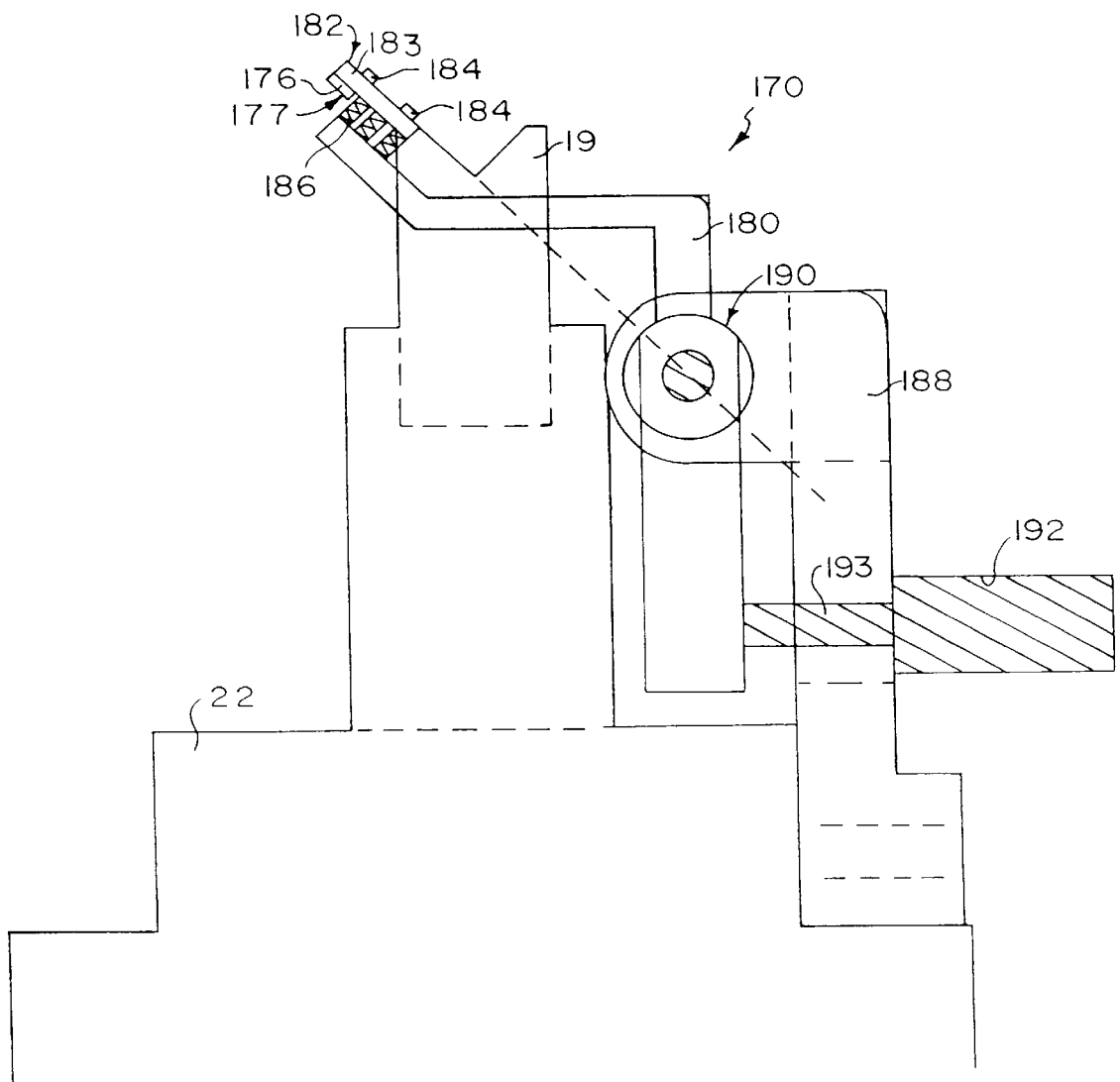
FIG. 31 is a side view of a die and a mirror holding mechanism for an angle sensor.
Figure 32:
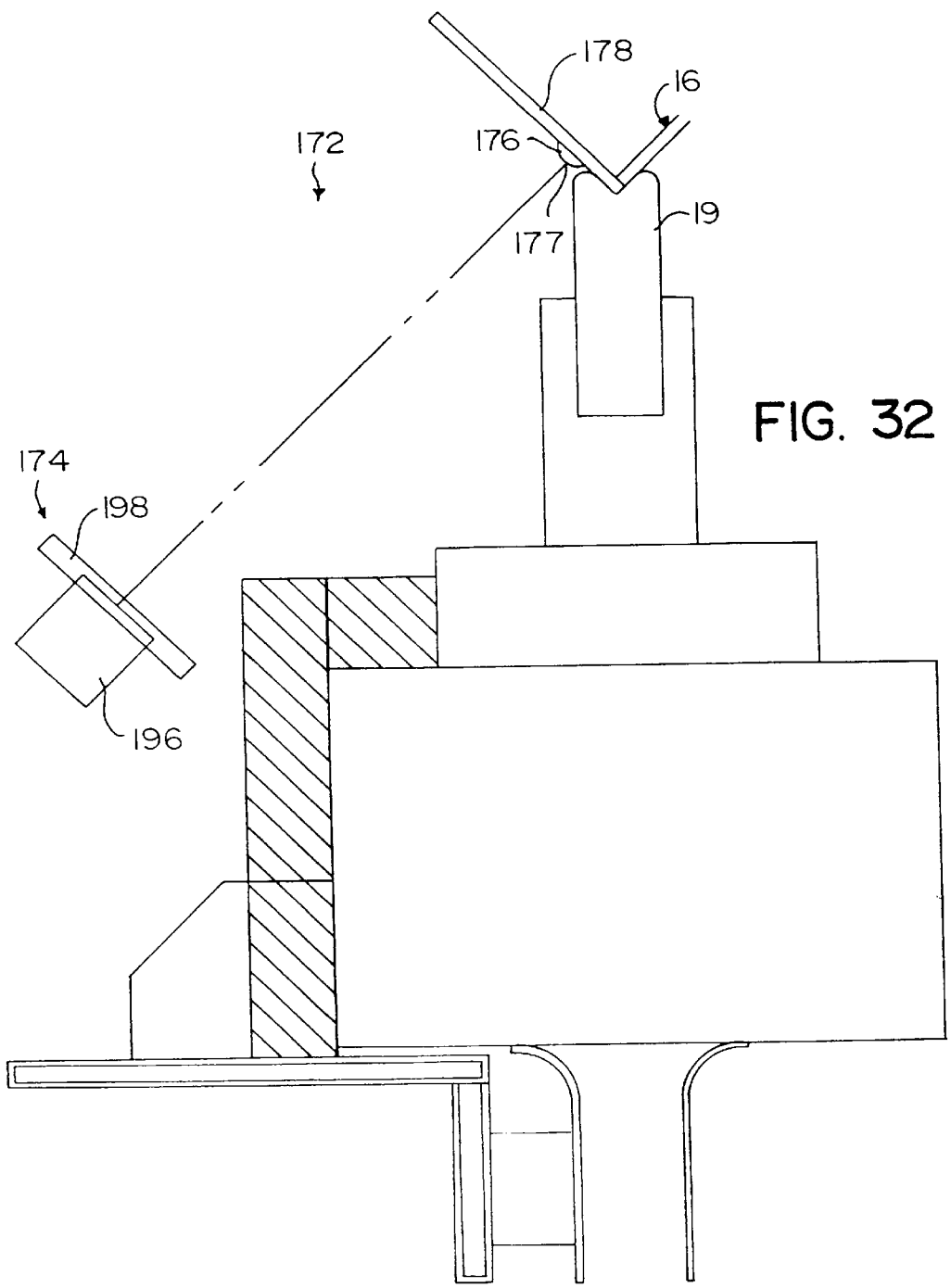
FIG. 32 illustrates a side view of a die and a beam emitter/detector unit.
Figure 33:
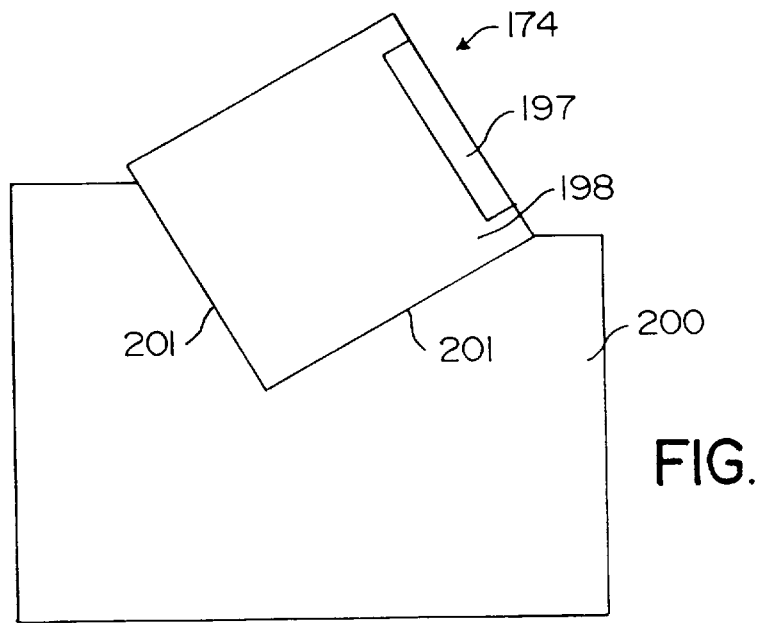
FIG. 33 illustrates a side view of a beam emitter/detector unit with a support structure.

An angle sensing mechanism which can be utilized in a bending apparatus environment is illustrated in FIGS. 31–33. The angle sensor may be utilized in connection with a springback control method for controlling the amount of bending of a flange portion of a workpiece so that the resulting angle of the workpiece after the bend is performed is at a desired value, taking into account an expected amount of springback that will occur once the part is released from an engaged press brake. FIG. 31 shows a side view of a die 19 and a mirror holding mechanism 170. Mirror holding mechanism 170 holds a mirror 176 having a reflective surface parallel to a flange portion 178 (FIG. 32) of a workpiece 16 (see FIG. 32). Mirror holding mechanism 170 includes an arm 180 which carries a mirror mounting mechanism 182. Mirror mounting mechanism 182 includes a mount plate 183, at least two sheet contact pads (e.g., four evenly spaced contact pads) 184, and one or more springs (e.g., 3 springs) 186 connecting the mirror mounting plate 183 to an end portion of arm 180.

Arm 180 is supported by a support member 188, via a pivot mechanism 190. An air cylinder 192 is provided, mounted to support member 188, which includes an actuation shaft 193. Actuation shaft 193 pushes against a bottom portion of arm 180 to force arm 180 into an angle-measuring position at which the mirror is placed at a location parallel to the under-surface of the flange portion 178 of the workpiece, by bringing contact pads 184 of mirror mounting mechanism 182 in contact with the lower surface of the flange portion 178 (FIG. 32) of the workpiece 16. In order to retract the mirror mechanism away from the part, actuation shaft 193 is retracted into air cylinder 192, and the top portion of arm 80 will then rotate downward due to the weight of the top portion of arm 180 along with the weight of mirror mounting mechanism 182. This allows workpiece 16 to be unloaded from the die space once the bend has been performed, without interfering or colliding with the mirror holding mechanism 170.

Support member 188 is secured in an appropriate manner, e.g., by mounting bolts, into die rail 22. A mechanism may be provided for moving the mirror holding mechanism 170 along the die rail to various locations, so that angle measurements may be made at different positions along the die rail and at different stages located on the die rail. Such a movement mechanism may be an automated, motorized movement mechanism, or may just simply be a releasable attachment mechanism which may be provided so that the mirror holding mechanism 170 can easily be detached and reattached to the die rail at different locations along the die rail.

Pivot mechanism 190 may be implemented with an appropriate bearing mechanism or pin, and should allow arm 180 to freely move about the pivot point, and to be firmly brought into contact with the under surface of flange portion 178 of the workpiece 16 when actuation shaft 193 is pushed outward.

FIG. 32 is a side view of a die 19 and a beam emitter/detector unit 174 which, together with mirror 176, form an angle sensor 172. Emitter/detector unit 174 includes an emitter 196 and a detector 198. Emitter 196 emits a beam toward a reflective surface 177 of mirror 176, and the emitted beam is reflected off reflective surface 177 back toward detector 198. An angle measurement is made by determining the position of the light beam as detected by detector 198. The emitter may comprise a VIM 2-5 laser provided by Applied Laser Systems, Grants Pass, Oreg. Emitter 198 may comprise a sensor such as a model SL15 linear photodiode provided by UDT Sensors, Inc. of Hawthorne, Calif. The detector may include a neutral density filter which is placed over the linear photodiode and which is a G30,891 neutral density filter provided by Edmunds Scientific, Barrington, N.J. The neutral density filter is provided to reduce the intensity of light so that the sensor can appropriately interpret the light beam and its position.

In accordance with a particular embodiment of the present invention, the angle between the light beam incident on mirror 176 and the light beam reflected from mirror 176 may be 6°. FIG. 33 shows a side view of a beam emitter/detector unit 174 with a support structure 200 for holding beam emitter/detector unit 174. The elements of the beam emitter/detector unit 174 that are visible in FIG. 33 include detector 198 along with neutral density filter 197. Support structure 200 may be provided with angled surfaces 201 for holding the emitter/detector unit 174 at an appropriate angle so that it may direct and receive the incident and reflected light beams to and from mirror 176 at an appropriate height and angle. In the illustrated embodiment, which is intended for measuring a range of angles close to 45° of a flange portion 178 (which equates to bend angles near 90°), the angled surfaces 201 are approximately 45° from the horizontal plane.

Figure 34:
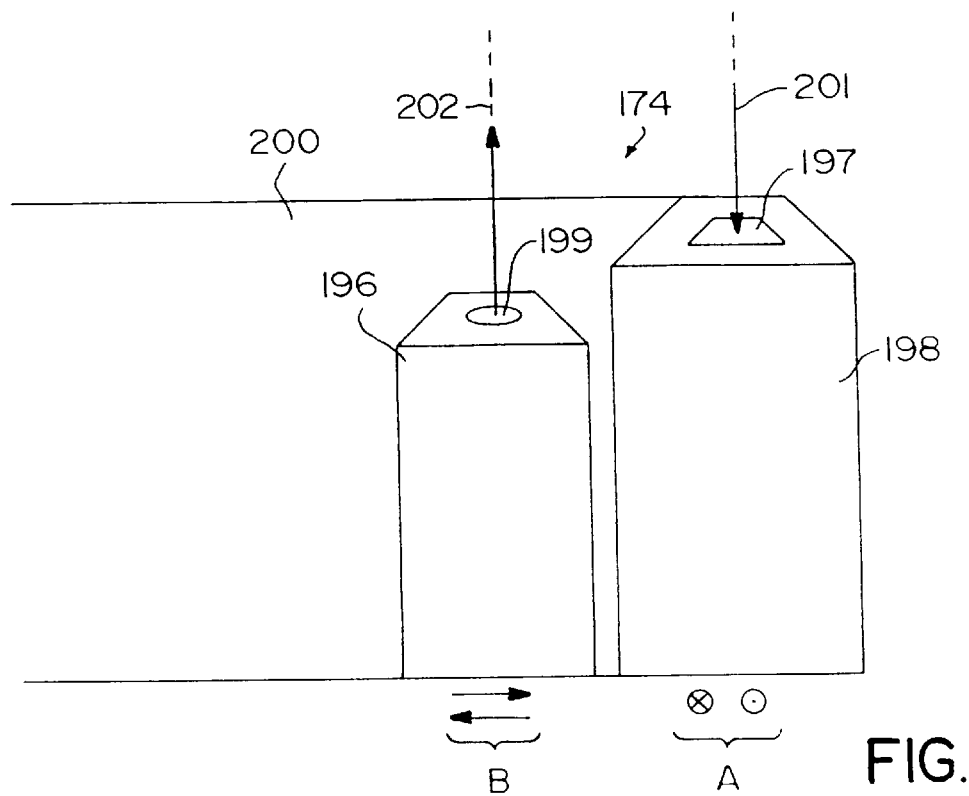
FIG. 34 is a top view of a beam emitter/detector unit with a support structure.

FIG. 34 is a top view of beam emitter/detector unit 174. In the view shown in FIG. 34, each of the detector 198 and emitter 196 is visible, along with neutral density filter 197, and a light emitter exit window 199. The housing, which holds detector 198, in the illustrated embodiment, may be adjusted in an up and down manner in accordance with the arrows A shown in FIG. 34, in order to adjust the vertical position of the reflecting light beam 201 with respect to detector 198 (which comprises a linear photo diode sensor). The lateral position of emitter 196 may be adjusted as indicated by arrows B. This allows the lateral position of the emitted/incident light beam to be adjusted, so that it is incident on mirror 176, and is reflected toward a center receiving position of detector 198.

Emitter/detector unit 174 may also be provided with a mounting mechanism so that it may be automatically moved from one position to another along the die rail, or may be manually moved by detaching and reattaching the same along various positions of the die rail.

In accordance with the illustrated embodiment, the distance between the emitter/detector unit 174 and mirror 176 may be approximately 4 inches.

When digitally sampling a continuously changing analog signal that is representative of the bend angle, the system may digitally filter the signal with a digital butterworth low pass filter having a frequency that will sufficiently cut off unwanted high frequency noise components of the signal. It is important that the mirror be close to the die radius for all die widths. In this regard, an adjustment mechanism may be provided for adjusting the position of the mirror with respect to the die radius in order to bring the mirror closer thereto. Another feature that may be provided in the angle sensor illustrated is an adjustment mechanism for adjusting the angle sensor to be able to read a bigger or different range of angles.

In order to improve repeatability, multiple angle readings should be taken, on the order of 100 to 1000 readings, in a very short period of time, and the results averaged. In this way, a more accurate angle reading can be maintained. It is noted that the range of the sensor illustrated is only 4° (i.e, the sensor can only sense a varying angle of a workpiece flange portion varying by 4°). A larger sensor, an array of sensors, or an adjustable position system can be utilized to address this shortcoming by increasing the overall bending range measurable by the angle sensor. The system may be provided with a motorized screw-type drive mechanism for positioning the sensor and the mirror holding mechanism along any one of unlimited positions along the die rail, for added flexibility. In addition, or in the alternative, a plurality of angle sensors may be provided at several points along the bend line, for a given workpiece being bent.

Figure 35:
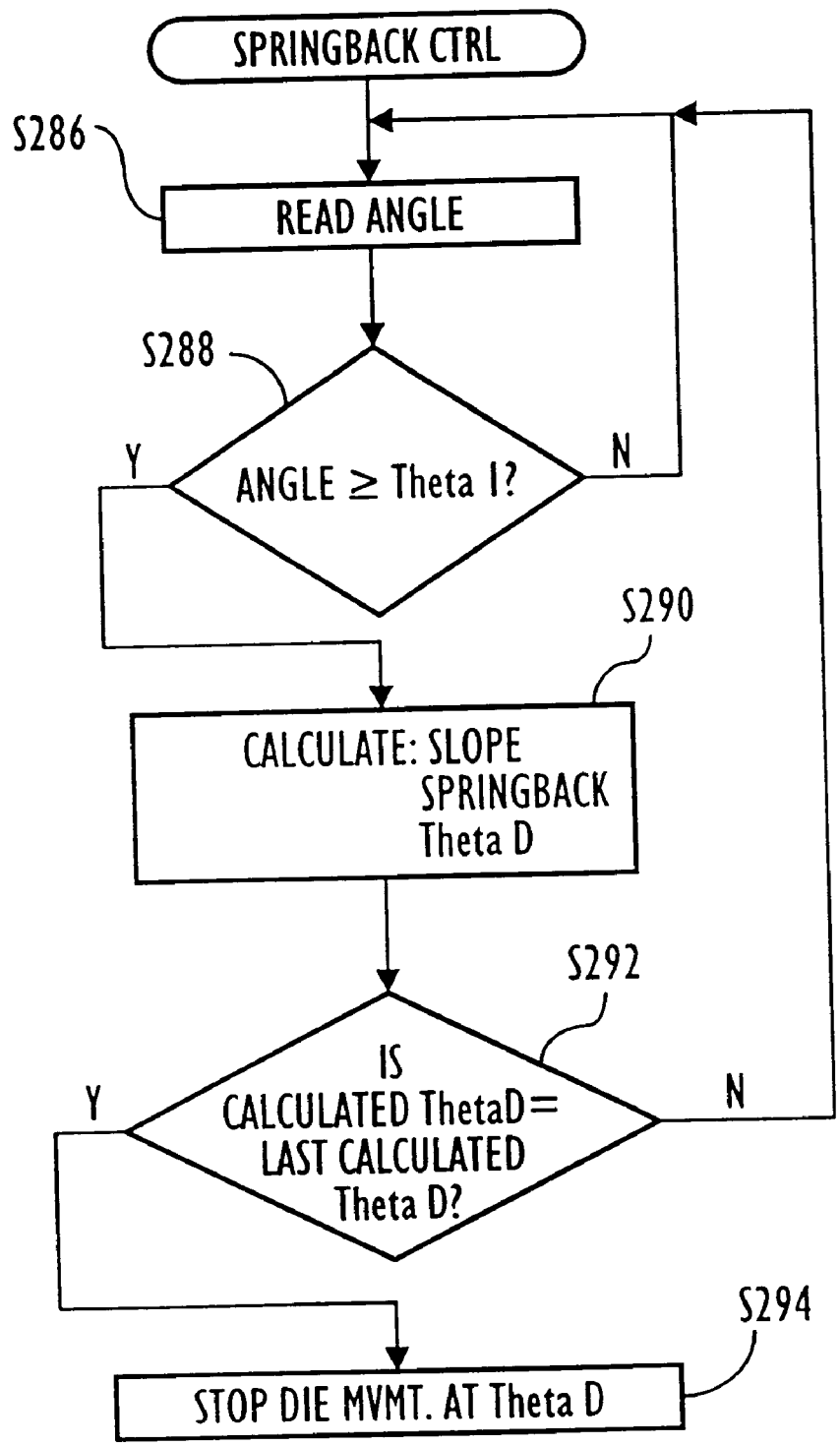
FIG. 35 is a flow chart of the steps performed by a springback control process.

FIG. 35 is a flow chart of a springback control process utilizing the bend angle sensor 172 illustrated in FIG. 32. In a first step S286 of the springback control process, the angle of the flange portion 178 of workpiece 16 is read from a filtered continuous angle measurement signal produced by the bend angle sensor described. Then, in step S288, a determination is made as to whether the measured angle is greater than or equal to an initial threshold value θ1 (Theta 1). If it not greater than or equal to θ1, the process returns to step S286. If the angle is greater than or equal to θ1, the process proceeds to step S290, where a slope is calculated of the continuously measured angle values to the monitored changing positions of the die along a D axis. In addition, in step S290, a springback is calculated and an additional threshold angle value θD (Theta D)is calculated. Then, in step S292, a determination is made as to whether the calculated θD is equal to the last calculated θD. If not, the process returns to step S286. If, however, the calculated θD is equal to the last calculated θD, the process proceeds to step S294, where the die movement is stopped at θD. θD is calculated as a function of the calculated springback and the desired target angle of the workpiece, and is slightly beyond the desired target angle (of bending) of the workpiece, so that when the workpiece springs back after disengagement of the press brake, it will be end up at its desired angle.

In order to perform the calculation of springback in step S290, a springback model may be utilized. The springback model may be developed by performing several steps including performing experiments on a batch of samples of sheet metal, and performing several initial calculations. In developing. the springback model, a batch of samples of sheet metal (e.g., cold-rolled steel sheets) may be acquired, having varying thicknesses and hardnesses. The hardness (Brinell hardness number) and the thickness (inches) may then be measured for each sampled sheet. Parts are then pressed utilizing the samples to a target angle (e.g., 90°). As each part is pressed, the angle (utilizing the angle sensor) is recorded versus the die displacement (as indicated by a glass scale encoder). The angle is recorded as it goes from about 87/88° to 90°, taking data points which may include between 100 to 1000 data points, as the angle varies from within this range. Then, the part is unloaded from the bend press, and the unloaded bend angle (which is the angle of the part after being unloaded) is measured and recorded. For each sample sheet, several variables are calculated, including the hardness divided by thickness (t), $K_{PL}$ ((0.5)t+punch radius), hardness/(t($K_{PL}$)) and 1/slope of angle versus die displacement. The springback of each tested/sample sheet is then calculated to be equal to the loaded angle−unloaded angle. Once this information has been acquired, a linear regression analysis or back propagation analysis (utilizing a neural network) may be utilized to model the springback as a function of each of the above-noted variables.

As an example of a linear regression model, the following variables and co-efficients may be utilized, which were determined by analyzing 100 sheets of cold-rolled steel (similar to the ASTM 366 standard) having varying thicknesses and hardnesses.

| Variable | Co-Efficient |
| --- | --- |
| Constant | 0.51918 |
| $K_{PL}$ | 0.07078 |
| H/T | 0.00207 |
| 1/slope | 415.35603 |
| H/(T($K_{PL}$)) | −0.02405 |

The springback (sb) for a particular sheet may be calculated as $0.51918 + 0.07078 (K_{PL}) + 0.00207(H/T) + 415.35603 (1/\text{slope}) + (-0.02405)(H/T\ K_{PL})$.

Data Acquisition

A number of cold-rolled steel sheets, from a variety of vendors, may be utilized in order to gather samples of different thickness and hardness, as well as strain hardening properties. Each sample may then be sheared to the same width and the thickness and hardness of each sheet measured. Each part may then be bent to approximately the same loaded angle of the press brake, with the final angle being recorded. A history of the loaded angle versus die displacement may then be recorded. Each sheet may then be unloaded and the angle of the part measured on a coordinate measuring machine.

TAGUCHI Analysis

An analysis may be conducted utilizing Taguchi's orthogonal array methodology. A two-factor, four-level per factor array turns out to be well suited to the acquired data noted above.

Linear Regression Analysis

Linear regression analysis provides a tool to correlate springback with a variety of possible variables based on measurements of thickness, hardness and die displacement during the loading of the workpiece. The variables that ultimately result in the best fit correspond to ratios suggested by the analytical model. Those variables include: Hardness/Thickness; Curvature beneath the punch ($K_{PL}$=1/0.5 (thickness)+punch radius); and Hardness/(Thickness($K_{PL}$)). In addition, the slope of the die displacement versus loaded angle curve turns out to be approximately linearly related to springback. Thus, four terms are used in the linear regression analysis of springback. This relation provides a fit of $R^2$=0.959 and a standard deviation of 0.15 degrees. A range of residuals for 226 data points is +/−0.36 degrees.

Neural Network Analysis

As an alternative to linear regression, a neural network of model springback may be developed. The network may consist of the four inputs used in the regression analysis, six hidden units, and one output unit, springback. The layers may be fully connected, and the weights trained using the back propagation algorithm.

While the invention has been described with reference to several illustrative embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials, and embodiments, it is understood that the invention is not to be limited to the particulars disclosed herein, and that the invention extends to all equivalent structures, methods, and uses such as are within the scope of the appended claims.

What is claimed:

1. A system for loading a workpiece into a die space of a bending apparatus, said system comprising:
    a measuring system that measures an amount of droop offset of a leading edge of said workpiece before said workpiece is loaded into said die space;
    a system that moves said workpiece in an upward direction by the measured droop offset; and
    a loading system that loads said workpiece into said die space.

2. The apparatus according to claim 1, wherein said measuring system comprises a back-lit vision-based droop sensor.

3. The apparatus according to claim 1, wherein said measuring system comprises a vision-based droop sensor.

4. The apparatus according to claim 1, wherein said measuring system comprises a mechanism for sensing when each of a plurality of light beams have been intersected by said workpiece as said workpiece is moved toward said die space.

5. The apparatus according to claim 1, wherein said measuring system comprises a single break-beam detecting mechanism for detecting when a single light beam has been broken by movement of said workpiece toward said die space.

6. The system of claim 1, said moving system moves said workpiece without rotation.

7. Apparatus for executing a bend on a malleable sheet workpiece with bend-following, said apparatus including a bending apparatus, said bending apparatus comprising a die, a tool punch, and a robot gripper for holding said workpiece, said apparatus comprising:
    reading means for reading a position value indicative of the relative movement of said die with respect to said tool punch;
    calculating means for calculating the location of said gripper as it holds onto said workpiece as a function of the position data read by said reading means;
    speed control means for limiting the speed of said relative movement of said die with respect to said tool punch so that said calculated location does not change too rapidly;
    means for detecting a force between said workpiece and said robot gripper during execution of said bend;
    means for modifying the location calculated by said calculating means based upon the detected force;
    robot control means for controlling movement of said robot to correspond to the calculated location; and
    determining means for determining if a final bend angle has been reached signifying completion of the bend.

8. An angle sensor for detecting an angle of a flange portion of a workpiece as the flange portion is being bent by a bending apparatus, said angle sensor comprising:
    a member having a reflective surface;
    a holder that holds said member with said reflective surface against said flange portion of said workpiece;
    a light emitter that emits a light beam onto said reflective surface; and
    a light detector that detects a position of said light beam as said light beam is reflected by said reflective surface, the detected position being indicative of the angle of said flange portion of said workpiece.

9. An angle sensor for detecting an angle of a flange portion of a workpiece as the flange portion is being bent by a bending apparatus, the angle sensor comprising:
    a member having a reflective surface;
    a holder that holds the member with the reflective surface against the flange portion of the workpiece;
    a light emitter that emits a light beam onto the reflective surface; and
    a light detector that detects a position of the light beam as the light beam is reflected by the reflective surface, the detected position being indicative of the angle of the flange portion of the workpiece,
    wherein the reflective surface is movable towards and away from the flange portion.

10. An angle sensor for detecting an angle of a flange portion of a workpiece as the flange portion is being bent by a bending apparatus, the angle sensor comprising:
    a member having a reflective surface;
    an arm for supporting the member, the arm being rotatable about an axis parallel to a bending line to be formed in the workpiece by the bending apparatus;
    a light emitter that emits a light beam onto the reflective surface; and
    a light detector that detects the position of the light beam as the light beam is reflected by the reflective surface, the detected position being indicative of the angle of the flange portion of the workpiece.

* * * * *

UNITED STATES PATENT AND TRADEMARK OFFICE
CERTIFICATE OF CORRECTION

PATENT NO. : 5,987,958
DATED : November 23, 1999
INVENTOR(S) : R. MOORE, JR. et al.

It is certified that error appears in the above-identified patent and that said Letters Patent is hereby corrected as shown below:

On the cover of the printed patent, at Item [75], Inventors, line 6, "Kensuke Hazama, Buena Park, Calif." should be deleted.

On the cover of the printed patent, at Item [56], References Cited, Other Publications, line 2, "whcih" should be ---which---.

On the cover of the printed patent, at Item [56], References Cited, Other Publications, line 3, "ASMEWinter" should be ---ASME Winter---.

On the cover of the printed patent, at Item [56], References Cited, Other Publications, line 37, "sep. 1988" should be ---Sep. 1988---.

On the cover of the printed patent, at Item [56], References Cited, Other Publications, line 40, ")Feb. 5, 1993)" should be ---(Feb. 5, 1993)---.

On the cover of the printed patent, at Item [56], References Cited, Other Publications, line 41, "Infernzmaschine" should be ---Inferenzmaschine---.

On the cover of the printed patent, at Item [56], References Cited, Other Publications, line 4, "Robor" should be ---Robot---.

Signed and Sealed this

Twenty-seventh Day of March, 2001

Attest:

NICHOLAS P. GODICI

*Attesting Officer*  *Acting Director of the United States Patent and Trademark Office*